United States Patent
Takahashi

(10) Patent No.: US 12,052,631 B2
(45) Date of Patent: Jul. 30, 2024

(54) ELECTRONIC DEVICE AND INFORMATION PROCESSING DEVICE

(71) Applicant: Ayako Takahashi, Saitama (JP)

(72) Inventor: Ayako Takahashi, Saitama (JP)

( * ) Notice: Subject to any disclaimer, the term of this patent is extended or adjusted under 35 U.S.C. 154(b) by 875 days.

(21) Appl. No.: 16/978,206

(22) PCT Filed: Mar. 6, 2019

(86) PCT No.: PCT/JP2019/008905
§ 371 (c)(1),
(2) Date: Jul. 6, 2021

(87) PCT Pub. No.: WO2019/172324
PCT Pub. Date: Sep. 12, 2019

(65) Prior Publication Data
US 2021/0345063 A1    Nov. 4, 2021

(30) Foreign Application Priority Data

Mar. 7, 2018 (JP) .................. 2018-040396

(51) Int. Cl.
*H04W 4/02* (2018.01)
*H04W 8/24* (2009.01)

(52) U.S. Cl.
CPC ............. *H04W 4/023* (2013.01); *H04W 8/24* (2013.01)

(58) Field of Classification Search
None
See application file for complete search history.

(56) References Cited

U.S. PATENT DOCUMENTS

| 2013/0231062 A1* | 9/2013 | Yahagi ................ H04B 17/309 |
| | | 455/67.13 |
| 2016/0101370 A1 | 4/2016 | Madsen et al. |
| 2017/0100090 A1* | 4/2017 | Tang ........................ A61B 8/00 |

FOREIGN PATENT DOCUMENTS

| JP | 2004-252592 A | 9/2004 |
| JP | 2005-245620 A | 9/2005 |
| JP | 2005-318995 A | 11/2005 |
| JP | 2007-82761 A | 4/2007 |
| JP | 2016-96499 A | 5/2016 |
| JP | 2016-99299 A | 5/2016 |
| JP | 2017-530848 A | 10/2017 |
| WO | 2016-055862 A1 | 4/2016 |

OTHER PUBLICATIONS

International Search Report issued in PCT/JP2019/008905 mailed on May 28, 2019 with English Translation (3 pages).
Notice of Reasons for Refusal dated Feb. 28, 2023, issued in Japanese Patent Application No. 2022-068643, with English Translation (17 pages).
Notice of Reasons for Refusal dated Nov. 30, 2021, issued in Japanese Patent Application No. 2019-041244, with English Translation (7 pages).

\* cited by examiner

*Primary Examiner* — Frantz Bataille
(74) *Attorney, Agent, or Firm* — Nakanishi IP Associates, LLC

(57) ABSTRACT

An electronic device includes circuitry. The circuitry is configured to: store reception intensity of radio waves output from multiple devices including portable device that exist around the electronic device in a storage unit for each device; and determine a content to be provided to an user based on each reception intensity pattern that appears in arranging each radio wave stored in the storage unit in order of intensity at a predetermined timing.

11 Claims, 48 Drawing Sheets

EXAMPLE OF SHOWING CORRESPONDENCE RELATIONSHIP BETWEEN RADIO WAVE STATE OF ELECTRONIC DEVICE 100 AND PROVISION INFORMATION

| OI \ RADIO WAVE INTENSITY ORDER | #1 | #2 | #3 | #4 | #5 | #6 |
|---|---|---|---|---|---|---|
| OI1 | 0 | 0 | 0 | 0 | 0 | 0 |
| OI2 | 1 | 0 | 0 | 0 | 0 | 0 |
| OI3 | 1 | 1 | 0 | 0 | 0 | 0 |
| OI4 | 1 | 1 | 1 | 0 | 0 | 0 |
| OI5 | 1 | 1 | 1 | 1 | 0 | 0 |
| OI6 | 1 | 1 | 1 | 1 | 1 | 0 |
| OI7 | 1 | 1 | 1 | 1 | 1 | 1 |
| OI8 | 2 | 0 | 0 | 0 | 0 | 0 |
| OI9 | 2 | 1 | 0 | 0 | 0 | 0 |
| OI10 | 2 | 1 | 1 | 0 | 0 | 0 |
| ⋮ | ⋮ | ⋮ | ⋮ | ⋮ | ⋮ | ⋮ |
| OIX1 | 5 | 4 | 3 | 2 | 2 | 1 |
| OIX2 | 5 | 4 | 3 | 2 | 2 | 2 |
| OIX3 | 5 | 4 | 3 | 3 | 2 | 2 |
| ⋮ | ⋮ | ⋮ | ⋮ | ⋮ | ⋮ | ⋮ |
| OI(M−1) | 5 | 5 | 5 | 5 | 5 | 4 |
| OIM | 5 | 5 | 5 | 5 | 5 | 5 |

FIG. 3

PROVISION INFORMATION EXAMPLE

| OI | AUDIO INFORMATION | IMAGE INFORMATION |
|---|---|---|
| OI1 | Let's dream longing Santa Today. |  |
| OI2 | Feeling like hopping rabbit today. |  |
| ⋮ | ⋮ | ⋮ |
| OIX1 | Let's wait like snowman without haste today. |  |
| OIX2 | Feeling sadness like autumn leaves today. |  |
| ⋮ | ⋮ | ⋮ |
| OIY1 | Feeling energetic freedom like watermelon in the Summer. |  |
| OIY2 | Feeling calm like apple today. |  |
| ⋮ | ⋮ | ⋮ |
| OIM | Spread wings in the wide open sky like bird today |  |

FIG. 4

(1) EXAMPLE OF RADIO WAVE STATE OF ELECTRONIC DEVICE 100

| DEVICE | ED 101 | ED 102 | ED 103 | ED 104 | ED 105 | ED 106 |
|---|---|---|---|---|---|---|
| RADIO WAVE INTENSITY | | | | | | |
| RADIO WAVE INTENSITY ORDER | #4、5 | #2 | #1 | #3 | #4、5 | #6 |

ED: ELECTRONIC DEVICE (2) EXAMPLE OF RADIO WAVE INTENSITY OF EACH DEVICE IN ORDER OF RADIO WAVE INTENSITY

| RADIO WAVE INTENSITY ORDER | #1 | #2 | #3 | #4 | #5 | #6 |
|---|---|---|---|---|---|---|
| RADIO WAVE INTENSITY | 5 | 4 | 3 | 2 | 2 | 1 |

(3) EXAMPLE OF CORRESPONDING RELATIONSHIP BETWEEN RADIO WAVE STATE OF ELECTRONIC DEVICE 100 AND PROVISION INFORMATION

| OI \ RADIO WAVE INTENSITY ORDER | #1 | #2 | #3 | #4 | #5 | #6 |
|---|---|---|---|---|---|---|
| OI1 | 0 | 0 | 0 | 0 | 0 | 0 |
| OI2 | 1 | 0 | 0 | 0 | 0 | 0 |
| ⋮ | ⋮ | ⋮ | ⋮ | ⋮ | ⋮ | ⋮ |
| OIX1 | 5 | 4 | 3 | 2 | 2 | 1 |
| ⋮ | ⋮ | ⋮ | ⋮ | ⋮ | ⋮ | ⋮ |
| OIM | 5 | 5 | 5 | 5 | 5 | 5 |

FIG. 5

PROVISION INFORMATION EXAMPLE

| OI | AUDIO INFORMATION (11) | IMAGE INFORMATION (12) |
|---|---|---|
| OI1 | Let's dream longing Santa today. |  |
| OI2 | Feeling like hopping rabbit today. |  |
| ⋮ | ⋮ | ⋮ |
| OIX1 | Let's wait like snowman without haste today. |  |
| OIX2 | Feeling sadness like autumn leaves today. |  |
| ⋮ | ⋮ | ⋮ |
| OIY1 | Feeling energetic freedom like watermelon in the Summer. |  |
| OIY2 | Feeling calm like apple today. |  |
| ⋮ | ⋮ | ⋮ |
| OIM | Spread wings in the wide open sky like bird today. |  |

The OIX1 row is marked as 14.

FIG. 6

EXAMPLE OF OUTPUT CONTENT FROM ELECTRONIC DEVICE 100

EXAMPLE OF CORRESPONDING RELATIONSHIP BETWEEN TYPE OF OTHER DEVICES AND PROVISION INFORMATION

| OI \ RADIO WAVE INTENSITY ORDER | #1 | #2 | #3 | #4 | #5 | #6 |
|---|---|---|---|---|---|---|
| OI1 | O | O | O | O | O | O |
| OI2 | SP | O | O | O | O | O |
| OI3 | SP | SP | O | O | O | O |
| OI4 | SP | SP | SP | O | O | O |
| OI5 | SP | SP | SP | SP | O | O |
| OI6 | SP | SP | SP | SP | SP | O |
| OI7 | SP | SP | SP | SP | SP | SP |
| OI8 | TT | O | O | O | O | O |
| OI9 | TT | SP | O | O | O | O |
| OI10 | TT | SP | SP | O | O | O |
| ⋮ | ⋮ | ⋮ | ⋮ | ⋮ | ⋮ | ⋮ |
| OIY1 | SP | SP | TT | SP | AIS | PC |
| OIY2 | SP | SP | TT | SP | AIS | CP |
| ⋮ | ⋮ | ⋮ | ⋮ | ⋮ | ⋮ | ⋮ |
| OI(M−1) | CP | CP | CP | CP | CP | PC |
| OIM | CP | CP | CP | CP | CP | CP |

SP: SMART PHONE
TT: TABLET TERMINAL
CP: CELLULAR PHONE
AIS: AI SPEAKER

FIG. 9

(1) EXAMPLE OF RADIO WAVE STATE OF ELECTRONIC DEVICE 100 AND TYPE OF EACH DEVICE

| DEVICE | ED 101 | ED 102 | ED 103 | ED 104 | ED 105 | ED 106 |
|---|---|---|---|---|---|---|
| RADIO WAVE INTENSITY | ▃▅▆ | ▃▅▆ | ▃▅▆ | ▃▄▅ | ▃▄▅ | ▂▃▄ |
| RADIO WAVE INTENSITY ORDER | #4 | #2 | #1 | #3 | #5 | #6 |
| TYPE | SMART PHONE | SMART PHONE | SMART PHONE | TABLET TERMINAL | AI SPEAKER | PC |

ED: ELECTRONIC DEVICE (2) EXAMPLE OF TYPE OF EACH DEVICE IN ORDER OF RADIO WAVE INTENSITY

| RADIO WAVE INTENSITY ORDER | #1 | #2 | #3 | #4 | #5 | #6 |
|---|---|---|---|---|---|---|
| RADIO WAVE INTENSITY | 5 | 4 | 3 | 2 | 2 | 1 |
| TYPE | SMART PHONE | SMART PHONE | TABLET TERMINAL | SMART PHONE | AI SPEAKER | PC |

(3) EXAMPLE OF CORRESPONDING RELATIONSHIP BETWEEN TYPE OF EACH DEVICE AND PROVISION INFORMATION

| OI \ RADIO WAVE INTENSITY ORDER | #1 | #2 | #3 | #4 | #5 | #6 |
|---|---|---|---|---|---|---|
| OI1 | O | O | O | O | O | O |
| OI2 | SP | O | O | O | O | O |
| ⋮ | ⋮ | ⋮ | ⋮ | ⋮ | ⋮ | ⋮ |
| OIY1 | SP | SP | TT | SP | AIS | PC |
| ⋮ | ⋮ | ⋮ | ⋮ | ⋮ | ⋮ | ⋮ |
| OIM | 5 | 5 | 5 | 5 | 5 | 5 |

SP: SMART PHONE, TT: TABLET TERMINAL, AIS: AI SPEAKER

FIG. 10

PROVISION INFORMATION EXAMPLE

| OI | AUDIO INFORMATION (11) | IMAGE INFORMATION (12) |
|---|---|---|
| OI1 | Let's dream longing Santa today. |  |
| OI2 | Feeling like hopping rabbit today. |  |
| ⋮ | ⋮ | ⋮ |
| OIX1 | Let's wait like snowman without haste today. |  |
| OIX2 | Feeling sadness like autumn leaves today. | 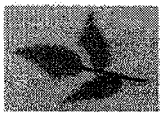 |
| ⋮ | ⋮ | ⋮ |
| OIY1 | Feeling energetic freedom like watermelon in the Summer. |  |
| OIY2 | Feeling calm like apple today. | 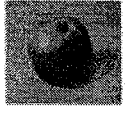 |
| ⋮ | ⋮ | ⋮ |
| OIM | Spread wings in the wide open sky like bird today. |  |

FIG. 11

EXAMPLE OF OUTPUT CONTENT FROM ELECTRONIC DEVICE 100

Feeling energetic freedom like watermelon in the Summer.

EXAMPLE OF CORRESPONDING RELATIONSHIP BETWEEN TYPE OF OTHER DEVICES AND PROVISION INFORMATION

| OI \ RADIO WAVE INTENSITY ORDER | #1 | #2 | #3 | #4 | #5 | #6 |
|---|---|---|---|---|---|---|
| OI1 | o | o | o | o | o | o |
| ⋮ | ⋮ | ⋮ | ⋮ | ⋮ | ⋮ | ⋮ |
| OIA1 | MTA | o | o | o | o | o |
| ⋮ | ⋮ | ⋮ | ⋮ | ⋮ | ⋮ | ⋮ |
| OIAB1 | SP | MTA | o | o | o | o |
| ⋮ | ⋮ | ⋮ | ⋮ | ⋮ | ⋮ | ⋮ |
| OIAC1 | SP | SP | MTA | o | o | o |
| ⋮ | ⋮ | ⋮ | ⋮ | ⋮ | ⋮ | ⋮ |
| OIAD1 | SP | SP | SP | MTA | o | o |
| ⋮ | ⋮ | ⋮ | ⋮ | ⋮ | ⋮ | ⋮ |
| OIAE1 | SP | SP | SP | SP | MTA | o |
| ⋮ | ⋮ | ⋮ | ⋮ | ⋮ | ⋮ | ⋮ |
| OIAF1 | SP | SP | SP | SP | SP | MTA |
| ⋮ | ⋮ | ⋮ | ⋮ | ⋮ | ⋮ | ⋮ |
| ⋮ | ⋮ | ⋮ | ⋮ | ⋮ | ⋮ | ⋮ |
| OIM | CP | CP | CP | CP | CP | CP |

MTA: MT. A DEVICE
SP: SMART PHONE
CP: CELLULAR PHONE

FIG. 14

PROVISION INFORMATION EXAMPLE

| OI | AUDIO INFORMATION | IMAGE INFORMATION |
|---|---|---|
| OI1 | Let's dream longing Santa today. | |
| ⋮ | ⋮ | ⋮ |
| OIA1 | Well done. Here's the summit of Mt. A. I'm Mr. Mt. A bowl for climbing memorial. | |
| ⋮ | ⋮ | ⋮ |
| OIAB1 | Well done. Here's the summit of Mt. A. I'm Mr. Mt. A noodle for climbing memorial. | |
| ⋮ | ⋮ | ⋮ |
| OIAC1 | Well done. Here's the summit of Mt. A. I'm Mr. Mt. A shaved ice for climbing memorial. | |
| ⋮ | ⋮ | ⋮ |
| OIAD1 | Well done. Here's the summit of Mt. A. I'm Mr. Mt. A sake for climbing memorial. | |
| ⋮ | ⋮ | ⋮ |
| OIM | Spread wings in the wide open sky like bird today. | |

| RADIO WAVE INTENSITY ORDER  OI | #1 | #2 | #3 | #4 | #5 | #6 |
|---|---|---|---|---|---|---|
| OI1 | O | O | O | O | O | O |
| ⋮ | ⋮ | ⋮ | ⋮ | ⋮ | ⋮ | ⋮ |
| OIAB1 | SP | MTA | O | O | O | O |
| ⋮ | ⋮ | ⋮ | ⋮ | ⋮ | ⋮ | ⋮ |
| OIM | CP | CP | CP | CP | CP | CP |

MTA: MT. A DEVICE, SP: SMART PHONE, CP: CELLULAR PHONE (3)

| OI | AUDIO INFORMATION | IMAGE INFORMATION |
|---|---|---|
| OI1 | Let's dream longing Santa today. | |
| ⋮ | ⋮ | ⋮ |
| OIAB1 | Well done. Here's the summit of Mt. A. I'm Mr. Mt. A noodle for climbing memorial. | |
| ⋮ | ⋮ | ⋮ |
| OIM | Spread wings in the wide open sky like bird today. | |

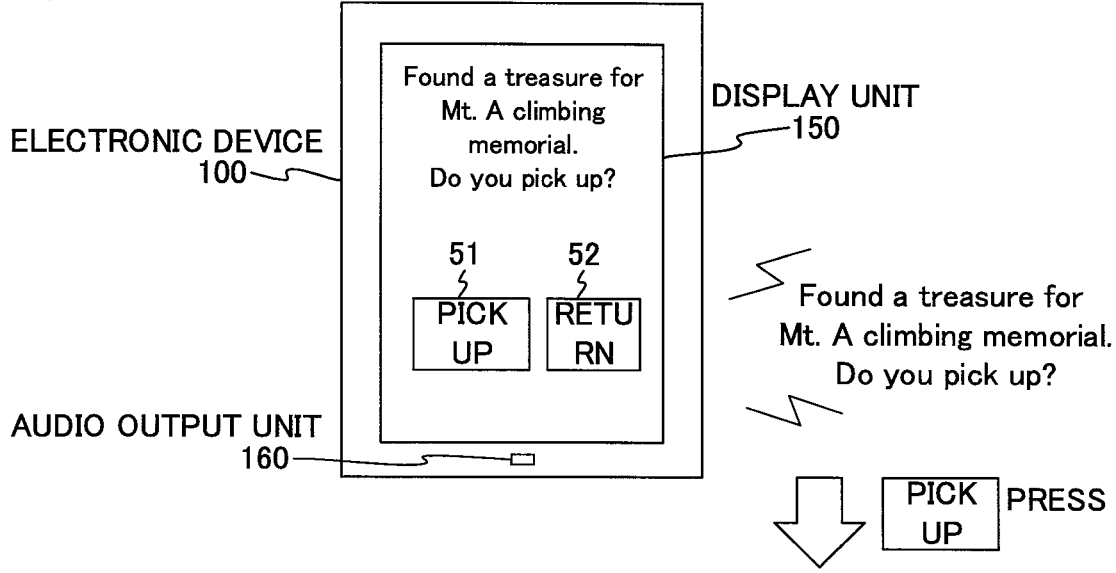
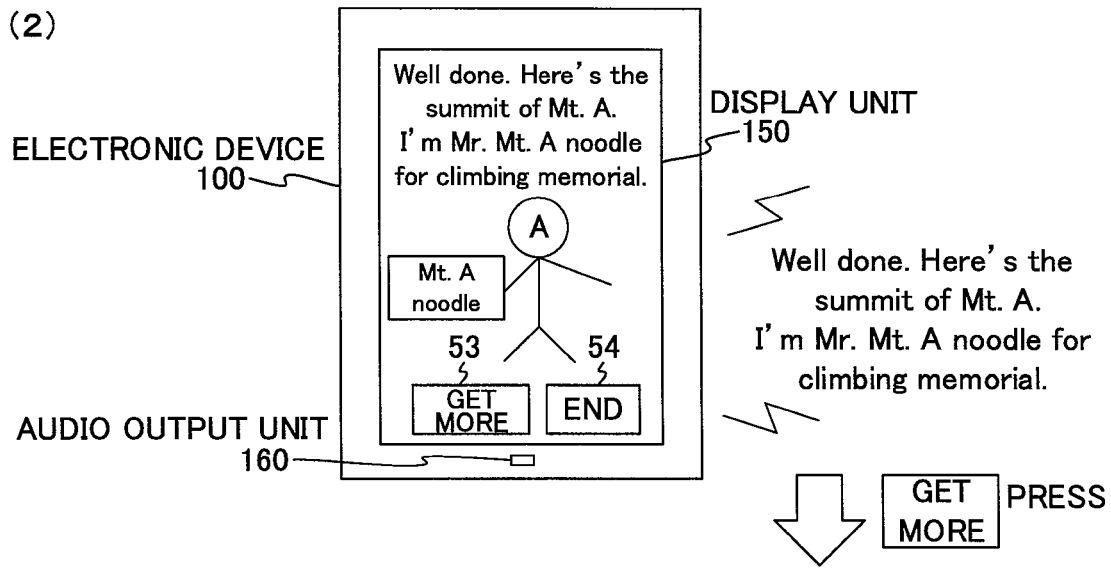
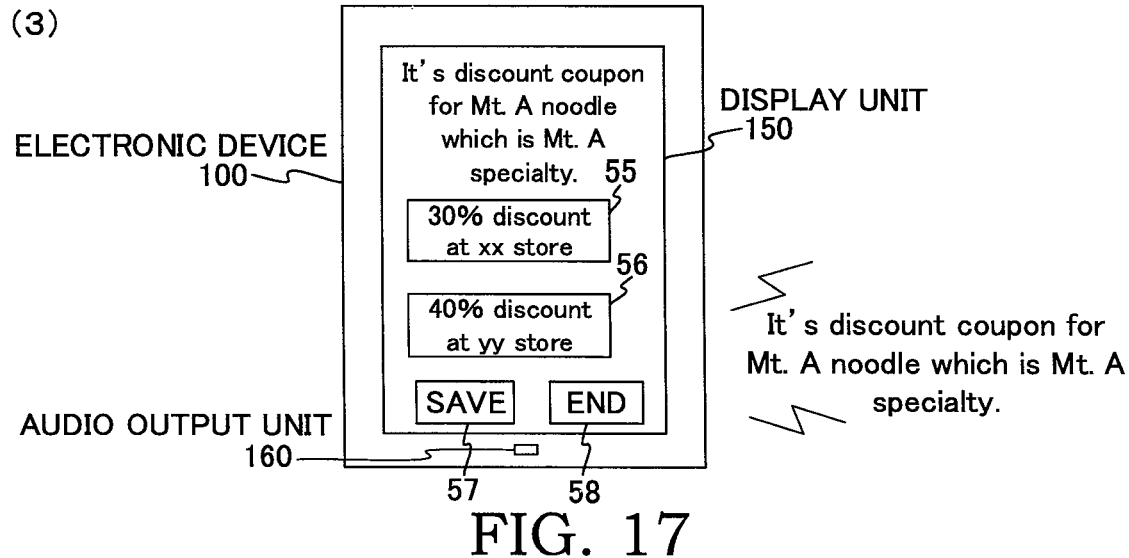
FIG. 17

EXAMPLE OF CORRESPONDING RELATIONSHIP BETWEEN TYPE OF OTHER DEVICES AND PROVISION INFORMATION

| OI \ RADIO WAVE INTENSITY ORDER | #1 | #2 | #3 | #4 | #5 | #6 |
|---|---|---|---|---|---|---|
| OI1 | O | O | O | O | O | O |
| ⋮ | ⋮ | ⋮ | ⋮ | ⋮ | ⋮ | ⋮ |
| OIAA1 | SA | O | O | O | O | O |
| ⋮ | ⋮ | ⋮ | ⋮ | ⋮ | ⋮ | ⋮ |
| OIAAB1 | SP | SA | O | O | O | O |
| ⋮ | ⋮ | ⋮ | ⋮ | ⋮ | ⋮ | ⋮ |
| OIAAC1 | SP | SP | SA | O | O | O |
| ⋮ | ⋮ | ⋮ | ⋮ | ⋮ | ⋮ | ⋮ |
| OIAAD1 | SP | SP | SP | SA | O | O |
| ⋮ | ⋮ | ⋮ | ⋮ | ⋮ | ⋮ | ⋮ |
| OIAAE1 | SP | SP | SP | SP | SA | O |
| ⋮ | ⋮ | ⋮ | ⋮ | ⋮ | ⋮ | ⋮ |
| OIAAF1 | SP | SP | SP | SP | SP | SA |
| ⋮ | ⋮ | ⋮ | ⋮ | ⋮ | ⋮ | ⋮ |
| ⋮ | ⋮ | ⋮ | ⋮ | ⋮ | ⋮ | ⋮ |
| OIM | CP | CP | CP | CP | CP | CP |

SA: STORE A DEVICE
SP: SMART PHONE
CP: CELLULAR PHONE

FIG. 19

PROVISION INFORMATION EXAMPLE

| OI | AUDIO INFORMATION | IMAGE INFORMATION |
|---|---|---|
| OI1 | Let's dream longing Santa today. | |
| ⋮ | ⋮ | ⋮ |
| OIAA1 | Welcome. Fried Shrimp is a half price today. | |
| ⋮ | ⋮ | ⋮ |
| OIAAB1 | Welcome. Crab miso is a half price today. | |
| ⋮ | ⋮ | ⋮ |
| OIAAC1 | Welcome. Whitebait bowl is a half price today. | |
| ⋮ | ⋮ | ⋮ |
| OIAAD1 | Welcome. Grilled scallop is a half price today. | |
| ⋮ | ⋮ | ⋮ |
| OIM | Spread wings in the wide open sky like bird today. | |

| RADIO WAVE INTENSITY ORDER<br>OI | #1 | #2 | #3 | #4 | #5 | #6 |
|---|---|---|---|---|---|---|
| OI1 | O | O | O | O | O | O |
| ⋮ | ⋮ | ⋮ | ⋮ | ⋮ | ⋮ | ⋮ |
| OIAAC1 | SP | SP | SA | O | O | O |
| ⋮ | ⋮ | ⋮ | ⋮ | ⋮ | ⋮ | ⋮ |
| OIM | CP | CP | CP | CP | CP | CP |

SA: STORE A DEVICE, SP: SMART PHONE, CP: CELLULAR PHONE (3)

| OI | AUDIO INFORMATION | IMAGE INFORMATION |
|---|---|---|
| OI1 | Let's dream longing Santa today. | |
| ⋮ | ⋮ | ⋮ |
| OIAAC1 | Welcome. Whitebait bowl is a half price today. | |
| ⋮ | ⋮ | ⋮ |
| OIM | Spread wings in the wide open sky like bird today. | |

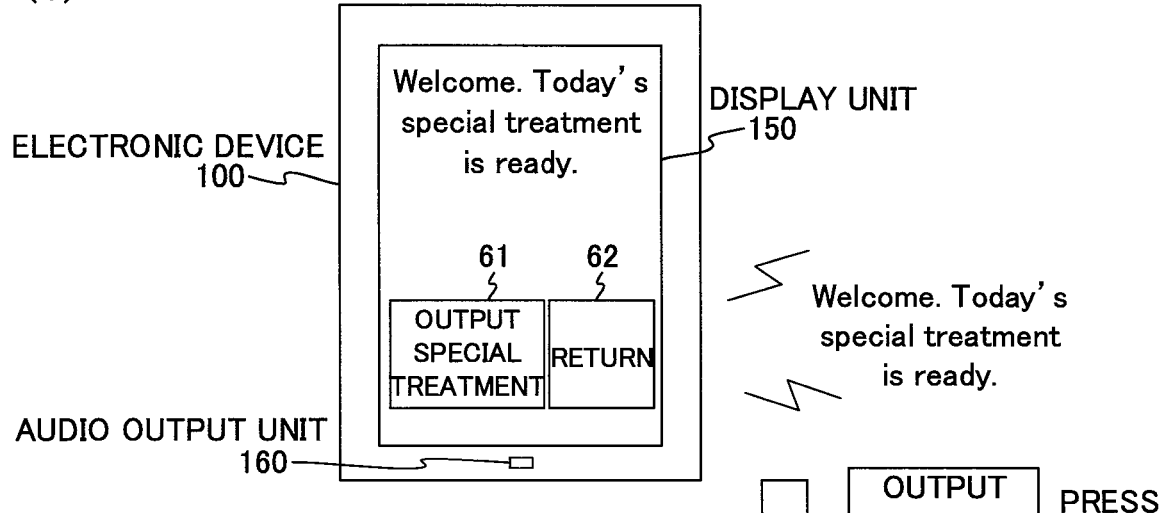
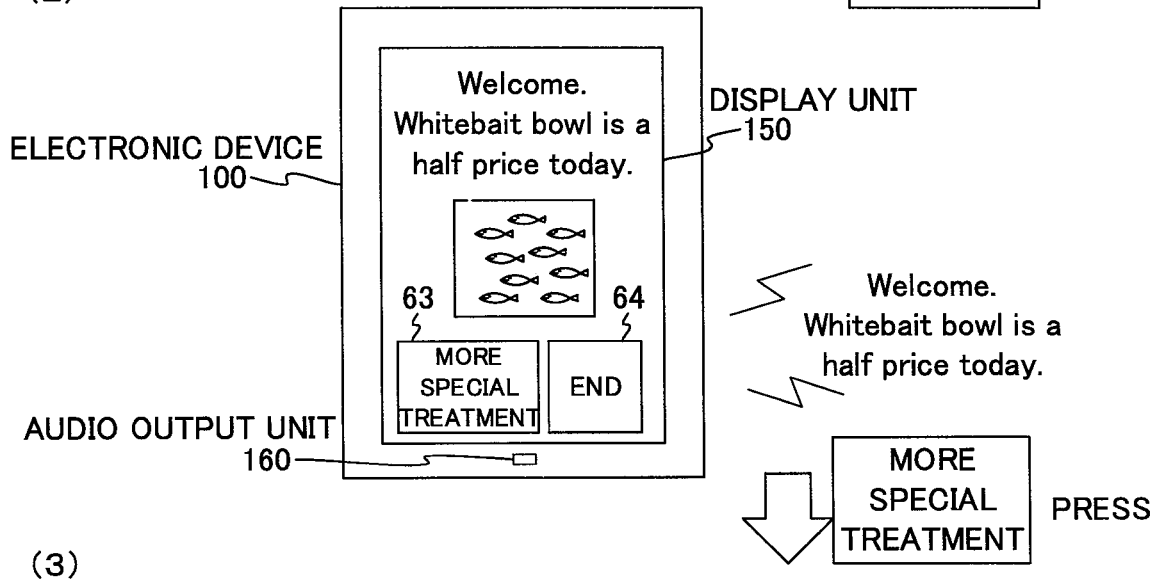
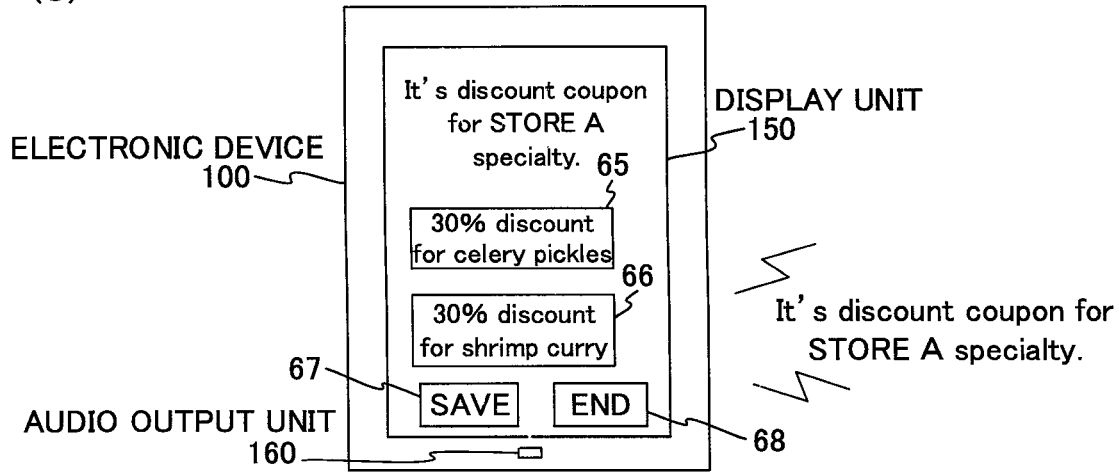
FIG. 22

PROVISION INFORMATION EXAMPLE
| OI | PROVISION INFORMATION | ... |
|---|---|---|
| OI1 | 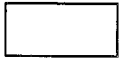 | ... |
| ⋮ | ⋮ | ⋮ |
| OIXY1 |  | ... |
| ⋮ | ⋮ | ⋮ |
| OIYY2 |  | ... |
| ⋮ | ⋮ | ⋮ |
| OIYZ1 |  | ... |
| ⋮ | ⋮ | ⋮ |
| OIZZ7 |  | ... |
| ⋮ | ⋮ | ⋮ |
| OIM | 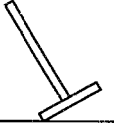 | ... |
FIG. 24

PROVISION INFORMATION EXAMPLE
| OI | 1ST PROVISION INFORMATION 441 | 2ND PROVISION INFORMATION 442 | 3RD PROVISION INFORMATION 443 | ... |
|---|---|---|---|---|
| OI1 | EXPERIENCE 3 | MONEY7 | CAR4 | ... |
| ⋮ | ⋮ | ⋮ | ⋮ | ⋮ |
| OIJK1 |  | HOUSE108 | MONEY99 | ... |
| ⋮ | ⋮ | ⋮ | ⋮ | ⋮ |
| OIGT3 | EXPERIENCE 89 |  | MONEY67 | ... |
| ⋮ | ⋮ | ⋮ | ⋮ | ⋮ |
| OIMU9 |  | MONEY678 | EXPERIENCE2 | ... |
| ⋮ | ⋮ | ⋮ | ⋮ | ⋮ |
| OIPO6 | TANK7 | MONEY100 |  | ... |
| ⋮ | ⋮ | ⋮ | ⋮ | ⋮ |
| OIM | AIR PLANE10 | MONEY17 | EXPERIENCE 1189 | ... |
FIG. 27

EXAMPLE OF GROWING GAME
(1)
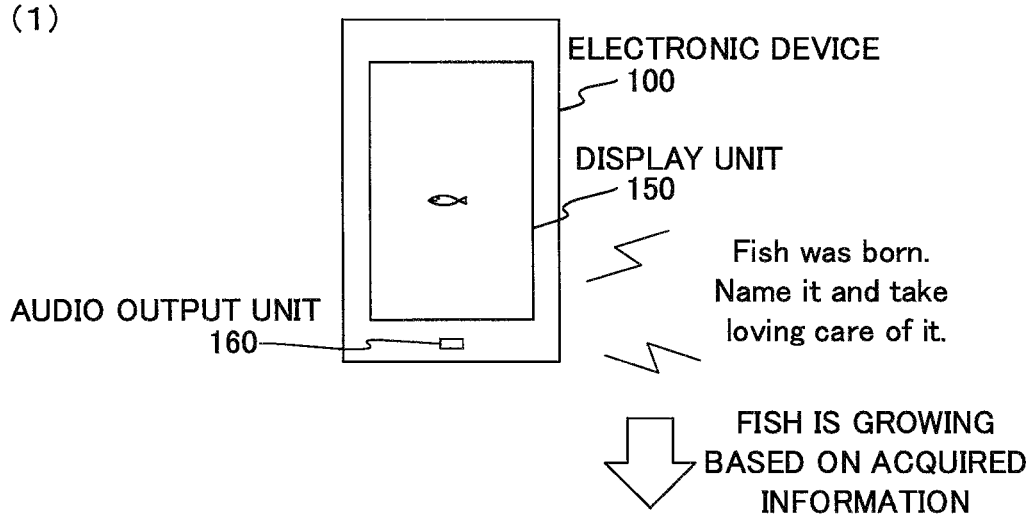
(2)
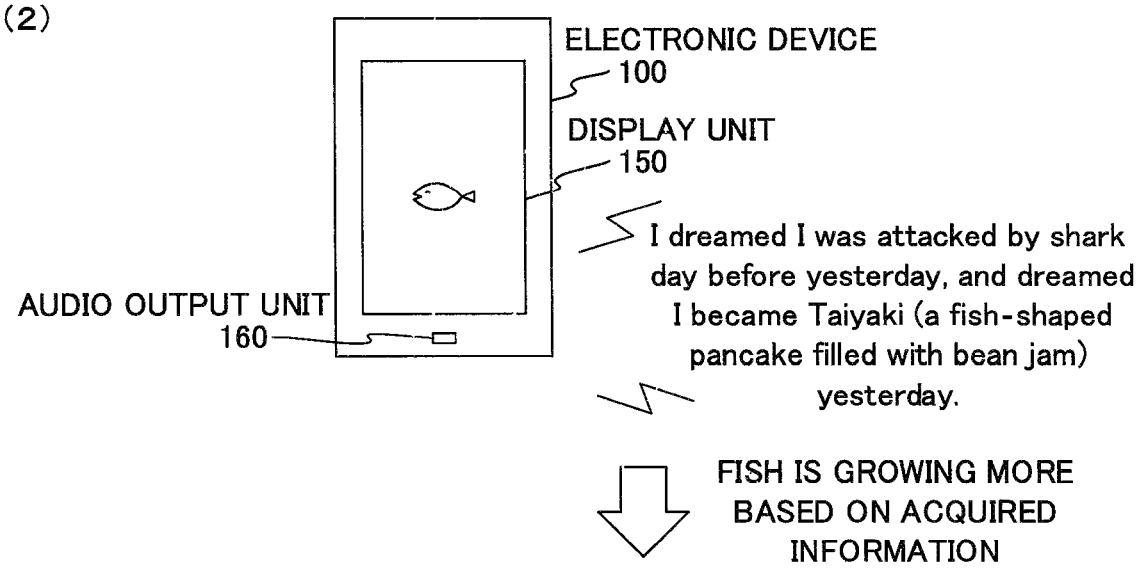
(3)
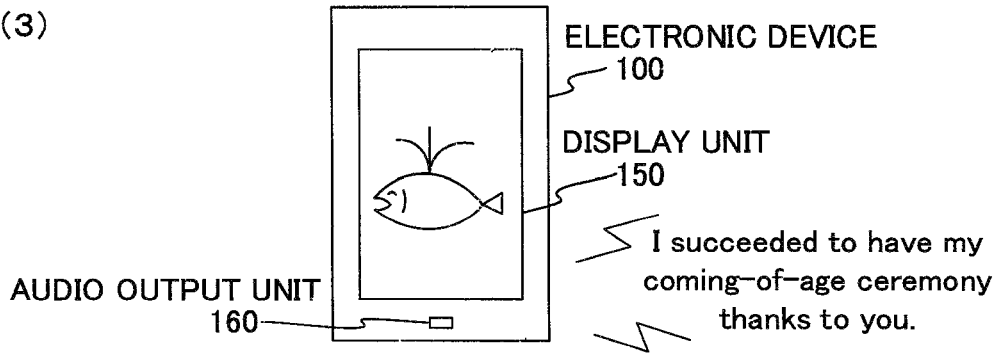
FIG. 29

PROVISION INFORMATION EXAMPLE

| OI | 1ST PROVISION INFORMATION (461) | 2ND PROVISION INFORMATION (462) | 3RD PROVISION INFORMATION (463) | ... |
|---|---|---|---|---|
| OI1 | Swim 100m | Eat small fish | Playing with coral | ... |
| ⋮ | ⋮ | ⋮ | ⋮ | ⋮ |
| OIHH1 | Be attacked by shark | Being caught | Become Taiyaki | ... |
| ⋮ | ⋮ | ⋮ | ⋮ | ⋮ |
| OIHV3 | Become deep sea fish | Eat fried shrimp | Make friends | ... |
| ⋮ | ⋮ | ⋮ | ⋮ | ⋮ |
| OIGV9 | Become sick | Get hurt while swimming | Fall in love with some-fish | ... |
| ⋮ | ⋮ | ⋮ | ⋮ | ⋮ |
| OIVV6 | Height grow | Gain weight | — | — |
| ⋮ | ⋮ | ⋮ | ⋮ | ⋮ |
| OIM | Attend coming-of-age ceremony | Have children | Have wife | ... |

FIG. 30

EXAMPLE OF ROAMING GAME
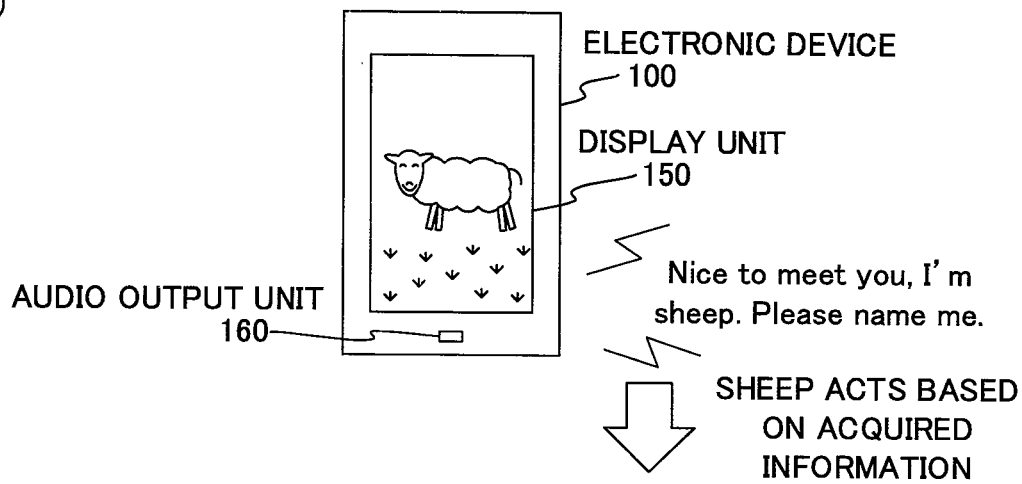
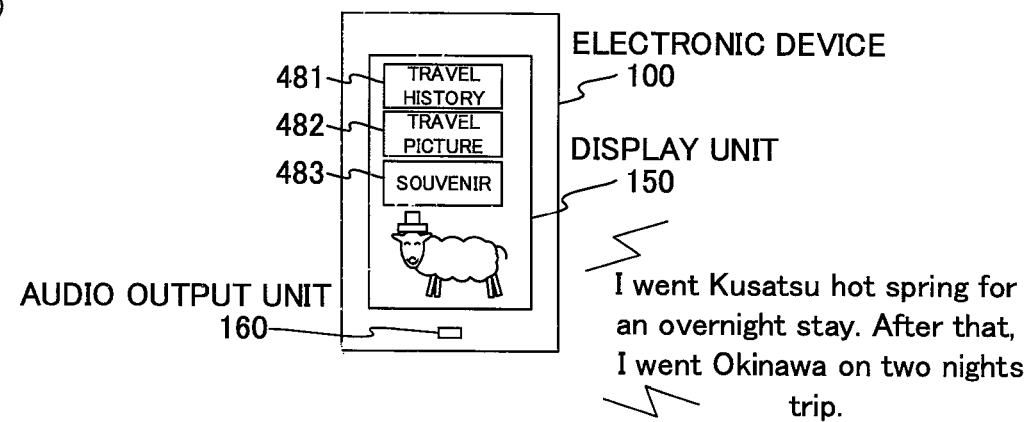
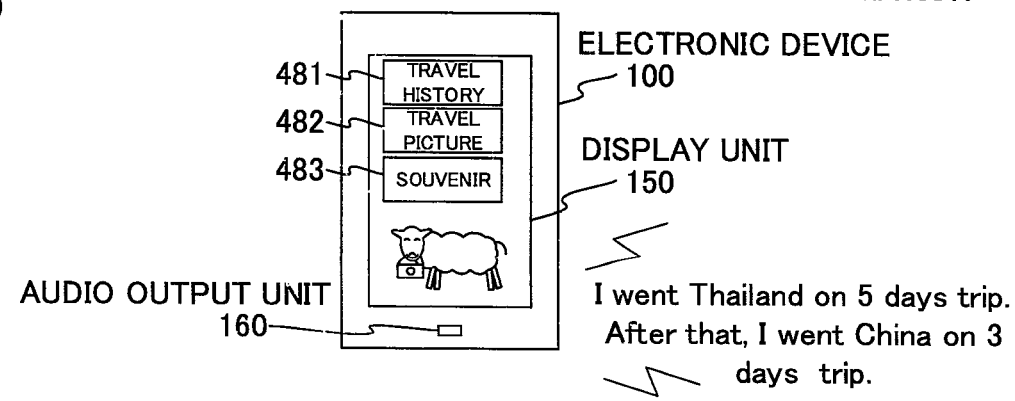
FIG. 31

PROVISION INFORMATION EXAMPLE

| OI | 1ST PROVISION INFORMATION (471) | 2ND PROVISION INFORMATION (472) | 3RD PROVISION INFORMATION (473) | ... |
|---|---|---|---|---|
| OI1 | Get 1kg of grass | Find spring water | Play with friends of sheep | ... |
| ⋮ | ⋮ | ⋮ | ⋮ | ⋮ |
| OIHK9 | Get a camera | Get 10kg of grass | Be trimmed a part of fleece | ... |
| ⋮ | ⋮ | ⋮ | ⋮ | ⋮ |
| OIHL4 | Get a travel bag | Be trimmed a whole fleece | Get 5kg of grass | ... |
| ⋮ | ⋮ | ⋮ | ⋮ | ⋮ |
| OIGF7 | Get a travel tool A | Go to Tokyo Tower on a day trip if having 1kg of grass | Go to Izu for overnight trip if having 5kg of grass | ... |
| ⋮ | ⋮ | ⋮ | ⋮ | ⋮ |
| OIVR4 | Get a travel tool B | Get 3kg of grass | — | — |
| ⋮ | ⋮ | ⋮ | ⋮ | ⋮ |
| OIM | Go to Kusatsu hot spring for overnight trip if having 7kg of grass | Go to China on 3 days trip if having 20kg of grass | Go to Thailand on 5 days trip if having 30kg of grass | ... |

FIG. 32

PROVISION INFORMATION EXAMPLE BY SPECIFIC AREA

| SPECIFIC AREA | OI | AUDIO INFORMATION | IMAGE INFORMATION |
|---|---|---|---|
| — | OI1 | Let's dream longing Santa today. |  |
| | ⋮ | ⋮ | ⋮ |
| | OIM | Spread wings in the wide open sky like bird today. |  |
| AREA A | OI1 | Let's eat a local specialty ○○ of area A. |  |
| | ⋮ | ⋮ | ⋮ |
| | OIM | Let's meet local specialty animal △△ of area A. |  |
| AREA B | OI1 | Let's go to see local specialty □ bridge of area B. |  |
| | ⋮ | ⋮ | ⋮ |
| | OIM | Let's drink local specialty water of area B. |  |
| ⋮ | ⋮ | ⋮ | ⋮ |

FIG. 35

REGISTRATION INFORMATION EXAMPLE

| REGISTRATION NUMBER | DEVICE IDENTIFICATION INFORMATION 751 | POSITIONAL INFORMATION 752 | DEVICE TYPE INFORMATION 753 | IDENTIFICATION INFORMATION 754 | ... |
|---|---|---|---|---|---|
| 1 | OT0730 | LATITUDE○○ LONGITUDE○○ | SMART PHONE | A | ... |
| 2 | OT0741 | LATITUDE○○ LONGITUDE○○ | — | B | ... |
| 3 | OT0742 | LATITUDE○○ LONGITUDE○○ | SMART PHONE | C | ... |
| 4 | OT0743 | LATITUDE○○ LONGITUDE○○ | SMART PHONE | D | ... |
| 5 | OT0744 | LATITUDE○○ LONGITUDE○○ | — | E | ... |
| 6 | OT0745 | LATITUDE○○ LONGITUDE○○ | AI SPEAKER | F | ... |
| ⋮ | ⋮ | ⋮ | ⋮ | ⋮ | ⋮ |
| 26 | OT0599 | LATITUDE○○ LONGITUDE○○ | — | Z | ... |
| 27 | OT08901 | LATITUDE○○ LONGITUDE○○ | TABLET TERMINAL | A | ... |
| ⋮ | ⋮ | ⋮ | ⋮ | ⋮ | ⋮ |

FIG. 44

EXAMPLE THAT SHOWING DISTANCE RELATION OF DEVICES IN PERIPHERY OF ELECTRONIC DEVICE 730

| OI \ PROXIMITY ORDER | #1 | #2 | #3 |
|---|---|---|---|
| OI1 | A | A | A |
| OI2 | A | A | B |
| OI3 | A | A | C |
| OI4 | A | A | D |
| ⋮ | ⋮ | ⋮ | ⋮ |
| OIX1 | B | B | A |
| OIX2 | B | B | B |
| OIX3 | B | B | C |
| OIX4 | B | B | D |
| ⋮ | ⋮ | ⋮ | ⋮ |
| OI(M−1) | Z | Z | Y |
| OIM | Z | Z | Z |

FIG. 45

(1) EXAMPLE THAT SHOWING DISTANCE RELATION OF DEVICES IN PERIPHERY OF ELECTRONIC DEVICE 730

| DEVCIE | ED 741 | ED 742 | ED 743 | ED 744 | ED 745 |
|---|---|---|---|---|---|
| IDENTIFICATION INFORMATION | B | C | D | E | F |
| PROXIMITY ORDER | #3 | #1 | #2 | #5 | #4 |

ED: ELECTRONIC DEVICE (2) EXAMPLE OF DETERMINATION INFORMATION OF DEVICES ARRANGED IN ORDER OF CLOSENESS TO ELECTRONIC DEVICE 730

| PROXIMITY ORDER | #1 | #2 | #3 | #4 | #5 |
|---|---|---|---|---|---|
| IDENTIFICATION INFORMATION | C | D | B | F | E |

(3) EXAMPLE OF SHOWING CORRELATION RELATIONSHIP BETWEEN DEVICES IN PERIPHERY OF ELECTRONIC DEVICE 730 AND PROVISION INFORMATION

| OI \ PROXIMITY ORDER | #1 | #2 | #3 |
|---|---|---|---|
| OI1 | A | A | A |
| OI2 | A | A | B |
| ⋮ | ⋮ | ⋮ | ⋮ |
| OIPP1 | C | D | B |
| ⋮ | ⋮ | ⋮ | ⋮ |
| OIM | Z | Z | Z |

ELECTRONIC DEVICE AND INFORMATION PROCESSING DEVICE

TECHNICAL FIELD

The present invention relates to an electronic device, an information processing device, which use a wireless communication.

BACKGROUND ART

Various electronic devices such as a cellular phone, a smart phone, and a tablet terminal are used all over the world. These electronic devices can output contents such as images, moving images, and music. Further, these electronic devices can perform various communication using wireless communication. Further, contents such as an image, a moving image, a music, and the like can be exchanged. For example, there is a technique of exchanging content between a plurality of devices using wireless communication (for example, JP 2016-96499A).

SUMMARY OF INVENTION

In the prior art, it is possible to exchange content using wireless communication between a plurality of devices. In recent years, there have been many portable communication devices (e.g., a smartphone, a tablet terminal) and a fixed type of communication device (e.g., a smart appliance, an AI (Artificial Intelligence) speaker). For this reason, it is assumed that there are a large number of other devices around the circumference of equipment used by a user (for example, smart phone). In such an environment (an environment in which a plurality of other devices are present around the device used by the user), the device used by the user can perform each process (for example, exchange of contents) using the radio wave output from the device of the communication partner. In addition, in such an environment, a device used by a user receives radio waves from devices other than the device of the communication partner. Therefore, in such an environment, it is considered that, if the processing other than the processing based on the communication with the device of the communication partner can be performed using the radio wave from the device of the communication partner or other devices, the enjoyment of the device used by the user increases.

Accordingly, it is an object of the present invention to provide a device for enjoying a device used by a user by utilizing a relationship with other devices existing in the periphery.

An embodiment of the present invention is an electronic device and an information processing device that determines at least one content to be provided to a user from a plurality of contents based on 1 or more radio waves including radio waves including radio waves output from devices existing in the periphery and not directed to the own device. Further, an embodiment of the present invention is an information processing method and a program for causing a computer to execute at least one content to be provided to the electronic device from among a plurality of contents based on 1 or more radio waves including radio waves output from devices in the periphery and not directed to the electronic device.

Further, an embodiment of the present invention is an electronic device and information processing device for selecting and executing at least one of a plurality of processing which are different from the processing relating to the radio communication based on the radio waves and the processing using the radio communication based on the radio waves based on the radio waves including radio waves output from devices existing in the periphery and not directed to the own device. Further, an embodiment of the present invention is an information processing method and program for causing a computer to execute at least one content to be provided to the electronic device from among a plurality of contents based on 1 or more radio waves including radio waves output from devices existing around the electronic device and not directed to the electronic device, selects at least one processing from among a plurality of processing that is different from the processing relating to a wireless communication based on the radio wave and the processing using a wireless communication based on the radio wave, and causes the electronic device to execute the processing.

In addition, in these cases, the electronic device may determine the content based on the reception strength of the 1 or more radio waves. Further, the electronic device may be configured to determine the content based on a relationship between the number of radio waves received by the electronic device and the reception strength of the radio wave.

In addition, in these cases, the electronic device may determine the content based on information about the device present in the periphery that can be identified based on the 1 or more radio waves. In addition, the information regarding the device may be at least one of a type of the device, a maker of the device, a model number of the device, unique information of the device, and a name given to the device. Further, the electronic device may be configured to determine the content based on a relationship between the number of the radio waves received by the electronic device and information about the devices that output the radio waves.

Further, an embodiment of the present invention is an electronic device and an information processing device that determine at least one content to be provided to a user from a plurality of content based on a relative relationship with a plurality of other devices. According to another aspect of the present invention, there is provided an information processing method and a program for causing a computer to execute at least one content to be provided to an electronic device from a plurality of contents based on a relative relationship between the electronic device and a plurality of other devices.

Further, an embodiment of the present invention is an electronic device and an information processing device that selects and executes at least one process from a plurality of processes which are different from the processes relating to the wireless communication with the other device and the processes using the wireless communication with the other device based on the relative relationship with the plurality of other devices. In addition, an embodiment of the present invention is an information processing method and a program for causing a computer to execute the information processing method to be executed by the electronic device based on a relative relationship between an electronic device and a plurality of other devices, at least one process is selected from a plurality of processes different from the process relating to the wireless communication between the electronic device and the other device and the process using the wireless communication between the electronic device and the other device, and the electronic device is executed.

Further, according to an embodiment of the present invention is the electronic device and the information processing device that are configured to select at least one process from among a plurality of processes which are different from the process relating to wireless communication between the target device and the other devices and the process using wireless communication between the target device and the other devices, and causing the target device to execute the process based on relative relationship between a target device and a plurality of other devices. Further, according to one aspect of the present invention is an information processing method and a program for selecting at least one of the plurality of processes from the plurality of processes that are different from the process relating to the wireless communication between the target device and the other devices and the process utilizing the wireless communication between the target device and the other devices based on the relative relationship between the target device and the plurality of other devices and causing a computer to execute the method.

Note that the relative relationship between the target device and a plurality of other devices (for example, an estimated distance between the target device and another device) can be grasped based on, for example, radio waves output from the respective devices. For example, the relative relationship between the target device and another device can be grasped based on the reception strength of the 1 or more radio waves. Further, based on the relationship between the number of radio waves received by the target device and the reception strength of the radio wave, the relative relationship between the target device and the other device can be grasped.

In addition, it is possible to grasp the relative relationship between the target device and another device based on the information on the device that can be identified based on the 1 or more radio waves. Note that the information regarding the device may be at least one of the type of the device, the manufacturer of the device, the model number of the device, the unique information of the device, and the name given to the device. Further, based on the relationship between the number of radio waves received by the target device and the information about the device that outputs the radio wave, it is possible to grasp the relative relationship between the target device and the other device.

Further, a relative relationship between the target device and another device (for example, a distance between the electronic device and another device) can be grasped based on, for example, positional information about each device.

Effect of the Invention

According to the present invention, it is possible to provide the enjoyment of the device used by the user by utilizing the relationship with other devices existing in the periphery.

BRIEF DESCRIPTION OF DRAWINGS

FIG. 3 is a diagram showing an example of determination information used when the provision information is determined.

FIG. 4 is a diagram showing an example of information provided by an electronic device.

FIG. 5 is a diagram showing an example in which determines the provision information using the radio wave intensity.

FIG. 6 is a diagram showing an example in which determines the provision information using the radio wave intensity.

FIG. 9 is a diagram showing an example of a determination information in which determines the provision information by an electronic device according to the 2nd embodiment.

FIG. 10 is a diagram showing an example in which determines the provision information using the type of another device.

FIG. 11 is a diagram showing an example in which determines the provision information using the type of another device.

FIG. 14 is a diagram showing an example of various kinds of information used when the determines the provision information.

FIG. 15 is a diagram showing an example of various kinds of information used when the determines the provision information.

FIG. 17 is a diagram showing an example of outputting content from an electronic device.

FIG. 19 is a diagram showing an example of various kinds of information used when the provision information is determined.

FIG. 20 is a diagram showing an example of various kinds of information used when the provision information is determined.

FIG. 22 is a diagram showing an example of outputting content from an electronic device.

FIG. 24 is a diagram showing an example of a correspondence relationship between the provision information determined using the determination information.

FIG. 27 is a diagram showing an example of a correspondence relationship between the provision information determined using the determination information.

FIG. 29 is a diagram showing an example of transition of a growing game.

FIG. 30 is a diagram showing an example of a correspondence relationship between the provision information determined using the determination information.

FIG. 31 is a diagram showing an example of a transition of a roaming game.

FIG. 32 is a diagram showing an example of a correspondence relationship between the provision information determined using the determination information.

FIG. 35 is a diagram showing an example of a correspondence relationship between a specific area and the provision information.

FIG. 44 is a diagram showing an example of registration information managed by the server.

FIG. 45 is a diagram showing an example of determination information used when the provision information is determined.

FIG. 47 is a diagram showing an example in which determines the provision information.

DESCRIPTION OF EMBODIMENT

Next, it describes in detail about an embodiment of the invention with reference to drawings.

The 1st Embodiment of the Present Invention: An Example of Determining the Provision Information Based on the Relative Position Relationship with the Other Devices

[An Example of the Communication System]

Figure 1:
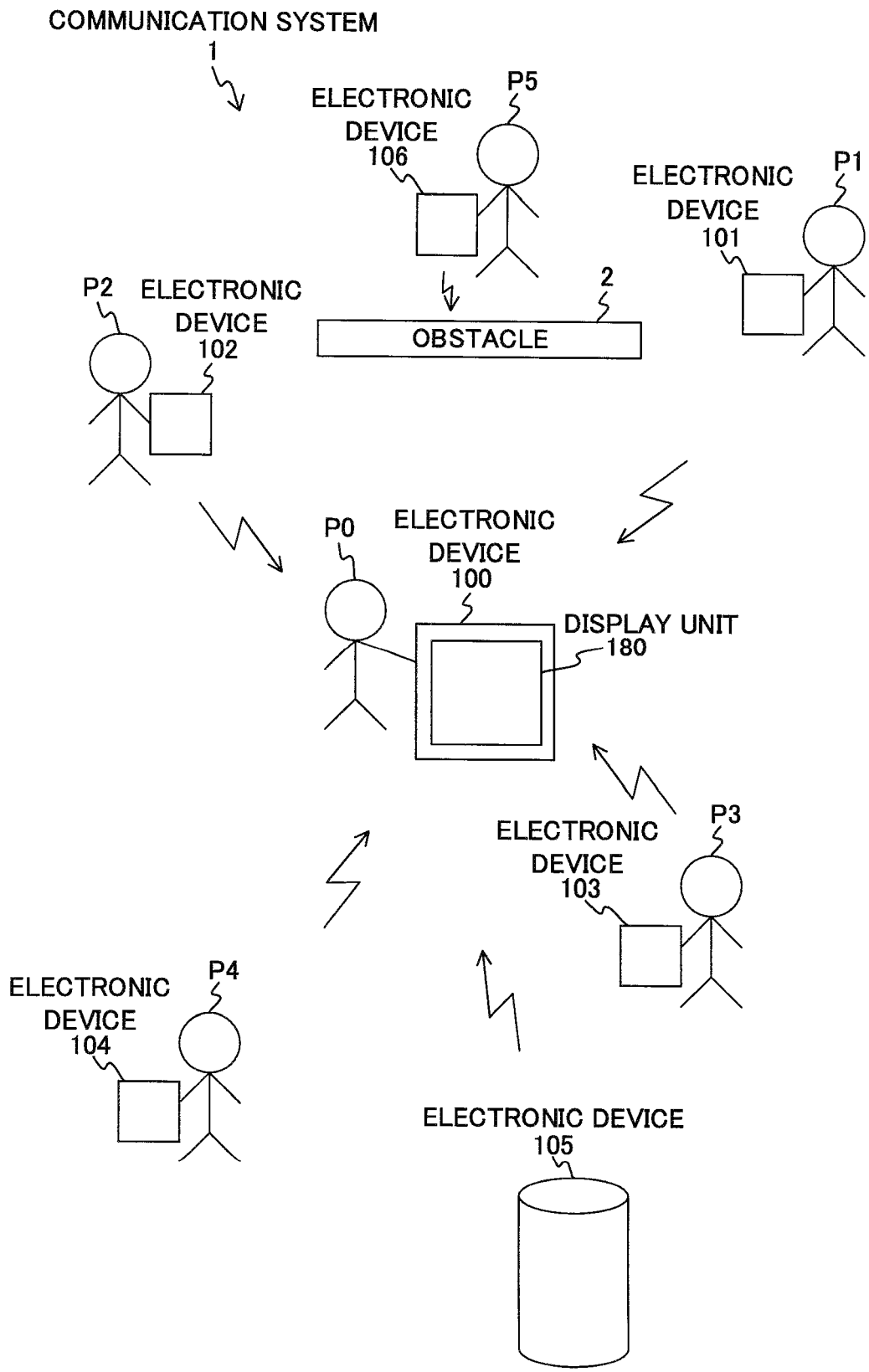
FIG. 1 is a diagram of configuration example of a communication system according to the 1st embodiment.

FIG. 1 is a diagram showing a simplified configuration of a communication system 1 according to the 1st embodiment of the present invention. FIG. 1 shows an example in which each of the electronic devices 100 to 106 has a wireless communication function and can perform wireless communication between the electronic devices 100 to 106. Further, an example in which the electronic device 100-104,106 is carried by the users P 0-P 6 and the electronic device 105 is fixed is shown.

In the communication system 1, the electronic device 100 can receive radio waves output from the other devices (electronic devices 101 to 106). For example, it is assumed that the radio wave intensity output from the electronic device 103 that is present near the electronic device 100 (the reception strength of the electronic device 100) becomes stronger than the radio wave intensity that is output from the other device (the electronic device 101,102,104-106). On the other hand, it is assumed that the radio wave intensity output from the electronic device 106 in which the obstacle 2 exists between the electronic device 100 and the electronic device 106 becomes relatively weak.

Here, it is assumed that each of the electronic devices 100 to 106 can perform at least one of wireless communication of various wireless communication standards for example, a wireless LAN (Local Area Network) (e.g., Wi-Fi (Wireless Fidelity)), a Bluetooth (registered trademark) (IEEE (Institute of Electrical and Electronics Engineers) 802.15.1), ZigBee (IEEE802.15.4), WiMAX, and infrared communication or the like.

Further, each of the electronic devices 100 to 106 may use a public network (for example, 3G (3rd Generation), 4G (4th Generation), 5G (5th Generation), or LTE (Long Term Evolution)) as wireless communication. Note that these are one of an example of wireless communication, and each embodiment may be applied to wireless communication of other wireless communication standards.

In addition, in the 1st embodiment, for ease of explanation, each of the electronic devices 100 to 106 performs wireless communication using a wireless LAN (e.g., Wi-Fi) as wireless communication. In addition, in the 1st embodiment, each of the other devices than the electronic device 100 (electronic devices 101 to 106) is assumed that these can become a parent unit of a wireless LAN. Examples of devices that can be used as the parent unit of the wireless LAN include a wireless LAN router, a public access point, a Mobile router, a wireless device having a tethering function (e.g., a smartphone, a tablet terminal, and a wearable device). Further, a device which can be used as a parent unit of a wireless LAN has an SSID (Service Set Identifier). Note that the SSID is an identifier of an access point defined by the IEEE802.11 standard. Further, the SSID is an identifier such as a device name, a name set by a user, or another character string, and can be displayed on another device. For example, a SSID is displayed as the device name, the name set by the user, or other character string. For this reason, electronic device 100 can display the SSID (e.g., the device name, the name set by the user, and the other character string) of the other devices (electronic devices 101 to 106) on the display unit 150 (shown in FIG. 2). Thus, the user P 0 of the electronic device 100 can visually recognize the SSID of each of the other devices (the electronic devices 101 to 106) (e.g., the device name, the name set by the user, and another character string). Further, the control unit 120 of the electronic device 100 (shown in FIG. 2) can grasp the SSID of each of the other devices (the electronic devices 101 to 106) (e.g., the device name, the name set by the user, and the other character string). For this reason, the control unit 120 of the electronic device 100 can recognize the device name, the name set by the user, the other character string, and the like of the other device (the electronic devices 101 to 106).

In addition, in the 1st embodiment, an example is shown in which the radio wave radio wave intensity (the reception strength of the radio wave output from each of the other devices (electronic devices 101 to 106)) in the electronic device 100 is used. As a method of measuring the radio wave intensity (received radio wave intensity), a known measuring method can be used. For example, a device (e.g., a personal computer, a smartphone, a tablet terminal, or a wearable device) having a wireless communication function of a wireless LAN (e.g., Wi-Fi) has a function of measuring an intensity of a radio wave output from another device and displaying the measurement result and the SSID for each device (for example, a radio wave intensity level is displayed in 5 levels together with an SSID). By this function, it is possible to easily confirm the situation of the wireless LAN environment. By using such a function, it is possible to obtain the radio wave intensity of another device. Note that, for a device which is capable of performing various wireless communication of a plurality of standards, measurement of each radio wave received by each wireless communication function may be performed, or measurement of an electric wave received by at least one wireless communication function (e.g., a wireless communication function of Wi-Fi) may be performed. In this case, a radio communication function for receiving radio waves used for determining the provision information (e.g., a Wi-Fi radio communication function) is used. Further, in the 1st embodiment, an example is shown in which the radio wave intensity level of 5 stages is used, but a radio wave intensity level of 4 or more stages or 6 or more stages may be used.

[An Example of Functional Configuration of an Electric Device]

Figure 2:
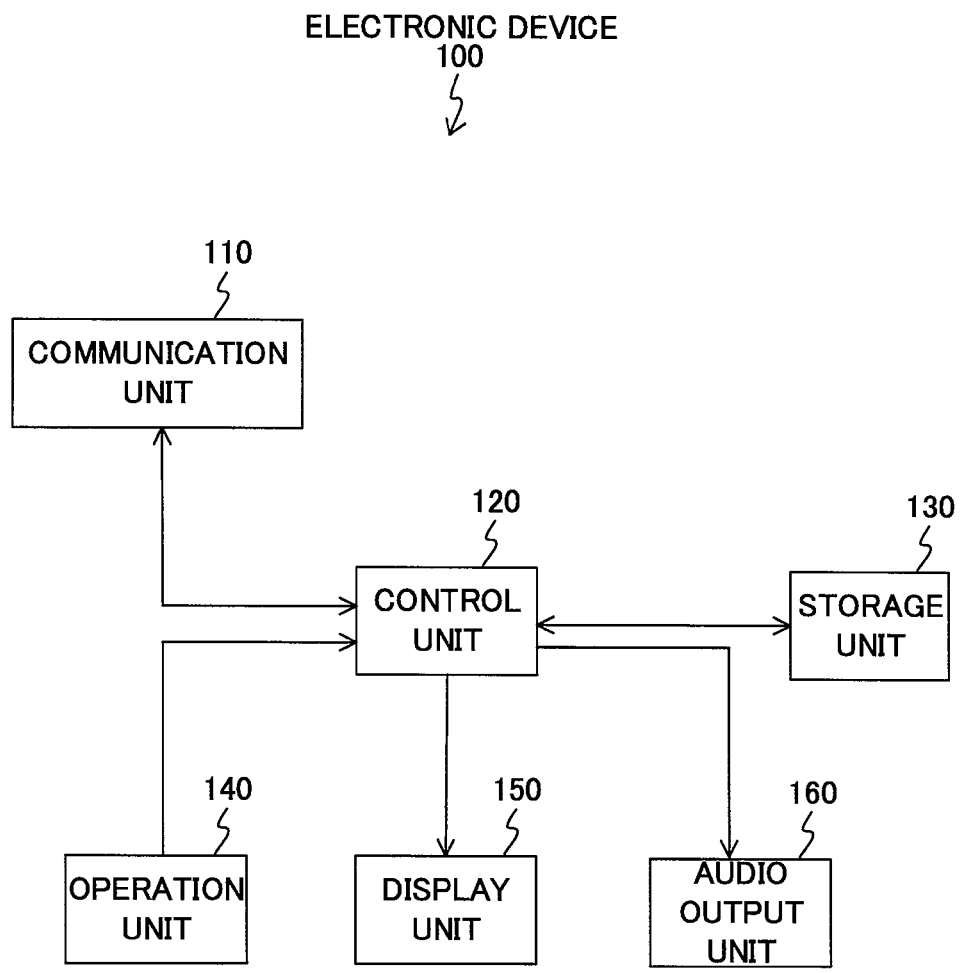
FIG. 2 is a diagram showing an example of functional configuration of an electronic device.

FIG. 2 is a block diagram showing an example of a functional configuration of an electronic device 100 according to the 1st embodiment. The electronic device 100 is, for example, an electronic device such as a smartphone or a tablet terminal, or an information processing device.

The electronic device 100 includes a communication unit 110, a control unit 120, a storage unit 130, an operation unit 140, a display unit 150, and an audio output unit 160. Note that the electronic device 100 may be provided with a built-in or attached battery and the battery may be used as a power source, or a power source from the outside may be used without a built-in battery.

The communication unit 110 exchanges various kinds of information with other devices via a wired line or a wireless line under the control of the control unit 120. For example, when exchanging various kinds of information using wireless communication, the communication unit 110 transmits and receives radio waves via an antenna (not shown). For example, the communication unit 110 can perform at least one wireless communication among wireless communication of various wireless communication standards described above. Note that the communication unit 110 may perform wireless communication with a communication device existing within a predetermined range and may be connected to a predetermined network (e.g., the Internet) via a base station installed in a communication carrier such as a cellular phone company to perform wireless communication. Further, the communication unit 110 is realized by, for example, a communication module having an antenna and having a wireless communication function, or a communication module having a wired communication function.

The control unit 120 controls each unit of the electronic device 100 based on a control program stored in the storage unit 130. For example, the control unit 120 is realized by a CPU (Central Processing Unit). Note that the CPU is a central processing unit (electronic device) comprising a control unit (control circuit) and an arithmetic unit (arithmetic circuit).

The storage unit 130 is a memory for storing various kinds of information. For example, various kinds of information (e.g., a control program, information for determining information to be provided (e.g., determination information shown in FIGS. 3, 9, 14, and 19)) that is necessary for the electronic device 100 to perform various processing are stored in the storage unit 130. In addition, the storage unit 130 stores information (provision information) (e.g., provision information shown in FIG. 4, FIG. 15, FIG. 20, FIG. 24, FIG. 27, FIG. 30, FIG. 32, and FIG. 35) that is provided based on the information (e.g., the determination information shown in FIGS. 3, 9, 14, and 19). Note that the storage unit 130 may be a removable storage unit or a storage unit built in the electronic device 100. In addition, both the removable storage unit and the built-in storage unit may be provided in the electronic device 100.

The operation unit 140 receives an operation input for operating the electronic device 100. For example, the operating unit 140 may be a user interface such as various operating members (e.g., switches, buttons) and a touch panel.

The display unit 150 is a display unit that outputs various kinds of information under the control of the control unit 120. As the display unit 150, for example, a display panel such as an organic EL (Electro Luminescence) panel or an LCD (Liquid Crystal Display) panel can be used. Note that the operation unit 140 and the display unit 150 can be integrally configured using a touch panel that allows a user to input an operation when the user touches or approaches the finger. However, the operation unit 140 and the display unit 150 may be configured separately, and the operation unit 140 may be configured to receive an operation using an operation member. Further, an operation member other than a user interface such as a touch panel may be provided, and an operation may be received by the operation member. Further, it is also possible to use a user interface that projects an image corresponding to an operation unit onto a wall or the like and uses the image (e.g., a user designates) to perform an operation.

The sound output unit 160 is a sound output unit (e.g., a speaker) that outputs various sounds under the control of the control unit 120.

[An Example of Determination Information for Determining Provision Information Using Radio Wave Intensity Output from Other Devices]

FIG. 3 is a diagram showing an example of the determination information (table) used when the provision information is determined based on the radio wave state in the electronic device 100 in the 1st embodiment. The determination information shown in FIG. 3 is information indicating a correspondence relationship between the radio wave state of the electronic device 100 and the provision information OI. This determination information is stored in the storage unit 130. Further, the radio wave intensity described in each embodiment means the radio wave intensity (the radio wave intensity received at the receiving device side) on the device (receiving device side) that receives the radio wave.

In FIG. 3, the radio wave intensity order #1, . . . , #6 is a value indicating the order of the device having a strong radio wave intensity among the radio wave intensity (radio wave output from another device) received by the electronic device 100. Further, the determination information (table) shown in FIG. 3 is information in which a plurality of patterns in the case where radio wave intensity of each device is arranged in the radio wave intensity order and provision information OI (OI 1 to OIM (where M is a positive integer)) are associated. For example, when the electronic device 100 has not received any radio wave from another device, since all of the intensities of the radio waves received by the electronic device 100 are "0", OI 1 is determined as the provision information OI. Further, for example, when the electronic device 100 receives radio waves only from 1 device and the strength of the received radio wave is "1", the OI 2 is determined as the provision information OI. Further, for example, when the electronic device 100 receives radio waves from 6 or more devices and radio waves from at least 6 devices are "5", OIM (where M is a positive integer) is determined as the provision information OI. Note that the combination of the characters and numbers (e.g., OIX 1 to OIX 3 shown in FIG. 3 and OIY 1 and OIY 2 shown in FIG. 4) attached to the provision information OI shown in each embodiment will be described. For ease of explanation, information to be applied to identify the provision information OI is used, and the order of the provision information OI is not defined by these characters and numbers. As described above, in the determination information shown in FIG. 3, all combinations (patterns) of radio wave intensity order #1-#6 and radio wave intensity 0-5 of each device (where 0 is not received) are defined. For example, a pattern "0,0,0,0,0,0" of "0" is defined in the provision information OI 1. In addition, a pattern "1,0,0,0,0,0" is defined in the provision information OI 2, one of which is "1" and all of which is "0". In addition, a pattern "1,1,0,0,0,0" is defined in which 3 is "1" and all others are "0" in the provision information OI 2. Similarly, a pattern "5,5,5,5,5,5" of "5" is defined in the provision information OIM.

Note that, in the 1st embodiment, an example is shown in which the order of the radio wave intensity level (#1 to #6) is used, but the order of 5 or more or the order of 7 or less may be used in the 6th embodiment. Further, the number of radio wave intensity orders may be set in advance, and a user's preference value may be set by user operation.

Further, the value of M is determined based on the number of radio wave intensity orders and a value representing the radio wave intensity (in the 1st embodiment, 1 to 5). For example, when the number of radio wave intensity orders is 3 and a value representing the radio wave intensity is 1, 2 (0 if there is no device), it is determined to be 10. Further, for example, when the number of radio wave intensity orders is 3 and a value representing the radio wave intensity is 1 to 3 (0 when there is no device), it is determined to be 20. Further, when the number of radio wave intensity orders is 6 and a value representing the radio wave intensity is 1 to 5 (0 when there is no device), it is determined to be 463. However, depending on the number of radio wave intensity orders and a value indicating the radio wave intensity, it is assumed that the value of M becomes too large and provision information (e.g., audio information 11 and image information 12 shown in FIG. 4) cannot be prepared. Therefore, when the value of M is larger than the number of the provision information (e.g., audio information 11 and image information 12 shown in FIG. 4), the same information (audio information 11 and image information 12) may be assigned to different information (provision information OI).

A Provision Information Example

FIG. 4 is a diagram showing an example of information (provision information) provided by the electronic device 100 according to the 1st embodiment. Specifically, an example of the correspondence relationship between the provision information OI determined using the determination information shown in FIG. 3 and the provision information (audio information 11 and image information 12) is shown. This provision information is stored in the storage unit 130.

For example, if OI 1 is determined as the provision information OI, information relating to the Santa-related information (voice information 11, image information 12) is to be provided. Information relating to the Santa-related information is, for example, information (audio information 11) for outputting audio of "Let's dream longing Santa today" or information (image information 12) for displaying a picture or a graphic image of a Santa. In FIG. 4, for ease of explanation, a character to be subjected to audio output and an image to be displayed are simply shown. Note that these provision examples will be described with reference to FIG. 7. Further, in FIG. 4 the audio information 11 and the image information 12 are taken as examples as the provision information, but one of the audio information 11 and the image information 12 may be provided as the provision information. Further, information other than audio information and image information (e.g., smell information, taste information, and tactile information) may be used as the provision information. Further, information (e.g., coupon, favorite, or point) giving some preference to the user may be provided as the provision information.

[An Example of Determining the Provision Information Using the Radio Wave Intensity Output from the Other Device]

FIG. 5 and FIG. 6 are diagrams illustrating an example in which the electronic device 100 according to the 1st embodiment determines the provision information using the radio wave intensity output from another device. FIG. 5 and FIG. 6 show an example of determining the provision information using the radio wave intensity output from the electronic devices 101 to 106 shown in FIG. 1.

In FIG. 5 (1), an electronic device 100 is shown in the order of magnitude of the electric waves received from the electronic devices 101 to 106 in the order of the electronic devices 101 to 106. In the 1st embodiment, the radio wave intensity is indicated by a bar graph corresponding to a numerical value of 5 levels (a black bar of 5 bars indicates the intensity (5 is the strongest and 1 is the lowest)). In FIG. 5 (1), the name of the electronic devices 101-106 is shown in an upper stage, a bar graph shows the radio field intensity of each device to a middle stage, and the ranking of the radio field intensity of each device is shown in a lower stage.

For example, the radio wave intensity received by the electronic device 100 from the electronic device 101 is "2", the radio wave intensity received by the electronic device 100 from the electronic device 102 is "4", and the radio wave intensity received by the electronic device 100 from the electronic device 103 is "5". The radio wave intensity received by the electronic device 100 from the electronic device 104 is "3", the radio wave intensity received by the electronic device 100 from the electronic device 105 is "2", and the radio wave intensity received by the electronic device 100 from the electronic device 106 is "1". In this case, the electronic device 102 having the radio wave intensity "5" becomes the 1 position (#1) in the radio wave intensity order, and the electronic device 103 having the radio wave intensity "4" becomes the 2 position (#2) in the radio wave intensity order. The electronic device 106 having the radio wave intensity "3" becomes 3 (#3) in the radio wave intensity order, the electronic devices 104 and 105 having the radio wave intensity "2" become 4 and 5 (#4 and 5) in the radio wave intensity order, and the electronic device 101 having the radio wave intensity "1" becomes 6 (#6) in the radio wave intensity order.

FIG. 5 (2) shows the radio wave intensity of the electronic devices 101 to 106 in the case of arranging in the radio wave intensity order shown in the lower stage of FIG. 5 (1). Note that, since information for identifying the electronic devices 101 to 106 is not used hereinafter, codes for identifying the electronic devices 101 to 106 are omitted.

FIG. 5 (3) shows an example of extraction in a case where the radio wave intensity corresponding to the radio wave intensity (5,4,3,2,2,1) shown in FIG. 5 (2) is extracted from the determination information shown in FIG. 3. Note that the determination information shown in FIG. 5 (3) is the same as that shown in FIG. 3, and in FIG. 5 (3), a part of the determination information shown in FIG. 3 is omitted. In addition, in FIG. 5 (3), an electric field intensity which coincides with the electric field intensity (5,4,3,2,2,1) shown in FIG. 5 (2) is shown in the rectangle 13.

FIG. 6 shows an example of extraction when the audio information 11 and the video information 12 associated with the OIX 1 determined as the provision information OI are extracted using the determination information shown in FIG. 5 (3). Note that the provision information shown in FIG. 6 is the same as the provision information shown in FIG. 4. In addition, in FIG. 6, audio information 11 and video information 12 associated with OIX 1 are shown in dashed rectangle 14.

Here, each process until the electronic device 100 determines the audio information 11 and the image information 12 (within the rectangular rectangle 14) shown in FIG. 6 will be described. First, the control unit 120 of the electronic device 100 measures the intensity (radio wave intensity) of the radio wave from another device received by the communication unit 110. In this case, the control unit 120 of the electronic device 100 measures the radio wave intensity of both of the radio wave addressed to the own device (addressed to the electronic device 100) and the radio wave directed to the device itself (addressed to the electronic device 100). For example, as shown in FIG. 5 (1), the measurement result (radio wave intensity level) of the radio wave intensity from another device can be grasped in 5 stages. Then, the control unit 120 of the electronic device 100 stores the radio wave intensity level (step 5) for each device. Next, the control unit 120 of the electronic device 100 determines the order of the radio wave intensity levels (5 levels) for the plurality of devices at a predetermined timing (for example, at a timing satisfying the provision condition of Step S201 shown in FIG. 8) (Step S202) of the electronic device 3. For example, as shown in the lower stage of FIG. 5 (1), the order of each radio wave intensity is determined. In addition, in the 1st embodiment, an example is shown in which the provision information OI is determined using a radio wave that is not at least addressed to the own device (addressed to the electronic device 100) out of a plurality of radio waves (radio waves addressed to the device (addressed to the electronic device 100) and to the device (addressed to the electronic device 100)). For example, when the electronic device 100 is performing wireless communication with the electronic device 105 the provision information OI can be determined using a radio wave (radio wave addressed to the device itself) output from the electronic device 105 and another radio wave (radio wave not addressed to the device itself). Further, for example, when the electronic device 100 does not perform wireless communication with other devices (for example, when the electronic device 100 is in a standby state), it is possible to determine the provision information OI using 1 or more radio waves (radio waves not addressed to the device) that can be received. Further, the provision information OI may be determined using only the radio wave (1 or more) addressed to the own device (for the electronic device 100).

Next, the control unit 120 of the electronic device 100 determines the provision information OI based on the relationship between the radio wave intensity and the order of the radio wave intensity. For example, when the radio wave intensity of the electronic devices 101 to 106 is the radio wave intensity level shown in (1) and (2) of FIG. 5 the radio wave intensity which is corresponding to the radio wave intensity (5, 4, 3, 2, 2, 1) (within a rectangular rectangle 13 shown in FIG. 5 (3)) is extracted from the determination information shown in FIG. 5 (3), and the provision information OI is determined as OIX 1. Then, the control unit 120 of the electronic device 100 outputs the audio information 11 associated with the OIX 1 determined as the provision information OI and the image information 12 (within the rectangular rectangle 14 shown in FIG. 6).

For example, the control unit 120 of the electronic device 100 causes the audio output unit 160 to output audio based on the audio information 11 stored in the storage unit 130 in association with the OIX 1 determined as the provision information OI. Further, the control unit 120 of the electronic device 100 displays the display unit 150 on the basis of the image information 12 stored in the storage unit 130 in association with the OIX 1 determined as the provision information OI. Output processing of audio information and image information (content output processing), based on radio waves (1 or more radio waves including radio waves not addressed to the own device) output from a device existing around the electronic device 100, performs processing relating to the radio communication based on the radio wave and the radio communication based on the radio wave. (For example, a process of exchanging content with a partner device, a process of performing various operations based on control information from a partner device, and a process of transmitting control information to the partner device, and the like) are used. The processing is executed by selecting at least one of a plurality of processing (an output processing of a content corresponding to an OIX 1) from a plurality of processing different from a processing of causing an opposite device to execute various operations based on the control information (an output processing of a content corresponding to an OIX 1). Note that this provision example is shown in FIG. 7.

[An Output Example of Contents from the Electronic Device]

Figure 7:
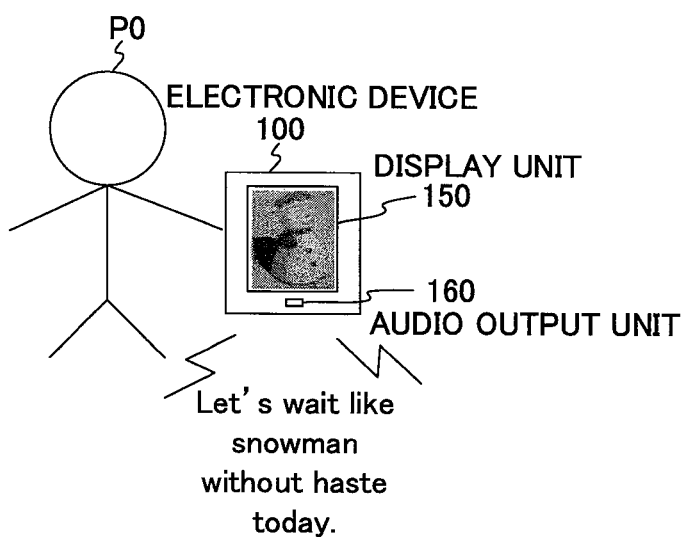
FIG. 7 is a diagram showing an example of outputting information provided by an electronic device.

FIG. 7 is a simplified diagram showing an example of the case where provision information (content) is output from the electronic device 100 according to the 1st embodiment. In addition, the example shown in FIG. 7 shows an example of outputting the provision information (content) determined by the example shown in FIG. 5 and FIG. 6.

As described above, the control unit 120 of the electronic device 100 causes the audio output unit 160 to output an audio of "Let's wait like snowman without haste" based on the audio information 11 (within the rectangular rectangle 14 shown in FIG. 6) associated with the OIX 1. Further, the control unit 120 of the electronic device 100 causes the display unit 150 to display an image of a snowy on the basis of the image information 12 (within the rectangular rectangle 14 shown in FIG. 6) associated with the OIX 1.

Thus, the user P 0 carrying the electronic device 100 can enjoy the output of the content determined based on the relationship between the electronic device 100 and other devices existing in the vicinity of the electronic device 10. In addition, for example, when the user P 0 moves or a user who owns another device moves, there is a possibility that content to be provided may change, and thus, it is possible to enjoy the output of the content having unexpectedness.

Further, since only the radio wave intensity received from another device is used and information identifying another device or its user is not used, it is not necessary to use the personal information of the user who owns the other device. Therefore, it is possible to easily use the service described in the 1st embodiment.

[An Operation Example of Providing Information]

Figure 8:
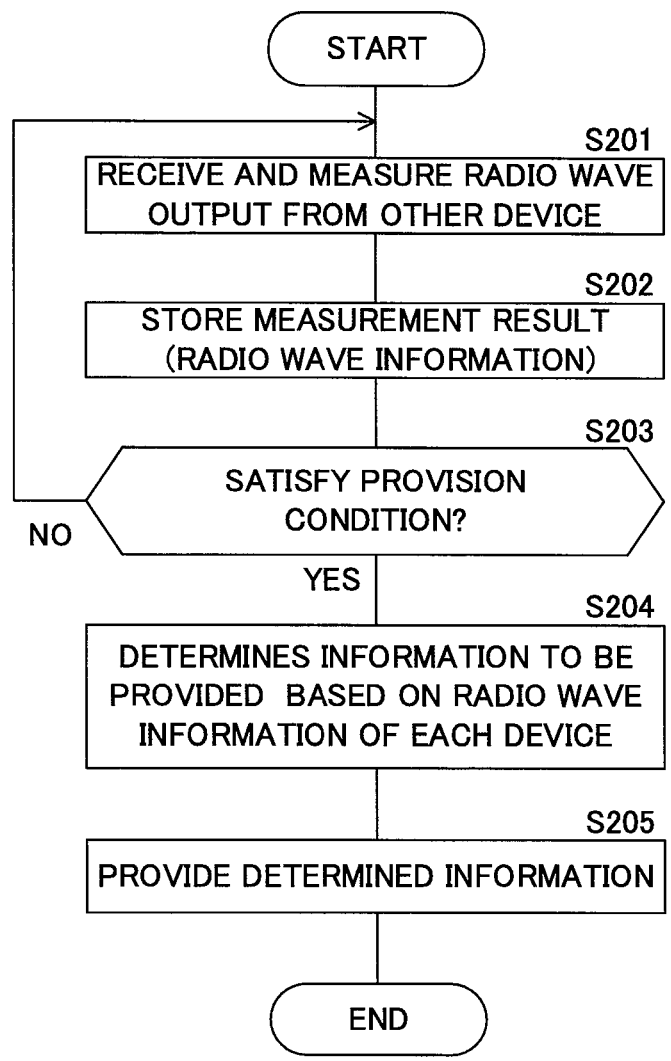
FIG. 8 is a diagram showing an example of an information provision process performed by an electronic device.

FIG. 8 is a flowchart showing an example of an information provision output process performed by the electronic device 100 according to the 1st embodiment. FIG. 8 shows an operation example in which, after the power of the electronic device 100 is turned on by operation of the operation unit 140, information is provided when the provision condition is satisfied.

First, the control unit 120 of the electronic device 100 measures the radio wave received by the communication unit 110 and acquires the radio wave information (for example, the radio wave intensity) (Step S201). Then, the control unit 120 of the electronic device 100 causes the storage unit 130 to store the acquired radio wave information for each device (Step S202). This radio wave information acquisition process may be performed periodically or irregularly.

Next, the control unit 120 of the electronic device 100 determines whether or not the provision condition is satisfied (Step S203). And when provision conditions are not satisfied, it returns to Step S201, and when provision conditions are satisfied, it proceeds to Step S204.

Here, as a determination criterion for determining whether or not the provision condition is satisfied, for example, whether a predetermined time has elapsed or not, whether desired provision information (e.g., desired content) can be determined as a provision target or not, and whether a predetermined user operation (e.g., a pressing operation of a content output button) has been performed or not can be used. Note that the predetermined time period can be determined based on, for example, an elapsed time after the power of the electronic device 100 is turned on or an elapsed time after lastly providing information (provision information) is provided after the power of the electronic device 100 is turned on. Further, a predetermined time may be set as a preset time, or a time corresponding to a user's preference may be set by a user operation.

If the provision condition is satisfied (Step S203), the control unit 120 of the electronic device 100 determines the information to be provided based on the radio wave information held in the storage unit 130 (Step S204). For example, the control unit 120 of the electronic device 100 determines the content to be provided based on the radio wave intensity of each devices which is held in the storage unit 130 (Step S204). Specifically, for example, the control unit 120 of the electronic device 100 determines the provision information OI based on the relationship between the radio wave intensity and the order of the radio wave intensity. For example, if the radio wave intensity of the electronic devices 101 to 106 is the radio wave intensity level shown in (1) and (2) of FIG. 5, radio wave intensity corresponding to the radio wave intensity (5,4,3,2,2,1) (In a rectangle 13 shown in FIG. 5 (3)) is extracted from the information shown in FIG. 5 (3) and the provision information OI is determined as OIX 1.

Next, the control unit 120 of the electronic device 100 provides the information determined as a providing object (Step S205). For example, the control unit 120 of the electronic device 100 makes the contents determined as a providing object output (Step S205). For example, as shown in FIG. 7, the control unit 120 of the electronic device 100 outputs the audio information 11 and the image information 12 (within the rectangular rectangle 14 shown in FIG. 6) that are associated with the OIX 1 determined as the provision information OI.

Thus, the electronic device 100 (the control unit 120) can determine at least one content to be provided to the user from among the plurality of contents based on the radio waves (1 or more radio waves including radio waves not addressed to the device) output from the devices existing in the surroundings (for example, the electronic devices 101 to 106). Specifically, the electronic device 100 (control unit 120) can determine at least one content to be provided to the user from the plurality of contents based on the reception intensity of the radio wave (1 or more radio waves including radio waves not addressed to the own device) output from the device (e.g., the electronic device 101 to 106) existing in the periphery. Further, in particular, the electronic device 100 (control unit 120) has a relationship between the number of radio waves received by the electronic device 100 and the reception intensity of the radio wave. On the basis of (for example, a pattern of the radio wave intensity order of the determination information shown in FIG. 3), at least one content to be provided to the user from the plurality of contents can be determined based on a plurality of patterns (e.g., a pattern of the radio wave intensity order of the determination information shown in FIG. 3).

In addition, the electronic device 100 (control unit 120) is possible to select and execute at least one process (e.g., an output process of content corresponding to the provision information OIX 1) from among plurality of processes which is different from the processes relating to radio communication based on the radio wave and the processes using radio communication based on the radio wave (e.g., an output processes of the content corresponding to the provision information OI 1-OIM) based on the radio wave (1 or a plurality of radio waves including radio waves not addressed to the own device) output from the devices (e.g., the electronic devices 101 to 106) existing in the periphery. Specifically, the electronic device 100 (control unit 120) can select and execute at least one processing from among a plurality of processing different from the processing relating to radio communication based on the radio wave and the processing using radio communication based on the radio wave based on the received radio waves intensity (1 or a plurality of radio waves including radio waves not directed to the own device) output from the devices (e.g., the electronic devices 101 to 106) existing in the vicinity. Further, specifically, the electronic device 100 (control part 120) can select and execute at least one processing from among a plurality of processing different from the processing relating to radio communication based on the radio wave and the processing using radio communication based on the radio wave based on the relation between the number of radio waves which the electronic device 100 (the control unit 120) received and radio wave intensity (for example, a plurality of patterns at the time of arranging the radio field intensity of each device in order of radio field intensity) (e.g., a pattern of the radio wave intensity order of the determination information shown in FIG. 3)) (1 or a plurality of radio waves including radio waves not directed to the own device) output from the devices (e.g., the electronic devices 101 to 106) existing in the vicinity."

Further, the electronic device 100 (control unit 120) may determine at least one content to be provided to a user from a plurality of contents based on a relative relationship with a plurality of other devices (for example, the electronic devices 101 to 106) (for example, a distance from each device estimated by the received radio wave intensity). In case of estimating a distance from each device based on the received radio wave intensity, a table indicating a relationship between the received radio wave intensity and the distance is stored beforehand, and the distance between each device and each device can be estimated using this table.

As described above, the electronic device 100 (control unit 120) can determine the information to be provided from the plurality of pieces of information on the basis of the radio wave output from the plurality of devices (e.g., the electronic devices 101 to 106) existing in the periphery. In addition, the electronic device 100 (control unit 120) can select at least one of the plurality of processes based on the radio wave output from the plurality of devices (e.g., the electronic devices 101 to 106) existing in the vicinity. That is, the electronic device 100 (control unit 120) can determine the information to be provided from the plurality of pieces of information on the basis of the received radio wave intensity output from the plurality of devices (for example, the electronic devices 101 to 106) existing in the vicinity. Further, the electronic device 100 (control unit 120) can select and execute at least one process from among a plurality of processes based on the received radio waves intensity output from the plurality of devices (e.g., the electronic devices 101 to 106) existing in the vicinity.

Further, the electronic device 100 (control unit 120) can select and execute at least one process (e.g., output process of content corresponding to the provision information OIX 1) based on at least a plurality of received radio waves intensity (radio waves addressed to the own device and radio waves not addressed to the device) output from a plurality of devices (e.g., electronic devices 101 to 106) existing in the periphery. From among a plurality of processes (e.g., output process of content corresponding to the provision information OI 1-OIM).

Also, the electronic device 100 (control unit 120) perform a process (for example, an output process of contents corresponding to the provision information OI 1 to OIM) based on the received radio waves intensity output from a plurality of devices existing in the periphery (for example, the electronic devices 101 to 106). And this process is not related to the process of the information exchanged by the radio communication based on the radio wave.

Also, the electronic device 100 (control unit 120) can select and execute at least one process from among a plurality of processes (e.g., output process of content corresponding to the provision information OI 1-OIM) based on a relative relationship with a plurality of devices (e.g., a distance from each device estimated by the received radio wave intensity) when the electronic device 100 specified based on the reception of the radio wave intensity output from a plurality of devices (e.g., electronic devices 101 to 106) existing in the periphery is used as a reference.

The 2nd Embodiment: An Example of Providing Information Using the Type of Other Devices In the 1st embodiment, while the example of determining the provision information using the radio wave intensity of other devices has described, it is also possible to use other information than the radio wave intensity. Accordingly, in the 2nd embodiment, the provision information is determined using the type of the other device. Note that the 2nd embodiment is a modification of the 1st embodiment, and part of the description of the 1st embodiment is omitted.

[An Example of the Determination Information for Determining Provision Information Using the Type of Devices]

FIG. 9 is the figure showing an example of determination information used when determining provision information by the electronic device 100 in the 2nd embodiment. This determination information is stored in the storage unit 130.

FIG. 9 shows an example of the determination information (table) used when the provision information is determined based on the radio wave state of the electronic device 100 and the type of the other devices. In addition, the determination information shown in FIG. 9 is information indicating a correspondence relationship between the radio wave state in the electronic device 100, the type of another device, and the provision information OI from the electronic device 100.

In the determination information shown in FIG. 9, instead of a numerical value indicating the radio wave intensity, a type of another device is used. Note that of the determination information shown in FIG. 9, the radio wave intensity order #1, . . . , #6 and the provision information OI are the same as those shown in FIG. 3. In other words, the determination information (table) shown in FIG. 9 is information in which a plurality of patterns in which the type of each device is arranged in the radio wave intensity order and a provision information OI (OI 1 to OIM (where M is a positive integer)) are associated with each other.

For example, when the electronic device 100 has not received any radio wave from another device, since all of the intensities of the radio waves received by the electronic device 100 are "0", OI 1 is determined as the provision information OI. Further, for example, when the electronic device 100 receives only radio waves from 1 device and the device that has transmitted the radio wave is "Smartphone (Smartphone)", OI 2 is determined as the provision information OI. Further, for example, when the electronic device 100 receives radio waves from 6 or more devices and the upper 6 devices having strong radio wave intensity are "portable (portable telephone)", OIM is determined as the provision information OI. Thus, the judgment information shown in FIG. 9 is defined as all combination (pattern) of radio wave intensity ranking #1-#6 and classification (however, 0 means the case where receivable devices does not exist) of each device. For example, a pattern of all "0" that is "0,0,0,0,0,0" is defined in the provision information OI 1. Further, as for the provision information OI 2, "Smartphone, 0 0 0 0 0" is defined as the pattern that one of these is "Smartphone" and all of others are "0". Further, a pattern of "Smartphone, smartphone, 0 0 0 0" is defined as the pattern that 2 of these are "Smartphone" and others are "0" for the provision information OI 3. In the same way, the same definition is defined, and "portable, portable, portable, portable, portable, portable" patterns which is all "portable" pattern are defined in the provision information OIM.

Note that, in the 2nd embodiment, an example is shown in which the order of the radio wave intensity level (#1 to #6) is used, but the order of 5 or more or the order of 7 or less may be used. Further, the number of radio wave intensity orders may be set in advance, and a user's preference value may be set by user operation.

Here, as for the type of the model, a known acquisition method can be used. As described above, for example, a device (e.g., a personal computer, a smartphone, a tablet terminal, or a wearable device) having a wireless communication function of a wireless LAN (e.g., Wi-Fi) is provided. There is a device which has a function of measuring an intensity of a radio wave output from another device and displaying the measurement result and the SSID for each device (for example, a radio wave intensity level is displayed in 5 levels together with an SSID). On the basis of the acquired SSID for each device, it is possible to obtain the model (or name, manufacturer name, or model number) of each device. For example, information (e.g., information linking the device name and the model) capable of specifying a model of each device based on an SSID (e.g., device name, name set by the user) is stored in the storage unit 130. Then, the control unit 120 can specify a model of the device corresponding to the SSID based on the acquired SSID (for example, a device name and a name set by the user).

In addition, for example, information exchanged by a wireless LAN (e.g., Wi-Fi) (e.g., a MAC (Media Access Control) frame) is contained a source address (e.g., a source MAC address) and a destination address (e.g., a destination MAC address). Note that the MAC address includes a manufacturer code, a product number, and a value unique to the device. For this reason, it is possible to obtain information on the manufacturer and the model of the source device based on the MAC address of the source.

Also, as for the model of devices, other than the "smart phone", "portability (mobile phone)", "tablet terminal", "AI (Artificial Intelligence) speaker", "PC (Personal Computer)" which are shown in FIG. 9, for example, a wireless LAN router, a terminal adapter, a game device, various home appliances, various AV devices, and a femtocell can be used. Note that, as for the type of the device, all of the types of devices described above may be used, or they may be classified according to some rule and used. For example, it may be classified into a portable device (e.g., a smartphone, a tablet terminal, a game device), a stationary device (e.g., a terminal adapter, an AI speaker, a personal computer, various home appliances, various AV devices, and a femtocell). As a model of the device, a "portable device" and a "stationary device" can be used.

Further, as for the model of the device, only the device that can be identified from the received radio wave may be grasped, and the device that cannot be identified by the type may be classified into categories such as "others" and used.

Although, in the 2nd embodiment, the provision information is determined using the type of the device that can be identified based on the received radio wave, the provision information may be determined using other information that can be specified based on the received radio wave. For example, if the name, manufacturer name (e.g., manufacturer, sales company), model number, and the like of another device can be identified based on the received radio wave, the respective information can be used. Further, for example, when a plurality of pieces of information (e.g., more than 2 of a name, a maker name (e.g., a manufacturer, a sales company), or a model number) of another device can be identified based on the received radio wave, a combination of the respective pieces of information can be used.

Further, the value of M is determined based on the number of radio wave intensity orders and the number of model of device. For example, when the number of radio wave intensity orders is 3 and the number of model of device is 2 (for example, 0 when a device is a portable device or no device exist), it is determined to be 13. However, depending on the number of radio wave intensity orders and the number of model of device, it is assumed that the value of M is too large to provide provision information (e.g., audio information 11 and image information 12 shown in FIG. 4). Therefore, when the value of M is larger than the number of the provision information (e.g., audio information 11 and image information 12 shown in FIG. 4), the same information (audio information 11 and image information 12) may be assigned to different information (provision information OI).

[An Example of Determining Provision Information Using Model of Other Device]

FIG. 10 and FIG. 11 are diagrams showing an example of a case where the electronic device 100 according to the 2nd embodiment determines the provision information using the type of the other device which has received the radio wave. In the examples shown in FIGS. 10 and 11, the radio wave intensities output from the electronic devices 101 to 106 is the same as that shown in FIGS. 5 and 6.

FIG. 10 (1) shows the radio wave intensities received from the electronic devices 101 to 106 by the electronic device 100 and the model of each device in the order of the electronic devices 101 to 106. Note that in each information shown in FIG. 10 (1), information other than the lowermost "model" is the same as that shown in FIG. 5 (1). Further, for ease of explanation, the "model" of the lowermost stage representing the model of the device is indicated simply by characters representing the respective devices.

For example, a model of the electronic devices 101 to 103 is "smartphone", a model of the electronic device 104 is "tablet terminal", a model of the electronic device 105 is "AI speaker", and a model of the electronic device 106 is "PC (personal computer)". Note that the radio wave intensities of the electronic devices 101 to 106 are the same as those shown in FIG. 5 (1).

FIG. 10 (2) shows the radio wave intensity of the electronic devices 101 to 106 and the model of the device when they are arranged in the order of "radio wave intensity order" shown in FIG. 10 (1). Of the information shown in FIG. 10 (2), information other than the lowermost "model" is the same as that shown in FIG. 5 (2). In addition, since information for identifying the electronic devices 101 to 106 is not used, a code for identifying the electronic devices 101 to 106 is omitted. When a plurality of devices having the same radio wave intensity exist, the order of each device can be determined based on a predetermined rule (for example, an order in which a radio wave is received and an order in which a radio wave intensity is small). In the example shown in FIG. 10, since the radio wave intensities of the electronic devices 101 and 105 are the same, the electronic device 101 is set to the 4 position and the electronic device 105 is set to the 5 position.

FIG. 10 (3) shows an example of an extraction in which a model of each device (smartphone, smartphone, tablet terminal, smartphone, AI speaker, PC) is extracted from the determination information shown in FIG. 10 (2) when the model matches the model of each device (smartphone, smartphone, tablet terminal, smartphone, AI speaker, PC) shown in FIG. 9. Note that the determination information shown in FIG. 10 (3) is the same as that shown in FIG. 9, and in FIG. 10 (3), a part of the determination information shown in FIG. 9 is omitted. Further, in FIG. 10 (3), within the determination information shown in FIG. 9, the arrangement of the devices that match the model (smartphone, smartphone, tablet terminal, smartphone, AI speaker, PC) of each device with being arranged in the order of "radio wave intensity order" shown in FIG. 10 (2) is shown in a rectangle 15 indicated by a broken line.

Here, each process until the electronic device 100 determines the audio information 11 and the image information 12 (within the rectangle 14 indicated by a broken line) shown in FIG. 6 will be described. First, the control unit 120 of the electronic device 100 measures the intensity (radio wave intensity) of the radio wave from another device received by the communication unit 110. For example, as shown in FIG. 10 (1), the measurement result (radio wave intensity level) of the radio wave intensity from another device can be grasped in 5 levels. Further, the control unit 120 of the electronic device 100 acquires the type of the device that has transmitted the radio wave based on the information included in the received radio wave. Then, the control unit 120 of the electronic device 100 stores the radio wave intensity level (5 levels) and the type of the device for each device. Next, the control unit 120 of the electronic device 100 determines the order of the radio wave intensity levels (5 levels) for the plurality of devices.

Next, the control unit 120 of the electronic device 100 determines the provision information OI based on the relationship between the type of each device and the order of the radio wave intensity. For example, when the radio wave intensity and type of the electronic devices 101 to 106 are the radio wave intensity level and the type shown in (1) and (2) of FIG. 10, the type of the device that matches the type of the device arranged in the order of the radio wave intensity (smartphone, smartphone, tablet terminal, smartphone, AI speaker, PC) (in the rectangular rectangle 15 shown in FIG. 10 (3)) is extracted from the determination information shown in FIG. 10 (3), and the provision information OI is determined as OIY1. Then, the control unit 120 of the electronic device 100 outputs the audio information 11 and the image information 12 (within the rectangular rectangle 16 shown in FIG. 11) that are associated with the OIY 1 determined as the provision information OI.

For example, the control unit 120 of the electronic device 100 outputs the audio from audio output unit 160 based on the audio information 11 stored in the storage unit 130 in association with the OIY 1 determined as the provision information OI. Further, the control unit 120 of the electronic device 100 displays the display unit 150 on the basis of the image information 12 stored in the storage unit 130 in association with the OIY 1 determined as the provision information OI. This provision example is shown in FIG. 12.

[An Example of Outputting a Content from the Electronic Device]

Figure 12:
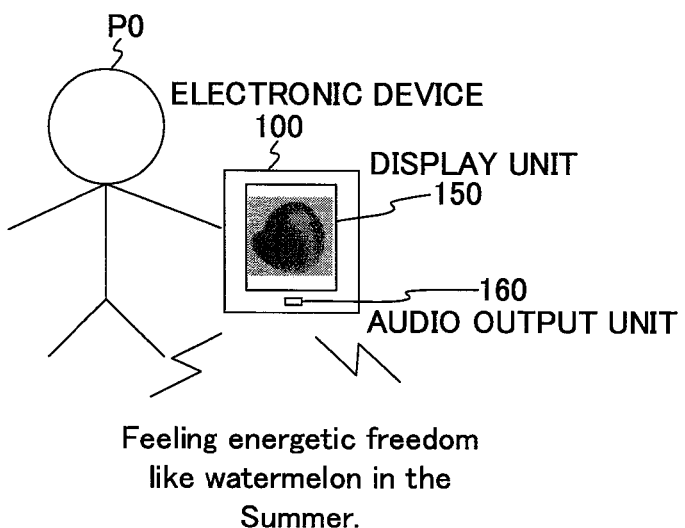
FIG. 12 is a diagram showing an example of outputting the provision information from an electronic device.

FIG. 12 is a simplified diagram showing an example of the case where the provision information (content) is output from the electronic device 100 according to the 2nd embodiment. In addition, the example shown in FIG. 12 shows an example of outputting the provision information (content) determined by the example shown in FIG. 10 and FIG. 11.

As described above, the control unit 120 of the electronic device 100 causes the audio output unit 160 to output an audio of "open feeling such as summer watermelon" based on the audio information 11 (within the rectangular rectangle 16 shown in FIG. 11) associated with the OIY 1. Further, the control unit 120 of the electronic device 100 displays an image of the watermelon on the display unit 150 based on the image information 12 (within the rectangular rectangle 16 shown in FIG. 11) associated with the OIY 1.

Thus, it is possible to determine the provision information using the type of the device which can be identified based on the received radio wave. Thus, the user P 0 carrying the electronic device 100 can enjoy the output of the content determined based on the relationship between the electronic device 100 and other devices existing in the vicinity of the electronic device 100. Further, since the type of the device existing in the vicinity is used for determining the content, even if the positional relationship of the devices around the electronic device 100 is the same, there is a possibility that different contents may be output, so that it is possible to enjoy the output of the content corresponding to the model of the surrounding device. For example, if a user P 0 moves to where a surprising device is present or a user who owns a surprising device approaches, a surprising content may be output, and a surprising content output may be enjoyed. Further, since only the radio wave intensity received from another device and the model of the device are used and the information for identifying the other device and the user is not used, it is not necessary to use the personal information of the user who owns the other device. Therefore, it is possible to easily use the service described in the 2nd embodiment.

[An Operation Example of Providing the Information Using the Type of Devices]

The information provision output process by the electronic device 100 according to the 2nd embodiment corresponds to the information provision output process shown in FIG. 8. Now, an example of an information provision output process performed by the electronic device 100 according to the 2nd embodiment will be described with reference to FIG. 8.

First, the control unit 120 of the electronic device 100 measures the radio wave received by the communication unit 110 and acquires the radio wave information (for example, the radio wave intensity and the type of the device) (Step S201). Then, the control unit 120 of the electronic device 100 causes the storage unit 130 to store the acquired radio wave information for each device (Step S202). This radio wave information acquisition process may be performed periodically or irregularly.

Next, the control unit 120 of the electronic device 100 determines whether or not the provision condition is satisfied (Step S203). And when offer conditions are not fulfilled, it returns to Step S201, and in fulfilling offer conditions, it proceeds to Step S204. Note that the criterion for determining whether or not the provision condition is satisfied may be the same as in the example shown in FIG. 8.

If the provision condition is satisfied (Step S203), the control unit 120 of the electronic device 100 determines the information to be provided based on the radio wave information held in the storage unit 130 (Step S204). For example, the control unit 120 of the electronic device 100 determines the content to be provided based on the radio wave intensity and the type of each device held in the storage unit 130 (Step S204). Specifically, for example, the control unit 120 of the electronic device 100 determines the provision information OI based on the relationship between the order of each radio wave intensity and the type of each device. For example, when the radio field intensity of the electronic devices 101-106 is a radio wave intensity level shown in FIGS. 10 (1) and (2) and the model of electronic devices 101-106 is a model shown in FIGS. 10 (1) and (2), a model group (in a rectangular rectangle 15 shown in FIG. 10 (3)) coinciding with a model (smartphone, smartphone, tablet terminal, smartphone, AI speaker, PC) arranged in the radio wave intensity order is extracted from the information shown in FIG. 10 (3), and the provision information OI is determined as OIY 1.

Next, the control unit 120 of the electronic device 100 provides the information determined as a providing object (Step S205). For example, the control unit 120 of the electronic device 100 makes the contents determined as a providing object output (Step S205). For example, as shown in FIG. 12, the control unit 120 of the electronic device 100 outputs the audio information 11 and the image information 12 (within the rectangular rectangle 16 shown in FIG. 11) that are associated with the OIY 1 determined as the provision information OI.

[An Example of Providing Information Related to the Place where the Certain Device is Set]

By applying the techniques described above, it is assumed to provide information related to the location (e.g., content, preference) at a location, such as a tourist site or a store. Therefore, in the following, an example of providing information related to the location at a specific location is shown.

[An Example of Providing Information Related to Certain Mountain where the Certain Device is Set]

Figure 13:
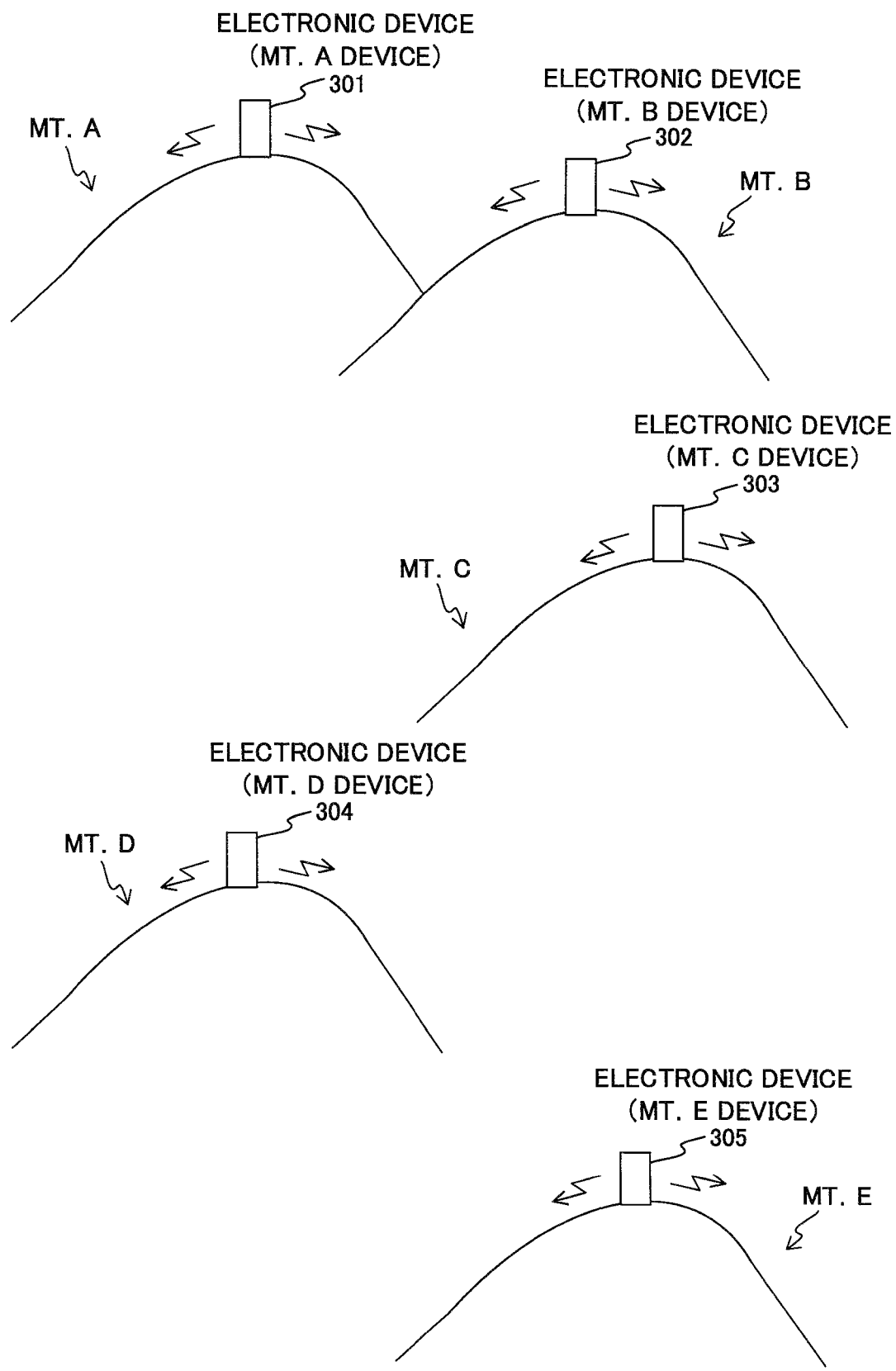
FIG. 13 is a diagram showing an example which installed the electronic device on a mountain.

FIG. 13 is a simplified diagram showing a case in which the electronic devices 301 to 305 in the 2nd embodiment are installed on a mountain. An electronic device (A mountain device) 301 is an electronic device installed at Mt. A, an electronic device (B mountain device) 302 is an electronic device installed at a mountain B, an electronic device (C mountain device) 303 is an electronic device installed in a mountain C, an electronic device (D mountain device) 304 is an electronic device installed in a mountain D, and an electronic device (E mountain device) 305 is an electronic device installed in a mountain E.

The electronic devices 301 to 305 are devices (specific devices) which transmit predetermined radio waves (for example, beacons). For example, since the electronic devices 301 to 305 may be devices capable of supplying radio waves only to the vicinity of the crest, the electronic devices may be electronic devices (for example, a BLE (Bluetooth (registered trademark) Low Energy)) with low power consumption.

[An Example of Determination Information and Provision Information for Providing the Information Related to the Certain Mountain where the Device is Installed Using the Radio Wave Output from the Device]

FIG. 14 and FIG. 15 are the figures showing an example of a variety of information used when determining provision information by the electronic device 100 in the 2nd embodiment. These pieces of information are stored in the storage unit 130. Further, each of these pieces of information may be obtained by a user's manual operation whose hobby is climbing.

FIG. 14 shows an example of the determination information (table) used when the provision information is determined based on the radio wave state of the electronic device 100 and the type of the other devices. Note that, in the determination information shown in FIG. 14 the type of the electronic devices 301 to 305 shown in FIG. 13 is added in the determination information shown in FIG. 9, and the other portions are the same as the determination information shown in FIG. 9. In addition, in FIG. 14, only a part of the type of the electronic device (A mountain device) 301 out of the types of the electronic devices 301 to 305 is shown in a simplified manner, and the other types of the electronic devices are not shown.

For example, in a case where the user P 0 is climbing over Mt. A by 1 people, it is assumed that the electronic device 100 receives only the radio wave from the electronic device (mountain A device) 301. In this case, since the electronic device 100 receives only the radio wave from the electronic device (mountain A device) 301, the OIA 1 is determined as the provision information OI. In addition, for example, in the case where the user P 0 has climbed to Mt. A, but another person is in the vicinity of the crest of Mt. A, it is assumed that the electronic device 100 receives radio waves from the device owned by the person in the vicinity of the crest of Mt. A together with the radio wave from the electronic device (mountain A device) 301. In this case, for example, when the radio wave intensity from the device possessed by the person in the vicinity of the crest of Mt. A is higher than the radio wave intensity from the electronic device (mountain A device) 301, the OIAB 1 is determined as the provision information OI. This example is shown in FIG. 16.

FIG. 15 shows an example of the correspondence relationship between the provision information OI determined using the determination information shown in FIG. 14 and the provision information (audio information 11 and image information 12). For example, when a OIA1,OIAB1, OIAC1,OIAD1 or the like is determined as the provision information OI, information (audio information 11, image information 12) regarding Mt. A is a target of provision Information. For example, these are the information for outputting a sound, such as "Well done. Here's the summit of Mt. A" (the audio information 11) or information (image information 12) for displaying an image relating to the Mt. A such as a character anthropomorphized Mt. A, a special product belonging to Mt. A, and a photograph containing Mt. A. Note that, in FIG. 15, for ease of explanation, a character to be subjected to audio output and a part of an image to be displayed are simply shown. For example, as shown in FIG. 17, a plurality of display screens and information for continuously outputting a plurality of audio information may be provided as provision information. Further, in FIG. 15 the audio information 11 and the image information 12 are taken as examples as the provision information, but one of the audio information 11 and the image information 12 may be provided as the provision information. Further, information other than audio information and image information (e.g., smell information, taste information, and tactile information) may be used as the provision information. Further, information (e.g., coupon, favorite, or point) giving some preference to the user may be provided as the provision information. Note that these provision examples will be described with reference to FIG. 17.

[An Example of Determining the Provision Information Using the Type of Device Installed at Mountain]

Figure 16:
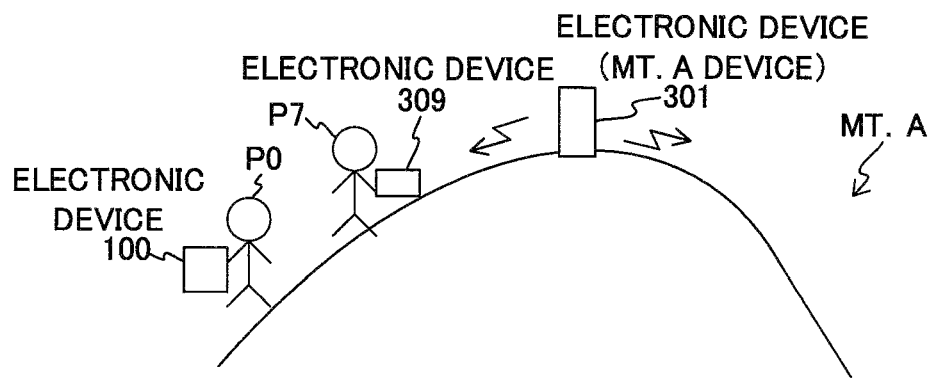
FIG. 16 is a diagram showing an example in which determines the provision information.

FIG. 16 is a diagram showing an example of the case where the electronic device 100 according to the 2nd embodiment determines the provision information using the type of the other device which has received the radio wave. Note that the determination information shown in FIG. 16 (2) corresponds to the determination information shown in FIG. 14, and the provision information shown in FIG. 16 (3) corresponds to the provision information shown in FIG. 15.

FIG. 16 (1) shows a state in which the user P 7 is climbing to Mt. A by 1 people when the user P 0 exists near the crest of Mt. A. Note that, in FIG. 16 (1), for ease of explanation, the users P 0 and P 7 hold the electronic devices 100 and 309, but it is desirable to carry each electronic device in consideration of safety at a mountain.

FIG. 16 (1) shows an example in which a user P 7 is present near a crest of Mt. A and an electronic device 309 possessed by a user P 7 is located closer to an electronic device 100 than an electronic device (mountain A device) 301. It is assumed that the electronic device 309 is a smartphone. In such a case, it is assumed that the electronic device 100 receives radio waves from the electronic device 309 that the user P 7 being near the top of Mt. A possess together with the radio wave from the electronic device (mountain A device) 301. Further, since the electronic device 309 is located closer to the electronic device 100 than the electronic device (mountain A device) 301, it is assumed that the strength of the radio wave from the electronic device 309 is higher than the strength of the radio wave from the electronic device (mountain A device) 301. In this case, as shown in FIG. 16 (2), a OIAB 1 (within a rectangular rectangle 17) is determined as the provision information OI. Then, the control unit 120 of the electronic device 100 provides the audio information 11 associated with the OIAB 1 determined as the provision information OI and the image information 12 (within the rectangular rectangle 18 shown in FIG. 16 (3)). This provision example is shown in FIG. 17.

[An Example of Providing Information Regarding to the Electronic Device]

FIG. 17 is a simplified diagram showing an example of a case in which content is output from the electronic device 100 according to the 2nd embodiment. In addition, an example shown in FIG. 17 shows an example of outputting the content determined by the example shown in FIG. 16.

In this case, it is considered that, in view of safety, a climber is less likely to always watch an electronic device (for example, a smartphone) possessed by the climber during mountain climbing. Therefore, as shown in FIG. 17, content may be provided in a plurality of stages.

FIG. 17 (1) shows an example of content (display screen and audio information) which is output at a timing at which the electronic device 100 receives a radio wave from an electronic device (mountain A device) 301 and satisfies a provision condition.

Here, as a determination criterion for determining whether or not the provision condition is satisfied, for example, it is determined whether a predetermined time has elapsed since the electronic device 100 received a radio wave from the electronic device (mountain A device) 301. It is possible to use whether or not the desired content is determined to be provided, whether or not a predetermined user operation (for example, a screen display operation) has been performed, whether or not a change in posture has been detected (for example, detection of vibration and acceleration when the user takes out an electronic device). Note that a predetermined time may be set as a preset time, or a time corresponding to a user's preference may be set by a user operation.

As shown in FIG. 17 (1), the control unit 120 of the electronic device 100 outputs an audio of "Found a treasure for Mt. A climbing memorial. Do you pick up?" from the audio output unit 160 based on the audio information 11 (not shown) associated with the OIAB 1. In addition, the control unit 120 of the electronic device 100 causes the display unit 150 to display the character "Found a treasure for Mt. A climbing memorial. Do you pick up?", the "PICK UP" button 51, and the "RETURN" button 52 based on the image information 12 (not shown) associated with the OIAB 1.

As shown in FIG. 17 (1), it is possible to notify the user P 0 that the content can be output based on the audio information and the image information. When the user P 0 grasps this notification and the user P 0 presses the "PICK UP" button 51, a display screen shown in FIG. 17 (2) is displayed. When the "RETURN" button 52 is pressed, the screen returns to the original screen. For example, it can be returned to a screen for performing a standby screen or a content determination process again.

FIG. 17 (2) shows an example of content (display screen and audio information) output after the "PICK UP" button 51 is pressed on the display screen shown in FIG. 17 (1).

As shown in FIG. 17 (2), the control unit 120 of the electronic device 100 causes the audio output unit 160 to output the audio of "Well done. Here's the summit of Mt. A. I'm Mr. Mt. A noodle for climbing memorial" based on audio information 11 (in the rectangular rectangle 18 shown in FIG. 16 (3)) associated with the OIAB 1. In addition, the control unit 120 of the electronic device 100 causes the display unit 150 to display the character of "Well done. Here's the summit of Mt. A. I'm Mr. Mt. A noodle for climbing memorial", an image relating to Mt. A (image that a character anthropomorphized Mt. A has "Mt. A noodle" which is a special product belonging to Mt. A), a "GET MORE" button 53, and an "END" button 54 based on the image information 12 (within the rectangle 18 shown in FIG. 16 (3)) associated with the OIAB 1.

After the output of the content shown in FIG. 17 (2), when the user P 0 presses the "GET MORE" button 53, a display screen shown in FIG. 17 (3) is displayed. In addition, when the "END" button 54 is pressed, the content output process ends and the process returns to the normal display screen.

FIG. 17 (3) shows an example of content (display screen and audio information) output after the "GET MORE" button 53 is pressed on the display screen shown in FIG. 17 (2).

As shown in FIG. 17 (3), the control unit 120 of the electronic device 100 causes the audio output unit 160 to output a sound of "It's a discount coupon for Mt. A noodle which is Mt. A specialty" based on audio information 11 (not shown) associated with the OIAB 1. In addition, the control unit 120 of the electronic device 100 causes the display unit 150 to display a character of "It's a discount coupon for Mt. A noodle which is Mt. A specialty", "30% discount at xx store" button 55, "40% discount at yy store" button 56, a "SAVE" button 57, and an "END" button 58 based on image information 12 (not shown) associated with the OIAB 1 on the display unit 150. Note that the "30% discount at xx store" button 55 is a button for starting an operation for receiving a favorite (thirty percent off) at a xx store which provides a specialty product "Mt. A noodle" of an area where Mt. A exists. Further, the "40% discount at yy store" button 56 is a button for starting an operation for receiving a favorite (forty percent off) in a yy store which provides a special product "Mt. A noodle" of an area where the Mt. A exists.

For example, when at least one of the "30% discount at xx store" button 55 and the "40% discount at yy store" button 56 is pressed, the pressed button is in a selected state (e.g., a change in the color of a button). Then, when a "SAVE" button 57 is pressed in the selected state, a process for receiving a favorite in a store corresponding to a button in a selected state is started. For example, an image indicating a 30% discount at xx store and an image indicating a 40% discount at yy store are stored. Then, after going down to Mt. A, the user P 0 go to a desired shop and show the stored image, thereby receiving the respective preferences. Further, for example, a notification may be sent to a store corresponding to a button in a selected state.

In this way, when the user P 0 has climbed to Mt. A, it is possible to receive the content related to Mt. A. In this case, there is a possibility that the information to be provided may change by the device (for example, the electronic device 309 shown in FIG. 16 (1)) existing near the top of Mt. A at the timing when the user P 0 reaches the peak of Mt. A, so that the user can enjoy the output of the content having unexpectedness. Also, other climbers can enjoy the output of different contents. Also, even in a case where a user performs mountain climbing with some people, since there is a high possibility that different contents will be output for each person depending on the position of each person, the content of each person can be enjoyed.

[An Example of Providing Information Related to the Store where the Device is Installed]

Figure 18:
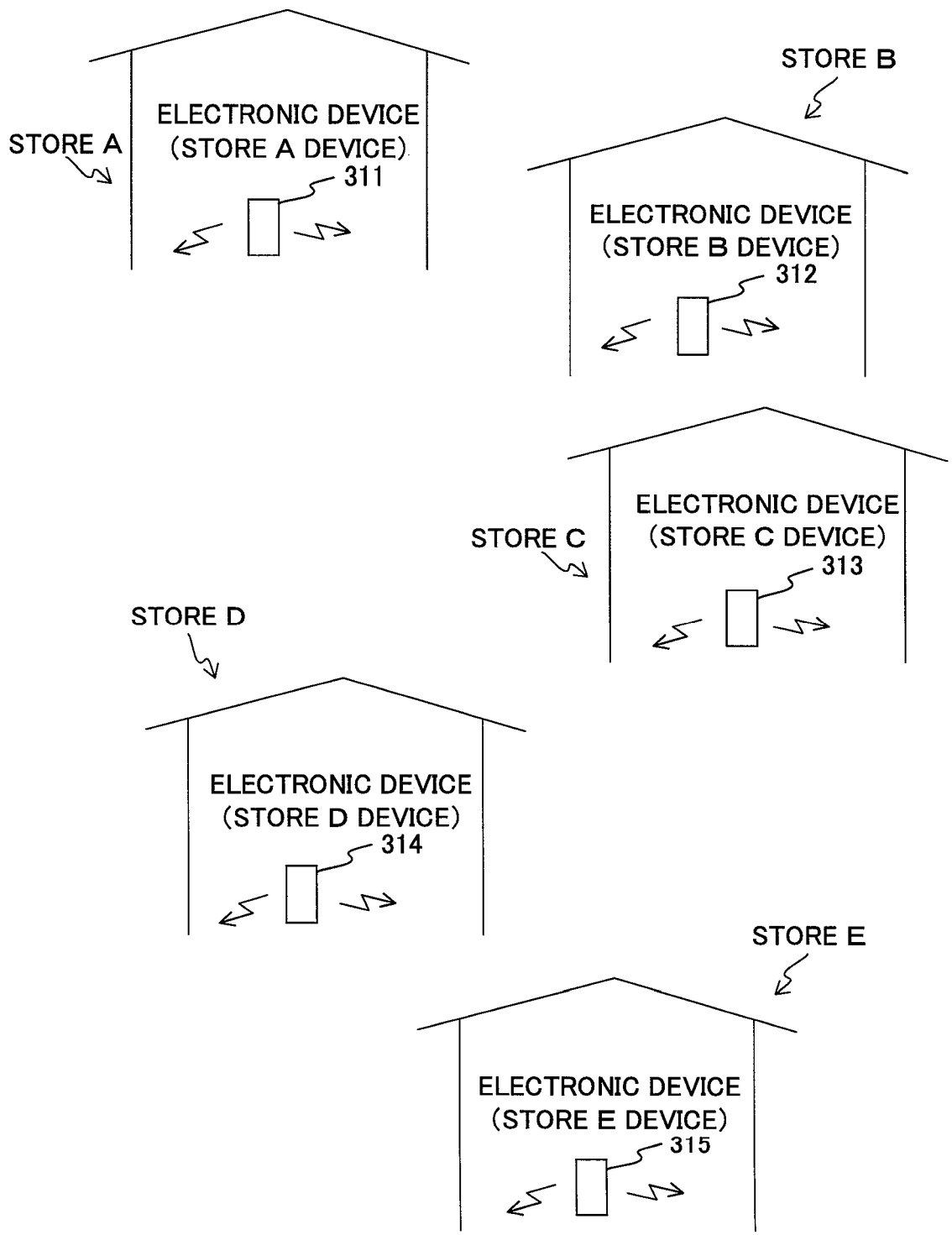
FIG. 18 is a diagram showing an example which installed the electronic device in a store.

FIG. 18 is a diagram showing a case in which the electronic devices 311 to 315 in the 2nd embodiment are installed in a store. An electronic device (store A device) 311 is an electronic device installed in a store A, and an electronic device (store B device) 312 is an electronic device installed in a store B, an electronic device (store C device) 313 is an electronic device installed in a store C, an electronic device (store D device) 314 is an electronic device installed in a store D, and an electronic device (store E device) 315 is an electronic device installed in a store E.

The electronic devices 311 to 315 are devices (specific devices) which transmit predetermined radio waves (for example, beacons). For example, the electronic devices 311 to 315 may be an electronic device (for example, BLE) which is capable of supplying electric waves only in a store (or in the vicinity of a store), and thus consumes less power.

[An Example of Determination Information and Provision Information for Providing Information Related to the Store Using the Radio Wave Output from the Device Installed in the Store]

FIG. 19, FIG. 20 are showing an example of each information used for determining the provision information by the electronic device 100 in the 2nd embodiment. Each of information is stored in the storage unit 130. Also, each of these information may be acquired by user's manual operation whose hobby is eating around.

FIG. 19 shows an example of the determination information (table) used when the provision information is determined based on the radio wave state of the electronic device 100 and the type of the other devices. Note that, in the determination information shown in FIG. 19, the type of the electronic devices 311 to 315 shown in FIG. 18 is added in the determination information shown in FIG. 9, and the other portions are the same as the determination information shown in FIG. 9. In addition, in FIG. 19, only a part of the type of the electronic device (store A device) 311 among the types of the electronic devices 311 to 315 is shown in simplified form, and the other types are omitted.

For example, in a case where the user P 0 is in the store A alone, it is assumed that the electronic device 100 receives only the radio wave from the electronic device (store A device) 311. In this case, since the electronic device 100 receives only the radio wave from the electronic device (store A device) 311, the OIAA 1 is determined as the provision information OI. In addition, for example, when the user P 0 and other persons are at the store A, it is assumed that the electronic device 100 receives radio waves from the device held by the other person in the store A together with the radio wave from the electronic device (store A device) 311. In this case, for example, when the radio wave intensity from the device owned by another person in the store A is higher than the radio wave intensity from the electronic device (store A device) 311, the OIAAB 1 is determined as the provision information OI.

FIG. 20 shows an example of the correspondence relationship between the provision information OI determined using the determination information shown in FIG. 19 and the provision information (audio information 11 and image information 12). For example, when a OIAA1,OIAAB1, OIAAC1,OIAAD1 or the like is determined as the provision information OI, information (audio information 11, image information 12) related to the store A is a target of provision.

Here, it is assumed that store A is a restaurant. In this case, the information regarding the store A is, for example, information (audio information 11) for outputting an audio such as "welcome" or information for displaying an image relating to the store A (for example, a character A anthropomorphized the store A, a favorite (e.g., a discount, a service item, or a point) for a food and drink provided by the store A) (image information 12). Note that, in FIG. 20, for ease of explanation, a character to be subjected to audio output and a part of an image to be displayed are simply shown. For example, as shown in FIG. 22, a plurality of display screens and information for continuously outputting a plurality of audio information may be provided as provision information. Further, in FIG. 20, the audio information 11 and the image information 12 are taken as examples as the provision information, but one of the audio information 11 and the image information 12 may be provided as the provision information. Further, information other than audio information and image information (e.g., smell information, taste information, and tactile information) may be used as the provision information. Further, information (e.g., coupon, favorite, or point) giving some preference to the user may be provided as the provision information. Note that these provision examples will be described with reference to FIG. 22.

[An Example of Determining the Provision Information Using the Type of Device Installed in the Store]

Figure 21:
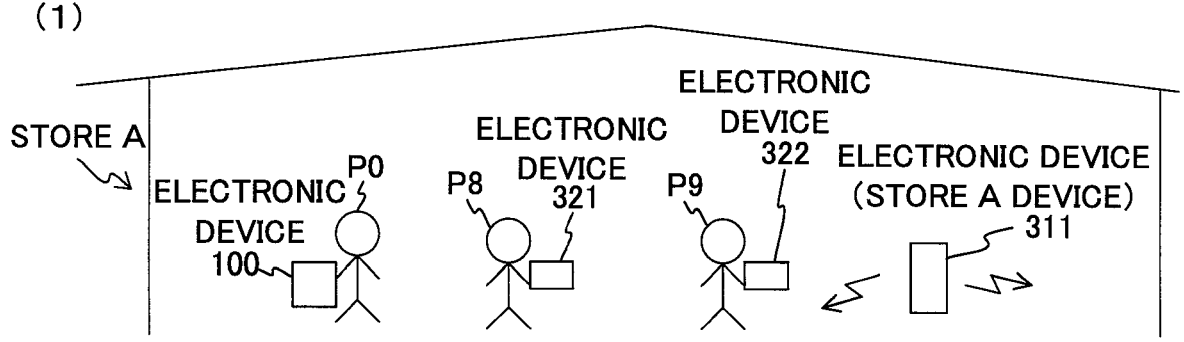
FIG. 21 is a diagram showing an example in which determines the provision information using the type of another device.

FIG. 21 is a diagram showing an example of the case where the electronic device 100 according to the 2nd embodiment determines the provision information using the type of the other device which has received the radio wave. Note that the determination information shown in FIG. 21 (2) corresponds to the determination information shown in FIG. 19, and the information shown in FIG. 21 (3) corresponds to the provision information shown in FIG. 20.

FIG. 21 (1) shows a state in which the users P 0, P 8 and P 9 exist in the store A. Note that, in FIG. 21 (1), for ease of explanation, the users P 0, P 8, and P 9 hold the electronic device 100,321,322, but it is desirable to carry each electronic device in consideration of eating and drinking in the restaurant.

FIG. 21 (1) shows an example in which a user P 0, a user P 8, and a user P 9 exist in a store A, and an electronic device 321 possessed by a user P 8 and an electronic device 322 owned by a user P 9 exist between an electronic device 100 owned by a user P 0 and an electronic device (store A device) 311. Note that the electronic devices 321 and 322 are smart phones. In this case, it is assumed that the electronic device 100 receives radio waves from the electronic devices 321 and 322 owned by the users P 8 and P 9 in the store of the store A together with radio waves from the electronic device (store A device) 311. Further, since the electronic device 321 and the electronic device 322 exist between the electronic device 100 and the electronic device (store A device) 311, it is assumed that the radio wave intensity from the electronic devices 322 and 321 is higher than the radio wave intensity from the electronic device (store A device) 311. In this case, as shown in FIG. 21 (2), a OIAAC 1 (within a rectangular rectangle 19) is determined as the provision information OI. Then, the control unit 120 of the electronic device 100 outputs the audio information 11 associated with the OIAAC 1 determined as the provision information OI and the image information 12 (within the rectangular rectangle 20 shown in FIG. 21 (3)). This provision example is shown in FIG. 22.

[An Example of Output Contents from the Electronic Device]

FIG. 22 is a simplified diagram showing an example of a case where content is output from the electronic device 100 according to the 2nd embodiment. In addition, an example shown in FIG. 22 shows an example of outputting the content determined by the example shown in FIG. 21.

Here, before entering the restaurant, it is often determined whether or not the user enters in consideration of his/her preference, a budget, a menu of a store, and the like. Also, it is often determined which menu is to be ordered in consideration of the preference, the budget, the menu of the store, and the like, even after entering the restaurant. Therefore, as shown in FIG. 22, content may be provided in a plurality of stages so as to suit each user's preference.

FIG. 22 (1) shows an example of content (display screen and audio information) which is output at a timing at which the electronic device 100 receives a radio wave from the electronic device (store A device) 311 and satisfies a provision condition.

Here, as a criterion for determining whether or not the provision condition is satisfied, for example, it is determined whether a predetermined time has elapsed since the electronic device 100 received the radio wave from the electronic device (store A device) 311. It is possible to use whether or not the desired content is determined to be provided, whether or not a predetermined user operation (for example, a screen display operation) has been performed, whether or not a change in posture has been detected (for example, detection of vibration and acceleration when the user takes out the electronic device 100). Note that a predetermined time may be set as a preset time, or a time corresponding to a user's preference may be set by a user operation.

As shown in FIG. 22 (1), the control unit 120 of the electronic device 100 causes the audio output unit 160 to output the audio of "welcome", based on the audio information 11 (not shown) associated with the OIAAC 1. In addition, the control unit 120 of the electronic device 100 causes the display unit 150 to display a character "welcome", an "OUTPUT SPECIAL TREATMENT" button 61, and a "RETURN" button 62 based on image information 12 (not shown) associated with the OIAAC 1.

As shown in FIG. 22 (1), it is possible to notify the user P 0 that a favorite (content) can be output based on the audio information and the image information. When the user P 0 grasps this notification and the user P 0 presses the "OUTPUT SPECIAL TREATMENT" button 61, a display screen shown in FIG. 22 (2) is displayed. When the "RETURN" button 62 is pressed, the screen returns to the original screen. For example, it can be returned to a screen for performing a standby screen or a special treatment determination process again.

FIG. 22 (2) shows an example of content (display screen and audio information) output after the "OUTPUT SPECIAL TREATMENT" button 61 is pressed on the display screen shown in FIG. 22 (1).

As described in FIG. 22 (2), the control unit 120 of the electronic device 100 causes the audio output unit 160 to output an audio of "Welcome. Whitebait bowl is a half price today." based on the audio information 11 (within the rectangular rectangle 20 shown in FIG. 21 (3)) associated with the OIAAC 1. Further, the control unit 120 of the electronic device 100 causes the display unit 150 to display a character of "Welcome. Whitebait bowl is a half price today." and an image related to store A or menu of store A (image of whitebait) on the basis of the image information 12 (within the rectangular rectangle 20 shown in FIG. 21 (3)) associated with the OIAAC 1.

After outputting the content shown in FIG. 22 (2), when the user P 0 presses the "MORE SPECIAL TREATMENT" button 63, a display screen shown in FIG. 22 (3) is displayed. In addition, when the "END" button 64 is pressed, the content output process ends and the process returns to the normal display screen.

FIG. 22 (3) shows an example of contents (display screen and audio information) output after the "MORE SPECIAL TREATMENT" button 63 is pressed on the display screen shown in FIG. 22 (2).

As shown in FIG. 22 (3), the control unit 120 of the electronic device 100 causes the audio output unit 160 to output an audio of "It's a discount coupon for STORE A specialty." based on audio information 11 (not shown) associated with the OIAAC 1. In addition, the control unit 120 of the electronic device 100 causes the display unit 150 to display a character of "It's a discount coupon for STORE A specialty.", "30% discount for celery pickles" button 65, "30% discount for shrimp curry" button 66, "SAVE" button 67, and "END" button 68 based on image information 12 (not shown) associated with the OIAAC 1 on a display unit 150. Note that the "30% discount for celery pickles" button 65 is a button for starting an operation for receiving a discount (thirty percent off) for the food "celery pickles" provided by the store A. Further, the "30% discount for shrimp curry" button 66 is a button for starting an operation for receiving a discount (thirty percent off) for the food "shrimp curry" provided by the store A.

For example, when at least one of the "30% discount for celery pickles" button 65 and the "30% discount for shrimp curry" button 66 is pressed, a pressed button is in a selected state (e.g., a change in color of a button). Then, when the "SAVE" button 67 is pressed in the selected state, a process for receiving a preference for the food and drink corresponding to the button in the selected state is started. For example, an image showing 30% discount for celery pickles or an image showing 30% discount for shrimp curry is stored. Then, the user P 0 can receive each favorite by going to store A at a later date and showing the saved image. In addition, it may be possible to receive each benefit in place. It should be noted that the button (for example, the "30% discount for celery pickles" button 65 and the "30% discount for shrimp curry" button 66) displayed after the "MORE SPECIAL TREATMENT" button 63 is pressed may be associated with a content (e.g., a food item to be eaten with a whitebait bowl) that is displayed with a "MORE SPECIAL TREATMENT" button 63 (for example, content related to whitebait bawl), and may be independent of the content (e.g., a today's recommendation). Further, information for displaying a button (for example, a "30% discount for celery pickles" button 65, a "30% discount for shrimp curry" button 66) displayed after pressing the "MORE SPECIAL TREATMENT" button 63 is also stored as the provision information.

In this way, when the user P 0 enters the store A, it is possible to receive the content related to the store A. In this case, there is a possibility that the information to be provided may change by the devices (e.g., the electronic devices 321 and 322 shown in FIG. 21 (1)) existing in the store A at a timing before (or immediately after) the user P 0 enters the store A, so that it is possible to enjoy the output of the content having unexpectedness. Also, even in a case where the user enters the store A by a plurality of persons, since there is a high possibility that different contents will be output for each person depending on the position of each person, the content of each person can be enjoyed.

Although FIG. 17 and FIG. 22 show an example in which content is output in 3 stages, content may be output in 1 or 2 stages, or content may be output in 4 or more stages. In addition, in FIG. 17 (3) and FIG. 22 (3), a case in which the button to be selected is 2 has been described as an example, but the number of buttons to be selected is not limited to this, and may be 1 or 3 or more.

Thus, the electronic device 100 (control unit 120) can determine at least one content to be provided to a user from a plurality of content based on a radio wave (1 or more radio waves including a radio wave not directed to the own device) output from the device (e.g., an electronic device 101-106,301,309,311,321,322) existing in the periphery. More specifically, the electronic device 100 (control unit 120) can determine at least one content to be provided to a user from a plurality of contents based on the specified information related to each device (information related to the devices in the periphery (for example, at least one of the manufacturer of the device, the model number of the device, the unique information of the device, and the name given to the device)) based on the radio waves (1 or more radio waves including radio waves not addressed to the own device) output from an external device (e.g., an electronic device 101-106,301,309,311,321,322).

Further, in particular, the electronic device 100 (control unit 120) can determine at least one content to be provided to a user from among a plurality of contents based on a relationship (e.g., a plurality of patterns (e.g., a type pattern of a device of the determination information shown in FIG. 9, FIG. 14, and FIG. 19) in which the type of each device is arranged in the radio wave intensity order) between the number of radio waves received by the electronic device 100 and information (for example, the type of device, the manufacturer of the device, the model number of the device, the unique information of the device, and the name given to the device) related to the device that outputs the radio wave.

In addition, the electronic device 100 (control unit 120) is possible to select and execute at least one process (e.g., an output process of content corresponding to the provision information OIX 1) from among plurality of processes which is different from the processes relating to radio communication based on the radio wave and the processes using radio communication based on the radio wave (e.g., an output processes of the content corresponding to the provision information OI 1-OIM) based on the radio wave (1 or a plurality of radio waves including radio waves not addressed to the own device) output from the devices (e.g., the electronic devices 101-106,301,309,311,321,322) existing in the periphery.

Specifically, the electronic device 100 (control unit 120) can select and execute at least one processing from among a plurality of processing which is different from the processing relating to radio communication based on the radio wave and the processing using radio communication based on the radio wave based on the specified information related to each device (information related to the devices in the periphery (for example, at least one of the manufacturer of the device, the model number of the device, the unique information of the device, and the name given to the device)) based on the radio waves (1 or more radio waves including radio waves not addressed to the own device) output from an external device (e.g., an electronic device 101-106,301,309, 311,321,322). Further, in particular, the electronic device 100 (control unit 120) can select and execute at least one processing from among a plurality of processing which is different from the processing relating to radio communication based on the radio wave and the processing using radio communication based on the radio wave based on a relationship (e.g., a plurality of patterns (e.g., a type pattern of a device of the determination information shown in FIG. 9, FIG. 14, and FIG. 19) in which the type of each device is arranged in the radio wave intensity order) between the number of radio waves received by the electronic device 100 and information (for example, the type of device, the manufacturer of the device, the model number of the device, the unique information of the device, and the name given to the device) related to the device that outputs the radio wave.

[An Example of Application to Game]

By applying the described technology in the above, when a game is played for example, it is conceivable to provide various kinds of information related to the game. Therefore, in the following, an example of providing various kinds of information related to the game in the case of playing a game will be described.

[An Example which Provides the Information Relevant to the Versus Fighting Game of the Character Displayed on the Display Device Installed in the Outdoors]

Figure 23:
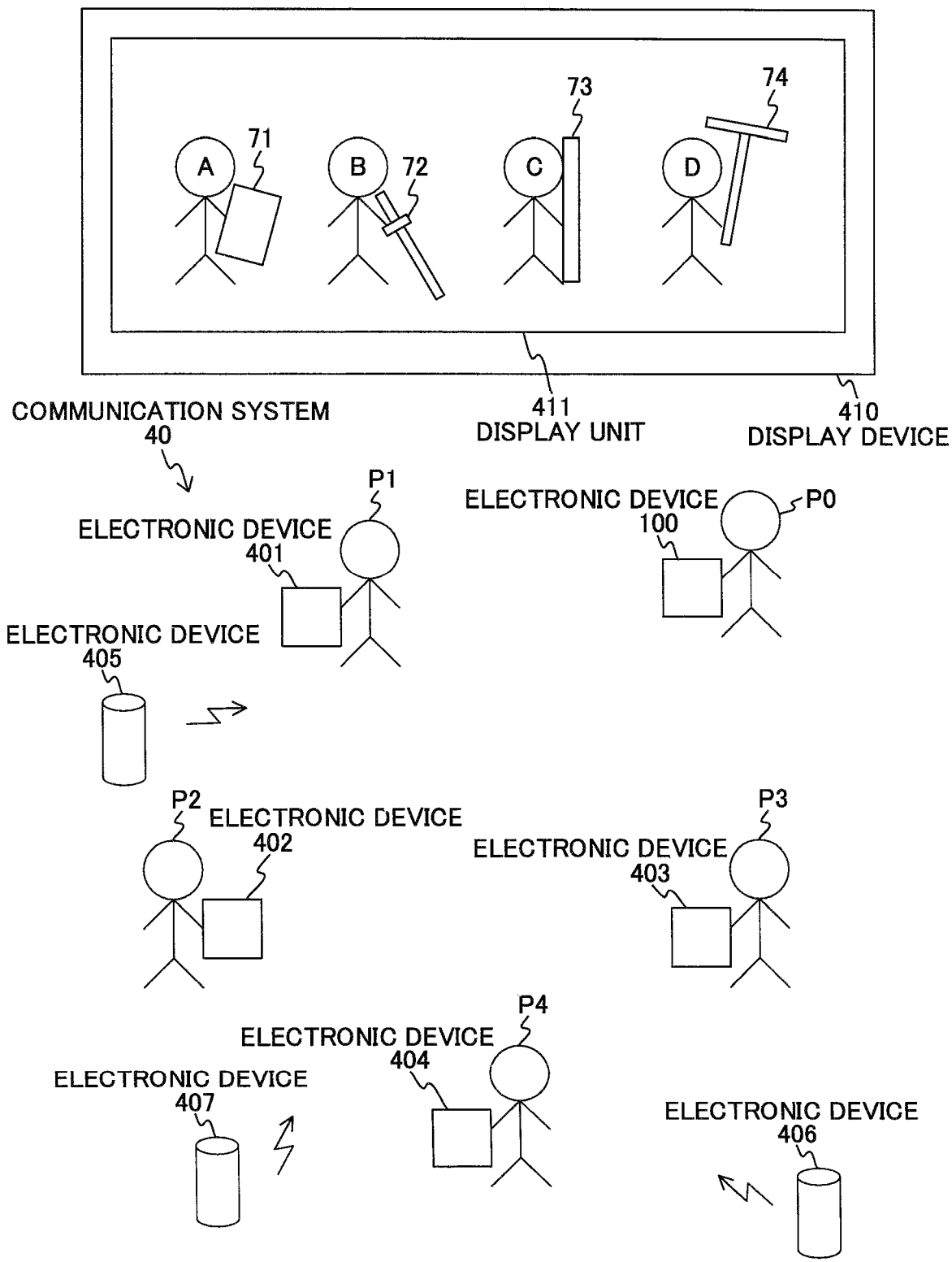
FIG. 23 is a diagram of configuration example of a communication system.

FIG. 23 is the figure simplifying and showing the configuration example of the communications system 40 in the 2nd embodiment. FIG. 23 shows an example of wireless communication between the electronic device 100,401-407 and the display device 410. Further, an example is shown in which the electronic device 100,401-404 is carried by the users P 0 to P 4 and the electronic devices 405 to 407 and the display device 410 are fixedly installed.

The electronic device 100,401-404 is an electronic device that displays characters on the display unit 411 of the display device 410 and controls each of the characters based on the user's operation. The electronic device 100,401-404 is, for example, a smartphone, a tablet terminal, or a game device. Further, the functional configuration of the electronic device 100,401-404 is substantially the same as that of the electronic device 100 shown in FIG. 2.

Character A is a character controlled by electronic device 100, character B is a character controlled by electronic device 401, character C is a character controlled by electronic device 402, and character D is a character controlled by electronic device 403. Note that the character controlled by the electronic device 404 is not yet displayed on the display unit 411 of the display device 410.

The display device 410 is a display device (an information processing device, an electronic device) including a communication unit (not shown) capable of wireless communication, a control unit (not shown) for controlling each unit, and a display unit 411. For example, a control unit (not shown) of the display device 410 performs display control of the display unit 411 based on information transmitted from the electronic device 100,401-404. Specifically, the control unit (not shown) of the display device 410 causes the display unit 411 to display the character A based on the information transmitted from the electronic device 100. On the basis of information transmitted from an electronic device 401, a character B is displayed on a display unit 411, a character C is displayed on a display unit 411 based on information transmitted from an electronic device 402, and a character D is displayed on a display unit 411 on the basis of information transmitted from an electronic device 403. Further, a control unit (not shown) of the display device 410 controls the movement of the character A in the display unit 411 based on the information transmitted from the electronic device 100, and controls the operation of the character B in the display unit 411 based on the information transmitted from the electronic device 401. Based on information transmitted from an electronic device 402, motion control of a character C in a display part 411 is performed, and motion control of a character D in a display unit 411 is performed based on information transmitted from an electronic device 403.

Further, a control unit (not shown) of the display device 410 adds various kinds of information to the characters A to D on the display unit 411 on the basis of information transmitted from the electronic device 100,401-403, and displays the information. For example, a control unit (not shown) of the display device 410 adds the tool 72 to the character A on the display unit 411 on the basis of the information transmitted from the electronic device 100, and displays the character B on the display unit 411 by adding the tool 71 to the character B on the basis of the information transmitted from the electronic device 401. On the basis of information transmitted from an electronic device 402, a tool 74 is added and displayed on a character C in a display unit 411, and a tool 73 is added and displayed on a character D in a display unit 411 on the basis of information transmitted from an electronic device 403.

The electronic devices 405 to 407 are devices for transmitting various kinds of information. It is to be noted that the electronic devices 405 to 407 may be configured to transmit radio waves of different strengths or different types so that the tools (the provision information 421 shown in FIG. 24) that can be acquired by the electronic device 100,401-404 may change, or the types of the electronic devices 405 to 407 may be different from each other.

[An Example of Information to be Provided to the Character in the Versus Fighting Game]

FIG. 24 is a diagram showing an example of a correspondence relationship between the provision information OI determined using the determination information by the electronic device 100,401-404 according to the 2nd embodiment and the provision information 421. Note that the determination information (table) used in determining the provision information may be the above-described determination information (FIG. 3, FIG. 9, FIG. 14, and FIG. 19). These pieces of information are stored in the storage unit 130.

Although FIG. 24 shows an example in which a tool used by each character is determined as the provision information, other information (e.g., an experience value, an attribute, and the like given to each character) may be determined. Further, a plurality of pieces of information may be provided.

For example, when the OIXY 1 is determined as the provision information OI, the tool 71 (possessed by the character A shown in FIG. 23) is a provision target. In addition, when the OIYY 2 is determined as the provision information OI as the provision information OI, the tool 74 (possessed by the character D shown in FIG. 23) is to be provided. Further, when the OIYZ 1 is determined as the provision information OI, a tool 72 (possessed by the character B shown in FIG. 23) is provided. In addition, when the OIZZ 7 is determined as the provision information OI as the provision information OI, the tool 73 (possessed by the character C shown in FIG. 23) is provided.

[An Example that the Displaying Character on the Display Unit Acquires a Tool]

Figure 25:
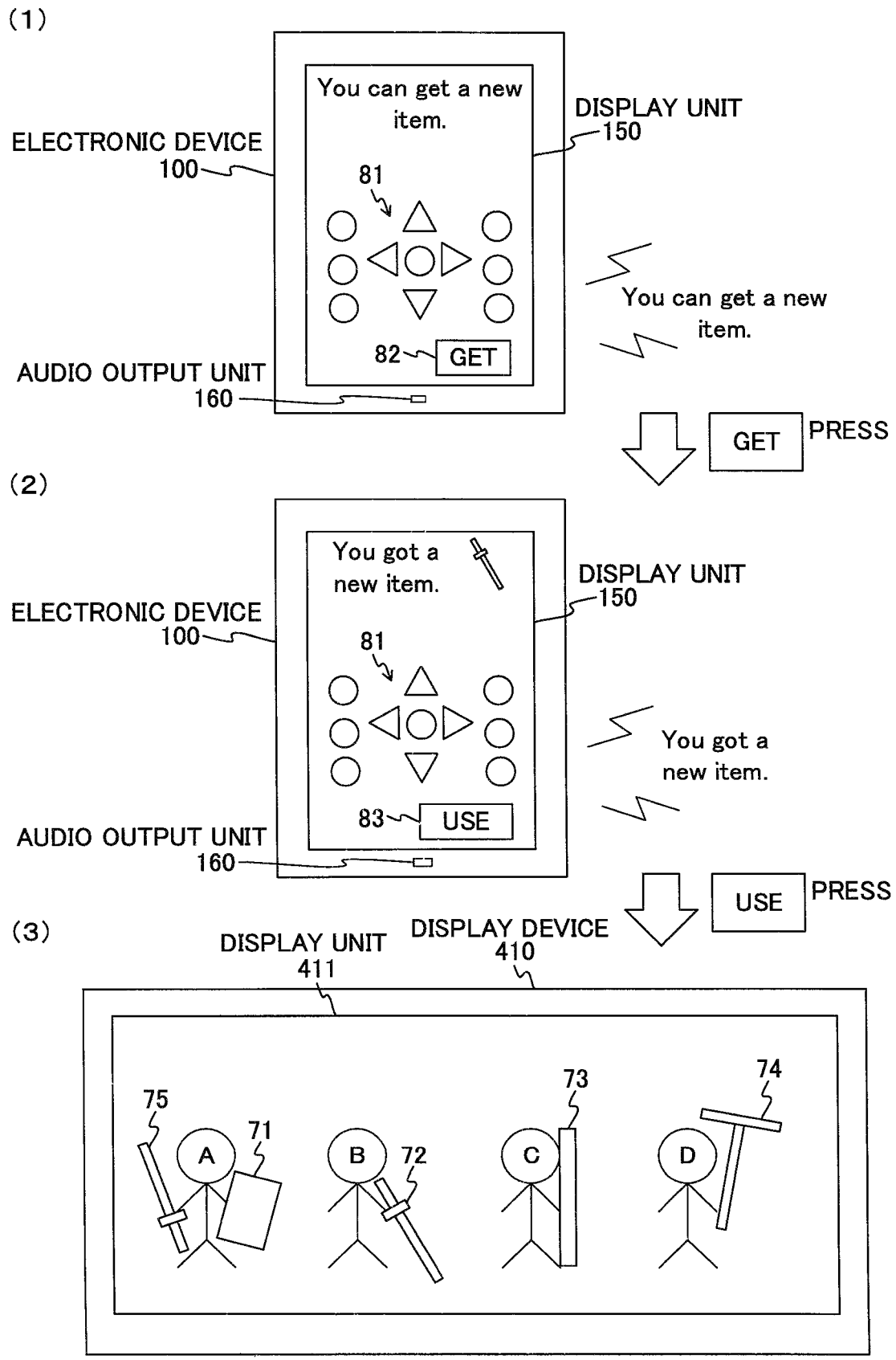
FIG. 25 is a diagram showing an operation example for additionally displaying a tool on the character.

FIG. 25 is a diagram showing an example of operation for additionally displaying a tool 75 on a character A displayed on a display unit 411 of a display device 410 using an electronic device 100 according to the 2nd embodiment.

FIG. 25 (1) shows an output example in the case of outputting notification information for notifying a user that a new tool can be acquired. A message indicating that a new tool can be acquired is displayed on a display unit 150 of an electronic device 100, and an audio output unit 160 outputs a message indicating that a new tool can be acquired. Further, an operation button group 81 and an "get" button 82 are displayed on the display unit 150 of the electronic device 100.

The operation button group 81 is a button (indicated by circle and triangle) for operating the character A displayed on the display unit 411 of the display device 410. For example, when the user P 0 performs a pressing operation or the like of a desired button among the group of operation buttons 81, it is possible for the character A displayed on the display unit 411 of the display device 410 to make a predetermined action (e.g., proceed, descend, attack, or defend).

The "GET" button 82 is a button that is displayed at a timing at which a new tool can be acquired. When the "GET" button 82 is pressed by the user P 0, a display screen shown in FIG. 25 (2) is displayed on the display unit 150 of the electronic device 100.

FIG. 25 (2) shows an output example in the case of outputting notification information for notifying a user that a new tool has been acquired. A display unit 150 of an electronic device 100 displays a message indicating that a new tool has been acquired and an image indicating a newly acquired tool, and an audio output unit 160 outputs a message indicating that a new tool has been acquired. Further, an operation button group 81 and a "USE" button 83 are displayed on the display unit 150 of the electronic device 100.

The "USE" button 83 is a button that is displayed when a new tool is acquired by pressing the "GET" button 82. Note that the newly acquired tool may be used immediately or may be used at a desired timing (for example, at the time of actual use in a game).

When the user P 0 presses the "use" button 83, a tool 75 is additionally displayed on the character A on the display unit 411 of the display device 410 as shown in FIG. 25 (3). In other words, based on the pressing operation of the "use" button 83, the control unit 120 of the electronic device 100 transmits information related to the acquired provision information (the tool 75) (information that enabled character A to use the tool by displaying it on the display unit 411 of the display unit 410) to the display device 410. Then, the control unit of the display device 410 additionally displays the tool 75 on the character A of the display unit 411 on the basis of the information received from the electronic device 100.

As shown in FIG. 25 (3), by additionally displaying the tool 75 on the character A on the display unit 411 of the display device 410, the character A can carry the tool 71 and the tool 75 thereby making it possible to take an advantage during match with another character. Note that, this example showed that a character is displayed on an external device (display device 410), but a character can be displayed on a display unit of each electronic device, and a game performed by users of each electronic device can be similarly applied.

[An Example of Providing Information Related to a Story Game]

Figure 26:
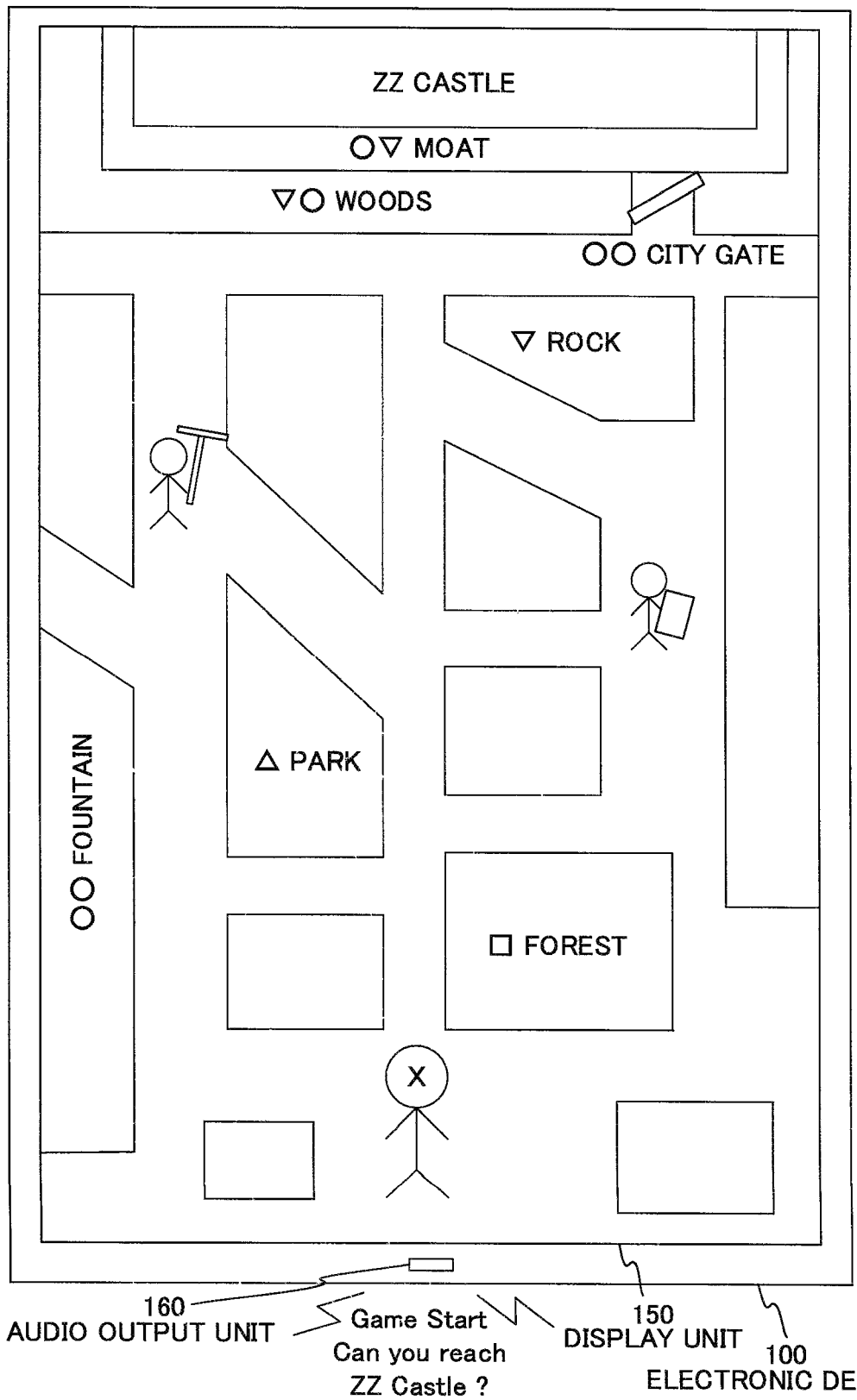
FIG. 26 is a diagram showing of an example of a story game displayed on the display unit.

FIG. 26 is a simplified diagram showing an example of a story game displayed on the display unit 150 of the electronic device 100 according to the 2nd embodiment. FIG. 26 shows an example in which a user causes the display unit 150 of the electronic device 100 to display a story game and performs a story game.

Here, a story game is a game performed using a predetermined sign to achieve a predetermined purpose. For example, a story game is a game in which a character playing each role (a predetermined sign) progresses to a destination while performing various experiences (e.g., adventure, exploration, battle). In FIG. 26, a game is described in which a character X (shown as a lower portion) goes forward to the destination of a ZZ castle (shown in the upper portion) and during a travel to a ZZ castle, character A faces to the various experiences (e.g., a match with another character and a progress of each road). Although FIG. 26 shows an example in which the entire story game is displayed on the display screen of the display unit 150 of the electronic device 100 for ease of explanation, an area wider than the display screen of the display unit 150 may be set as an area of the story game, and a story game may be performed using a plurality of screens (for example, a screen having a hierarchical structure). Thus, a story game may be referred to as an objective achievement game, a character progression game, an adventure game, a search game, and the like.

The control unit 120 of the electronic device 100 causes the display unit 150 to display a story game based on a program stored in the storage unit 130 (for example, an application of a story game). Further, the control unit 120 of the electronic device 100 controls various operations of the character X based on a user operation (for example, a user operation on the operation unit 140, a user operation based on a user's voice input, an operation based on a change in the posture of the electronic device 100).

Further, the control unit 120 of the electronic device 100 displays the various kinds of information on the character X on the display unit 150 based on the radio wave output from another device. For example, the control unit 120 of the electronic device 100 adds and displays the tools 433 and 434 (shown in FIG. 28) on the character X on the display unit 150 based on radio waves output from the plurality of other devices.

[An Example of Information for Providing to Character in the Story Game]

FIG. 27 is a diagram showing an example of a correspondence relationship between the provision information OI determined by the electronic device 100 according to the 2nd embodiment and the provision information 441,442, 443. Note that the determination information (table) used in determining the provision information may be the above-described determination information (FIG. 3, FIG. 9, FIG. 14, and FIG. 19). These pieces of information are stored in the storage unit 130 of the electronic device 100.

Although FIG. 27 shows an example of providing 3 or more pieces of information as provision information, information of 1 or 2 may be provided.

For example, when the OIJK 1 is determined as the provision information OI, a "tool (rectangular tool)", a "house 108", and a "money 99" are provided. Further, when the OIGT 3 is determined as the provision information OI, "experience value 89", "tool (T tool)", and "money 67" are provided. Further, when the OIMU 9 is determined as the provision information OI, "tool (sword type tool)", "money 678", and "experience value 2" are provided. Further, when the OIPO 6 is determined as the provision information OI, "Tank 7", "money 100", and "Tool (Bar-like tool)" are provided.

For example, if the provision information is a tool, then the tool is provided to the character X and the character X can use it. Further, for example, if the provided information is an experience value, a numerical value of the experience value is calculated (e.g., added) sequentially, and the character X can perform various operations based on an experience value based on the calculation result. Further, for example, when the provision information is money, calculation of the value of money (for example, addition) is sequentially performed, and the character X can perform various kinds of shopping based on the total amount based on the calculation result. In addition, for example, in the case where the provision information is a vehicle, a house, a tank, or an airplane, the numerical value of the item is calculated (e.g., added) sequentially, and the character X can use various kinds of vehicles, a property, and the like based on the total value of the respective items based on the calculation result.

[A Display Example of Provision Information]

Figure 28:
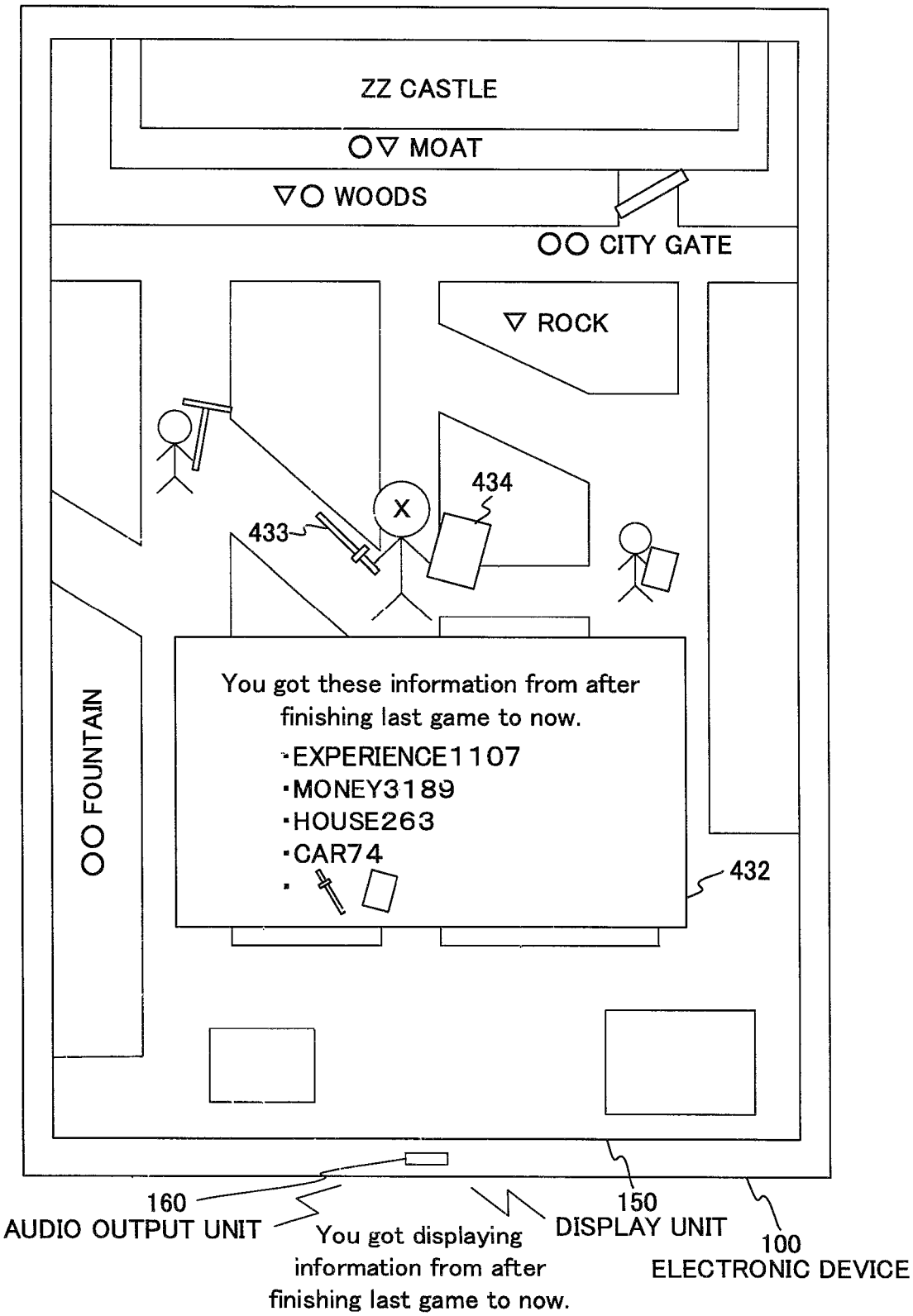
FIG. 28 is a diagram showing an example of display when the display unit displays the provision information.

FIG. 28 is a diagram showing an example of a display in a case where provision information is displayed on the display unit 150 of the electronic device 100 according to the 2nd embodiment. FIG. 28 shows an example in which, on the screen of the story game on the display unit 150 of the electronic device 100, provision information acquired in a predetermined period of time is displayed.

The control unit 120 of the electronic device 100 is possible to output the provision information (e.g., audio output, image display, and transmission to another device) during a predetermined period of time (e.g., a period of time from the previous display of information) at a predetermined output timing (e.g., when a story game is started, when the device is instructed by a user's operation, a predetermined time is reached). For example, the control unit 120 of the electronic device 100 sequentially stores the provision information acquired in a predetermined period in the storage unit 130. Then, when a predetermined output timing is reached, the control unit 120 of the electronic device 100 can display the list of the provision information acquired in the predetermined time period in the provision information display region 432. For example, for an experience value, a money, a house, a vehicle, and the like, each calculation result (e.g., a total value) is displayed along with each item. Also, an image representing a tool is displayed as for the tool.

[An Example of Providing Information Related to Growing Game]

FIG. 29 is a simplified diagram showing an example of transition of a growing game displayed on the display unit 150 of the electronic device 100 in the 2nd embodiment. In FIG. 29, in a game for growing fish displayed on the display unit 150 of the electronic device 100, a transition in which the fish grow is shown in time series.

Here, a growing game is a game for growing an animal, a plant, or the like. For example, a growing game is a game in which a character (a predetermined sign) of an animal, a plant, or the like performs a growth while playing various roles or performing various experiences (e.g., adventure, exploration, and competition). FIG. 29 shows a game in which a fish grows.

FIG. 29 (1) shows an example in which a freshly born fish (fry) is displayed in a growing game. In addition, FIG. 29 (2) shows an example in which a slightly growing fish is displayed in a growing game. FIG. 29 (3) shows an example in which a greatly growing of fish is displayed in a growing game. In FIG. 29, for ease of explanation, an example is shown in which the whole of a game growing on a display screen of the display unit 150 of the electronic device 100 is displayed, for ease of explanation. A field of the game may be a larger area than a display screen of the display unit 150, or a game may be played using a plurality of screens (for example, a screen having a hierarchical structure). In addition, while FIG. 29 shows an example of a game in which 1 fish are grown, a plurality of fish may be grown, or a plurality of types of fish, different types of animals, or a plant may be grown. In addition, displacement (e.g., displacement from fish to cow) may be performed during growing. Thus, a growing game may be referred to as a growing game, a watching game, a breeding game, a pet game, and the like.

A control unit 120 of an electronic device 100 displays a game growing on a display unit 150 based on a program stored in a storage unit 130 (e.g., an application of a growing game). Further, the control unit 120 of the electronic device 100 controls various operations for growing the fish based on a user operation (e.g., a user operation on an operation unit, a user operation based on a user's voice input, or an operation based on a change in the posture of the electronic device 100).

Further, the control unit 120 of the electronic device 100 displays the various kinds of information on the fish in the display unit 150 based on the radio wave output from another device. For example, the control unit 120 of the electronic device 100 displays the fish on the display unit 150 by adding a bait or an external enemy on the basis of radio waves output from a plurality of other devices.

[An Example of an Information to be Provided to the Character of a Growing Game]

FIG. 30 is a diagram showing an example of a correspondence relationship between the provision information OI determined by the electronic device 100 according to the 2nd embodiment and the provision information 461,462, 463. Note that the determination information (table) used in determining the provision information may be the above-described determination information (FIG. 3, FIG. 9, FIG. 14, and FIG. 19). These pieces of information are stored in the storage unit 130 of the electronic device 100.

Although FIG. 30 shows an example of providing 3 or more pieces of information as provision information, information of 1 or 2 may be provided.

For example, when the OIHH 1 is determined as the provision information OI, "Be attacked by shark", "Being caught", and "Become Taiyaki" are to be provided. In this case, provision information of 1 or 2 may be selected by user operation from the provision information of 3, or all of the provision information of 3 (for example, in the order from 1 to 3) may be experienced by fish. For example, when providing the fish with the provision information of "be attacked by shark", the shark is displayed on the display unit 150 together with the fish to be grown, and the state in which the fish to be grown escape from the shark is sequentially displayed. Further, for example, in a case where provision information of "being caught" is to be experienced by fish, a state in which fish to be grown is caught by a person is displayed on the display unit 150, and a state in which the fish to be grown escapes from the rod is sequentially displayed. Further, for example, in a case where the provision information of "becoming a Taiyaki" is to be experienced by fish, a state in which the fish to be grown becomes a Taiyaki is displayed on the display unit 150, and a state in which the fish to be grown wakes up from the dream of the Taiyaki is sequentially displayed.

In this manner, in a game in which a fish is grown, an image related to the provision information is displayed simultaneously or sequentially. Alternatively, in a game for growing fish, audio information related to the provision information may be outputted simultaneously or sequentially.

For example, in a growing game, when a user performs a user operation for starting a game, an egg or a fry of a fish to be grown is displayed on the display unit 150. Thereafter, the fish can be automatically grown until becoming large. For example, when the user carries the electronic device 100, the provision information is sequentially acquired according to the environment around the electronic device 100. Then, when a user performs a display instruction operation of a game to be grown, a fish grown on the basis of the acquired provision information is displayed on the display unit 150. Alternatively, after the user performs the display instructing operation of the growing game, the transition of fish growing based on the acquired provision information may be sequentially displayed on the display unit 150. Further, fish may be grown based on user's operation.

The control unit 120 of the electronic device 100 can perform a process (for example, an increase in height, making a friend, or the like) based on the provision information acquired in a predetermined time period (for example, in a case where a display instruction operation of a growing game is performed and a predetermined time is reached) in a predetermined period (for example, a period from a display of a previous game). For example, the control unit 120 of the electronic device 100 sequentially stores the provision information acquired in a predetermined period in the storage unit 130. When a predetermined output timing is reached, the control unit 120 of the electronic device 100 performs processing based on the provision information acquired in a predetermined period of time.

[An Example of Providing Information Related to Roaming Game]

FIG. 31 is a simplified diagram showing an example of a transition of a game of a roaming game displayed on the display unit 150 of the electronic device 100 according to the 2nd embodiment. In FIG. 31, in the case of roaming game displayed on the display unit 150 of the electronic device 100, a transition in which a sheep of a main member travels in the world is shown in a time series.

In this case, a roaming game is a game in which a user can enjoy a situation in which an animal, a plant, or the like is growing or moved. For example, a roaming game is a game in which a character (a predetermined sign) such as an animal, a plant, or the like carries a variety of roles (e.g., a traveler) or performs various kinds of experiences (e.g., a memorial photo shooting at a tourist site, sightseeing at a tourist site), and travels throughout a world. FIG. 31 shows a game in which a sheep travels.

FIG. 31 (1) shows an example in which a hero's sheep is displayed in a roaming game. In FIGS. 31 (2) and (3), the example as which the sheep after traveling in a predetermined place is displayed is shown. By FIG. 31, in order to describe easily, the example which displays the whole roaming game on the display screen of the display part 150 of the electronic device 100 is shown, but it may be made to make the field of a roaming game into a region wider than the display screen of the display part 150, and may be made to perform a roaming game using a plurality of screens (for example, screen of a layered structure). In addition, although FIG. 31 shows an example of a game in which 1 sheep are to being roamed, a plurality of sheep may be allowed to be roamed, and a plurality of types of animals, different types of animals, or the like may be grown. In addition, displacement (for example, displacement from sheep to cow) may be performed in the middle of the process of roaming. In this way, a roaming game can be referred to as a leaving game.

The control unit 120 of the electronic device 100 causes the display unit 150 to display a roaming game based on a program stored in the storage unit 130 (for example, an application of a roaming game). Further, the control unit 120 of the electronic device 100 controls various operations for causing the sheep to be roamed based on a user operation (for example, a user operation on an operation unit, a user operation based on a user's voice input, or an operation based on a change in posture of the electronic device 100).

Further, the control unit 120 of the electronic device 100 displays the various kinds of information on the sheep of the display unit 150 based on the radio wave output from another device. For example, the control unit 120 of the electronic device 100 may add, on the basis of radio waves output from a plurality of other devices, a charge, a travel margin, a food, a memorial souvenir at a roaming place, and a photograph at a roaming place on the display unit 150.

[An Example for Providing Information to Character in Roaming Game]

FIG. 32 is a diagram showing an example of a correspondence relationship between the provision information OI determined by the electronic device 100 according to the 2nd embodiment and the provision information 471,472, 473. Note that the determination information (table) used in determining the provision information may be the above-described determination information (FIG. 3, FIG. 9, FIG. 14, and FIG. 19). These pieces of information are stored in the storage unit 130 of the electronic device 100.

Although FIG. 32 shows an example of providing 3 or more pieces of information as provision information, information of 1 or 2 may be provided.

For example, when the OIHK 9 is determined as the provision information OI, "Get a camera", "Get 10 kg of grass", and "Be trimmed a part of fleece" are to be provided. In this case, the provision information of 1 or 2 may be selected by a user operation from the provision information of 3, or all of the provision information of 3 (for example, in the order from 1 to 3) may be experienced by the sheep based on a predetermined rule (for example, the 1 provision information→the 2 provision information→the 3 provision information). For example, if provision information of "get a camera" is made to be experienced by the sheep, the sheep that got a strap with camera is displayed on the display unit 150. Then, when the sheep goes to travel after that, the sheep can be set as getting a photograph taken by the camera and going back to home. In addition, for example, in order to allow the sheep to experience the provision information "get 10 kg of grass", the display unit 150 displays a state in which the sheep eats the acquired grass. Then the user may be prompted to place the remaining grass into a lunch box. Further, for example, in the case where provision information of "Be trimmed a part of fleece" is made to be experienced by the sheep, a state in which the fleece of the sheep is trimmed by someone is displayed on the display unit 150, and thereafter, a state of the sheep without a portion of the fleece is sequentially displayed until a predetermined time elapses.

In this way, in a roaming game, images related to provision information are displayed simultaneously or sequentially. Alternatively, in the roaming game, audio information related to provision information may be output simultaneously or sequentially.

For example, in a roaming game when a user's operation for starting a game is performed, a main sheep is displayed on the display unit 150. Thereafter, on the basis of various kinds of information to be added to the sheep, the sheep can be automatically carried out to all of the world. For example, when the user carries the electronic device 100, the provision information is sequentially acquired according to the environment around the electronic device 100. Then, when the user performs the display instruction operation of the roaming game, on the basis of the acquired provision information, the sheep in the roaming area or the sheep that returns to the home is displayed on the display unit 150. Alternatively, after the user has performed a display instruction operation for the roaming game, the display unit 150 may sequentially display history information (for example, a memorial photograph at a sightseeing location) of each area in which the sheep has moved in the past based on the acquired provision information. For example, when pressing operation of the "TRAVEL HISTORY" button 481 shown in FIGS. 31 (2) and (3) is performed, the historical information (for example, the place (for example, a tourist resort name, the name of a place, the name of a country) which traveled, the time which took the trip) in which the sheep traveled in the past is displayed on the display part 150. Also, when a pressing operation of the "TRAVEL PICTURE" button 482 shown in FIG. 31 (2) is performed, a picture information (for example, a memorial photograph at a place where a journey is made) at a place where the sheep has traveled in the past is displayed on the display unit 150. Further, for example, when a pressing operation of the "SOUVENIR" button 483 shown in (2) and (3) of FIG. 31 is performed, the souvenir product information (e.g., a specialty of a place where a journey has been made, an image of a specialty, an explanation of a souvenir, and the like) at a place where the sheep has traveled in the past is displayed on the display unit 150. Further, the sheep may be travel based on user's operation.

When a predetermined timing (for example, display instruction operation of a roaming game is performed, predetermined time has lapsed, or the like) is reached, the control unit 120 of the electronic device 100 performs processing based on the provision information (for example, travel to Gunma prefecture, travel to Okinawa) acquired in a predetermined period of time (for example, period of time from displaying the last roaming game). For example, the control unit 120 of the electronic device 100 causes the storage unit 130 to store the provision information in the predetermined period of time. Then the control unit 120 of the electronic device 100 performs the process based on the provision information acquired in the predetermined period of time when a predetermined output timing.

[An Example of Operation of Game]

Figure 33:
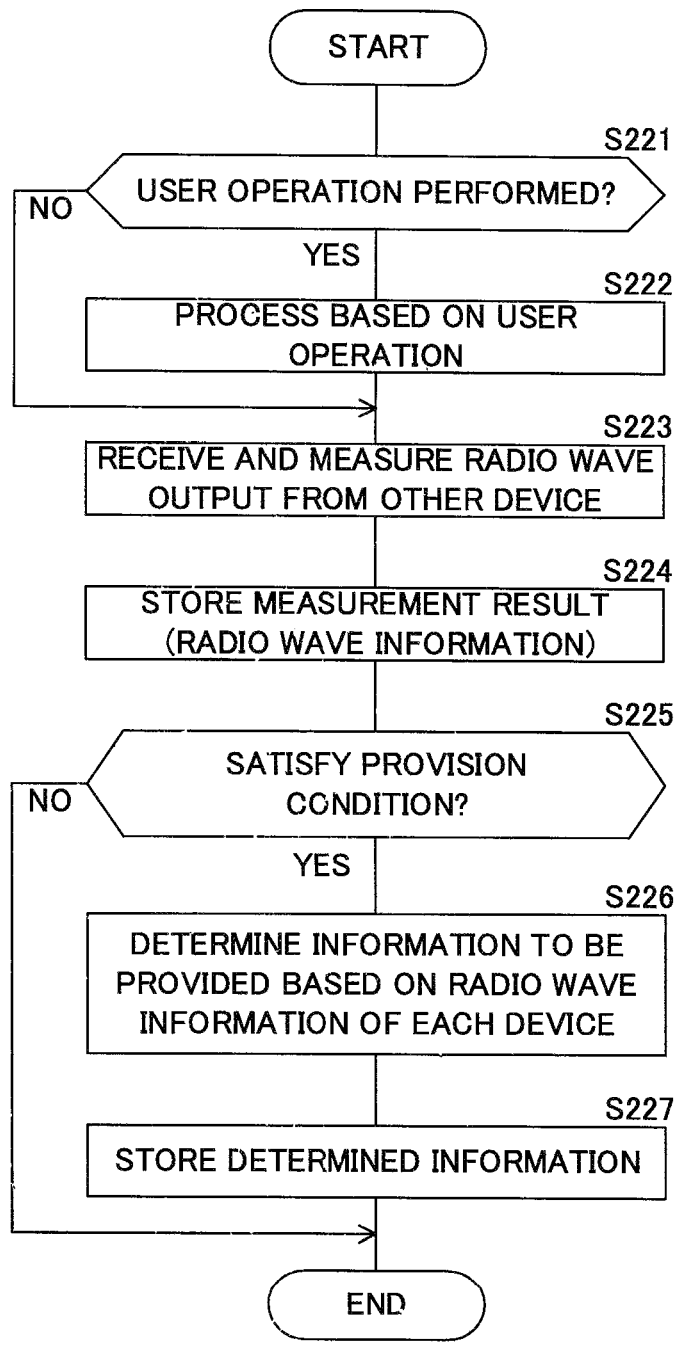
FIG. 33 is a diagram showing an example of the provision information determination process performed by the electronic device.

FIG. 33 is a flowchart showing an example of the provision information determination process performed by the electronic device 100 according to the 2nd embodiment. FIG. 33 is a modification of FIG. 8 and Steps S223-S226 correspond to Steps S201-S204 in FIG. 8. Therefore, in FIG. 33, a difference from FIG. 8 will be mainly described.

First, the control unit 120 (shown in FIG. 2) of the electronic device 100 determines whether or not a user operation has been performed (Step S 221). For example, when any of the operation buttons 81 shown in FIG. 25 (1) has been pressed, it is judged that a user operation has been performed. If no user operation is performed, the process proceeds to step S223.

When a user operation is performed (Step S221), the control unit 120 of the electronic device 100 performs processing based on the user operation (Step S222). For example, when any of the operation buttons 81 shown in FIG. 25 (1) has been pressed, the control unit 120 of the electronic device 100 transmits, to the display device 410, information for causing the character A to perform an operation corresponding to the pressed button.

Next, the control unit 120 of the electronic device 100 measures the radio wave received by the communication unit 110 and acquires the radio wave information (for example, the radio wave intensity and the type of the device) (Step S223). And the control unit 120 of the electronic device 100 causes the storage unit 130 to store acquired radio wave information in each devices (Step S224). This radio wave information acquisition process may be performed periodically or irregularly.

Next, the control unit 120 of the electronic device 100 determines whether or not the provision condition is satisfied (Step S225). And when provision conditions are not satisfied, operation is ended, and in the provision conditions are satisfied, it proceeds to Step S226.

Here, as a judgement criterion which judges whether the provision condition is satisfied or not, for example, it is possible to use whether or not the desired provision information (for example, desired tool, desired experience) can be determined as a target to be provided, whether or not a predetermined user operation (for example, a pressing operation of an "get" button 82 shown in FIG. 25 (1)) has been performed, and whether or not new provision information (for example, a desired tool or a desired experience) can be acquired. Note that the predetermined time period can be determined based on, for example, an elapsed time after the power of the electronic device 100 is turned on and an elapsed time after the last information (provision information) is provided after the power of the electronic device 100 is turned on. Further, a predetermined time may be set as a preset time, or a time corresponding to a user's preference may be set by a user operation.

When satisfying provision condition, (Step S225), the control unit 120 of the electronic device 100 determines the information used as a providing object based on the radio wave information currently held at the storage unit 130 (Step S226).

Next, the control unit 120 of the electronic device 100 stores the information determined as the provision target in the storage unit 130 (Step S227). As described above, for example, the provision information stored in the storage unit 130 can be used based on a user operation. For example, by pressing the "Use" button 83 shown in FIG. 25 (2), the acquired tool can be used.

Thus, the electronic device 100 (the control unit 120) can determine at least one contents (a plurality of information given to the character of a versus fighting game, a plurality of information given to the character of a story game, a plurality of information given to the character of the growing game, and a plurality of information given to the character of a roaming game) that is provided to a user based on the radio wave (one or more radio wave including the radio wave which is not addressing to an own device) output from the device which exists in the periphery.

Also, the electronic device 100 selects and executes at least one processing from a plurality of processing which are different from processing relating to radio communication (for example, a processing of progressing a game, a processing of imparting information to a character of a game) based on the radio wave or processing utilizing radio communication based on the radio wave based on 1 or more radio waves including radio waves output from devices existing in the periphery and not directed to the own device.

The 3rd Embodiment: An Example of Providing Information Using Positional Information The 1st and 2nd embodiment showed the example which provides a variety of information using the radio wave output from other devices. However, it is also possible to provide various kinds of information using the positional information together with radio waves output from other devices. Thus, for example, various kinds of information can be provided for each area. Note that the 3rd embodiment is a modification of the 1st and 2nd embodiments, and a common part of the description of the 1st and 2nd embodiments will be omitted.

[A Functional Configuration Example of the Electronic Device]

Figure 34:
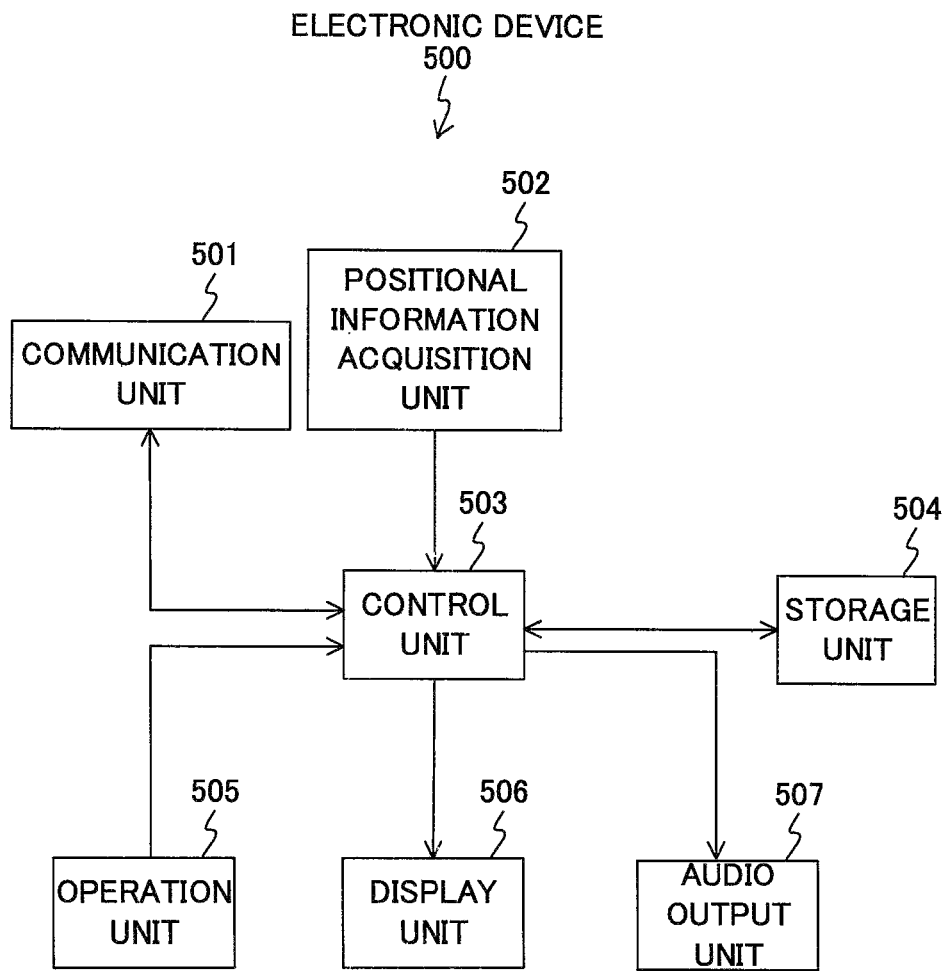
FIG. 34 is a diagram showing an example of functional configuration of an electronic device according to the 3rd embodiment.

FIG. 34 is a block diagram showing an example of a functional configuration of an electronic device 500 according to the 3rd embodiment.

The electronic device 500 includes a communication unit 501, a positional information acquisition unit 502, a control unit 503, a storage unit 504, an operation unit 505, a display unit 506, and an audio output unit 507. Note that the electronic device 500 is obtained by adding the positional information acquisition unit 502 in the electronic device 100 shown in FIG. 2, and the other portion is common to the electronic device 100 shown in FIG. 2. For this reason, a point different from the electronic device 100 shown in FIG. 2 will be mainly described here.

The positional information acquisition unit 502 acquires positional information regarding a position where the electronic device 500 exists, and outputs the acquired positional information to the control unit 503. For example, the positional information acquisition unit 502 may be realized by a GPS receiver that receives a GPS (Global Positioning System: Global Positioning System) signal and calculates positional information based on the GPS signal. Further, the calculated positional information includes respective data relating to positions such as latitude, longitude, and altitude at the time of receiving the GPS signal. In addition, it is also possible to use a positional information acquiring device which acquires positional information by using another method of acquiring positional information. For example, it is also possible to use a positional information acquiring device which derives positional information using access point information of wireless LAN existing in the periphery and acquires this positional information. Further, for example, a positional information acquiring device may be used which derives positional information using positional information of a base station used for call and communication, and acquires this positional information. Further, for example, a positional information acquiring device may be used which derives positional information using a position estimation technique using a navigation device (e.g., a car navigation device) and acquires this positional information. For example, the position of the own device can be estimated based on the sensor information by the various sensors (e.g., acceleration sensor and gyro sensor) and the map information.

[A Provision Information Example of Each Specific Area]

FIG. 35 is a diagram showing an example of a correspondence relationship between a specific area 511 used in determining the provision information by the electronic device 500 according to the 3rd embodiment, the provision information OI (512), and the provision information (the audio information 513 and the image information 514).

A specific area 511 is an area that provides a particular content. For example, it may be a country unit, a prefecture unit, a city town unit, a public facility unit (e.g., school, park), a commercial facility unit (e.g., a shopping center, a park, a theme park), etc. For example, when the current position of the electronic device 500 is specified based on the positional information acquired by the positional information acquisition unit 502 of the electronic device 500 and it is included in an area (e.g., area A, area B) registered in the specific area 511, information to be provided is determined from the provision information associated with the area including the current location of the electronic device 500 (e.g., area A and area B).

For example, when the current position of the electronic device 500 is not included in the area registered in the specific area 511, the information to be provided is determined from the normal provision information (the provision information associated with the specific area 511 "−" shown in FIG. 35). Further, for example, when the current position of the electronic device 500 is included in the area A registered in the specific area 511, information to be provided is determined from the provision information associated with the specific area 511 "Area A" shown in FIG. 35. Further, for example, when the current position of the electronic device 500 is included in the area B registered in the specific area 511, information to be provided is determined from the provision information associated with the specific area 511 "Area B" shown in FIG. 35.

For example, when a specific area is a city and town, it is possible to consider a content which introduces the city and town as the provision information (content group) associated with a specific area, a special product concerning the city and town and village, a discount coupon of each facility existing in the city and town, and a favorite coupon. Also, for example, when a particular area is a shopping center, as the provision information (content group) associated with a specific area, there may be considered contents which introduce special sale items in the shopping center, various kinds of information which can be used in the shopping center (for example, points, coupons, discount tickets, and favorite tickets).

[An Operation Example for Determining Provision Information Using Positional Information]

Figure 36:
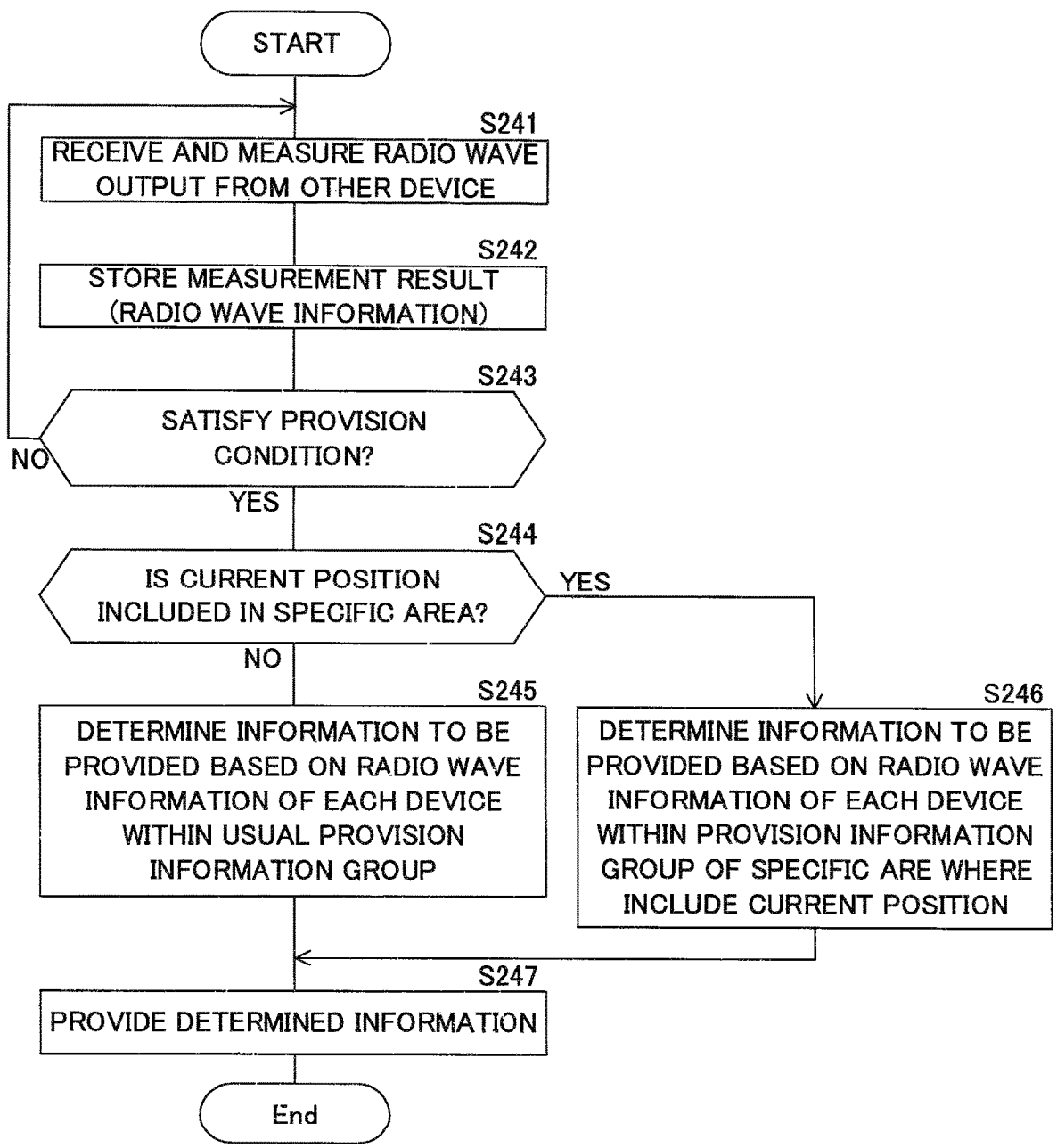
FIG. 36 is a diagram showing an example of content output process performed by the electronic device.

FIG. 36 is a flowchart illustrating an example of a content output process performed by the electronic device 500 according to the 3rd embodiment. FIG. 36 is a modification of FIG. 8, and the step S241-S243,S247 corresponds to the step S201-S203,S205 shown in FIG. 8. Therefore, in FIG. 36, a difference from FIG. 8 will be mainly described.

When the provision condition is satisfied (Step S243), the control unit 503 of the electronic device 500 grasps the current position of the electronic device 500 based on the positional information acquired by the positional information acquisition unit 502, and determines whether or not the current position is included in the specific region (Step S244).

For example, area information (e.g., information for specifying an area A according to latitude and longitude) for specifying each area (e.g., area A shown in FIG. 35) registered in the specific area 511 is stored in the storage unit 504 then, the control unit 503 of the electronic device 500 determines whether or not the current position is included in the specific area by determining whether or not the current position (latitude and longitude of the position where the electronic device 500 exists) specified based on the positional information acquired by the positional information acquisition unit 502 is included in the area information. Further, it is also possible to determine whether or not the current position is included in a specific area using map information.

When the current position of the electronic device 500 is not included in a specific area (Step S244), the control unit 503 of the electronic device 500 determines the information to be provided from the regular provision information group based on the radio wave information of each devices currently held at the storage unit 504 (Step S245).

When the current position of the electronic device 500 is included in a specific area (Step S244), the control unit 503 of the electronic device 500 determines the information to be provided from the provision information group related with the specific area where includes the current position of the electronic device 500 based on the radio wave information of each devices currently held at the storage unit 504 (Step S246).

For example, in a case where the current position of the electronic device 500 is included in the area A (shown in FIG. 35) (Step S244), the control unit 503 of the electronic device 500 determines the information to be provided from the provision information group related with the area A (each information group related to area A shown in FIG. 35) where includes the current position of the electronic device 500 based on the radio wave information of each devices currently held at the storage unit 504 (Step S246).

The 4th Embodiment: An Example of Providing Information Using Radio Wave Information Acquired by the Other External Devices In the 1-3rd embodiments, examples showed the case that provides a variety of information using the radio wave output from other devices which exists in the periphery of an own device. However, it is also possible to acquire radio wave information using an external device other than the own device and to provide various information using the radio wave information. For example, a wearable device (e.g., a smart watch, smart glasses) having a communication function. The wearable device acquires radio wave information output from other devices existing around the wearable device, and passes the radio wave information to the smart phone (e.g., transmits and transfers), and the smart phone can provide various information using the radio wave information. Thus, for example, it is possible to acquire radio wave information using devices (e.g., a wearable device) which is easily worn by a user, and it is possible to provide various kinds of information by using the radio wave information in devices (e.g., a smartphone) having a high user interface. In addition, the 4th embodiment is a modification of the 1st to 3rd embodiments, and a part of the description of the 1st to 3rd embodiments will be omitted.

[A Functional Configuration Example of Electronic Device]

Figure 37:
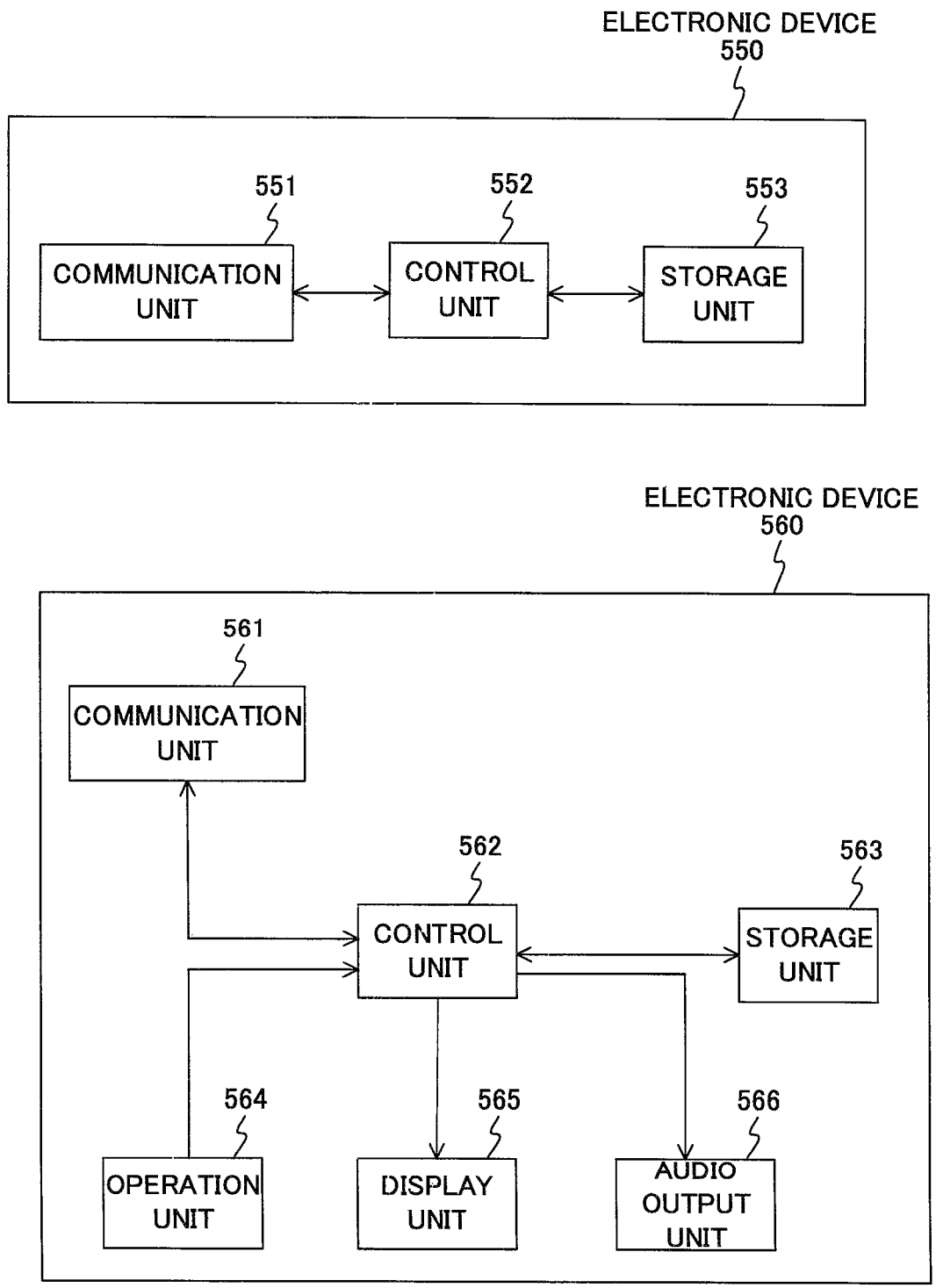
FIG. 37 is a diagram showing an example of functional configuration of an electronic device according to the 4th embodiment.

FIG. 37 is a block diagram showing a functional configuration of the electronic devices 550 and 560 according to the 4th embodiment.

The electronic device 550 includes a communication unit 551, a control unit 552, and a storage unit 553. Note that, in the electronic device 550, the operation unit 140, the display unit 150, and the audio output unit 160 are omitted in the electronic device 100 shown in FIG. 2, and other units are common to the electronic device 100 shown in FIG. 2. For this reason, a point different from the electronic device 100 shown in FIG. 2 will be mainly described here. In addition, the electronic device 550 may be a portable device (e.g., a wearable device (e.g., a wristwatch device or an eyeglass device)). Further, the electronic device 550 may be, for example, a smartphone, a tablet terminal, a personal computer, or the like as a portable information processing device. Further, the electronic device 550 may be a stationary device, and may be, for example, an AI speaker equipped with an artificial intelligence (AI (Artificial Intelligence)), a speaker having a wireless communication function, or the like.

The communication unit 551 receives radio waves output from another device under control of the control unit 552. Then, the communication unit 551 outputs various kinds of information related to the received radio wave to the control unit 552. Note that the communication unit 551 may be a simple device having only a reception function, or may be a device having a transmission/reception function. When the communication unit 551 has a transmission/reception function, the control unit 552 can wirelessly transmit various kinds of information from the communication unit 551 to another device (the electronic device 560).

The storage unit 553 is a memory for storing various kinds of information. For example, the storage unit 553 stores various kinds of information (for example, a control program) necessary for the electronic device 550 to perform various processes. Note that the storage unit 553 may be a removable storage unit or a built-in storage unit. Also, both of these may be used.

The electronic device 560 includes a communication unit 561, a control unit 562, a storage unit 563, an operation unit 564, a display unit 565, and an audio output unit 566. Note that the electronic device 560 is common to the electronic device 100 shown in FIG. 2. For this reason, a point different from the electronic device 100 shown in FIG. 2 will be mainly described here.

[A Communication Example in the Case that Providing Information Using Radio Wave Information Acquired by the Other Devices]

Figure 38:
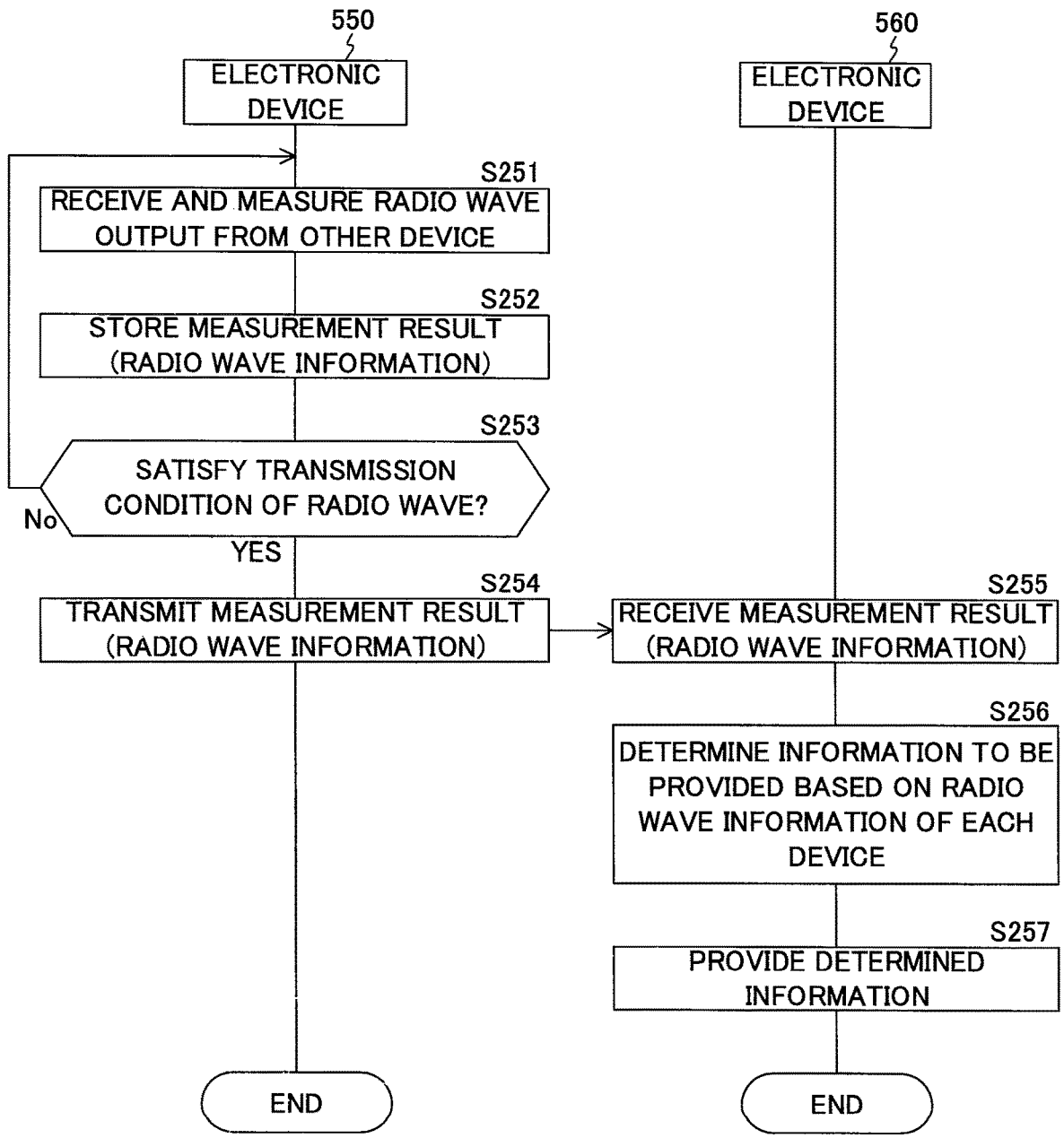
FIG. 38 is a diagram showing an example of communication processing performed by electronic devices.

FIG. 38 is a flowchart illustrating an example of communication processing performed by the electronic device 550 and the electronic device 560 according to the 4th embodiment. Note that the Steps S251,S252,S256,S257 shown in FIG. 38 corresponds to the Steps S201,S202,S204,S205 shown in FIG. 8. For this reason, a difference from the example shown in FIG. 8 will be mainly described. In addition, it is assumed that an application (program) for realizing each process shown in FIG. 38 is set in advance in the electronic devices 550 and 560.

First, the control unit 552 of the electronic device 550 measures the radio wave received by the communication unit 551 and acquires the radio wave information (for example, the radio wave intensity and the type of the device) (Step S251). Then, the control unit 552 of the electronic device 550 stores the acquired radio wave information in the storage unit 553 for each device (Step S252). This radio wave information acquisition process may be performed periodically or irregularly.

Next, the control unit 552 of the electronic device 550 determines whether or not the radio wave information transmission condition is satisfied (Step S253). And when the radio wave information transmission condition is not satisfied, it returns to Step S251, and in satisfying a radio wave information transmission condition, it proceeds to Step S254.

As a criterion for determining whether or not the radio wave information transmission condition is satisfied, it is possible to use, for example, whether or not communication with the electronic device 560 (wireless communication or wired communication) is possible, and whether or not a predetermined user operation (e.g., transmission instructing operation) has been performed.

When satisfying a radio wave information transmission condition, (Step S253), the control part 552 of the electronic device 550 transmit the radio wave information currently held at the storage unit 553 to the electronic device 560 (Step S254). When the electronic device 550 does not have a wireless transmission function, it is possible to move the wireless wave information by other means (e.g., a wired communication, a movement using a recording medium, or a movement via a predetermined network). Further, the radio wave information transmitted to the electronic device 560 may be deleted from the storage unit 553.

When receiving radio wave information from the electronic device 550, the control unit 562 of the electronic device 560 causes the storage unit 563 to store the received radio wave information (Step S255). Next, the control unit 562 of the electronic device 560 determines information to be provided based on the received radio wave information (Step S256)

Next, the control unit 562 of the electronic device 560 provides the determined information (Step S257).

In addition, in the above, the example showed that determination information (for example, determination information shown in FIG. 3, FIG. 9, FIG. 14, and FIG. 19) and the provision information (for example, provision information shown in FIG. 4, FIG. 15, FIG. 20, FIG. 24, FIG. 27, FIG. 30, FIG. 32, and FIG. 35) are stored in the storage unit 130, 504, 563 in the electronic devices 100, 500, 560 in advance. However, these pieces of information may be acquired from the outside and used. For example, a communication unit (communication unit 110,501,561) capable of communicating with other devices via a wired line or a wireless line may be connected to an external device (or a predetermined network (e.g., the Internet)), and all or a part of the information may be acquired from an external device. In this case, each of the pieces of information may be acquired and used every time the provision information is determined in the electronic device, or each piece of information may be periodically or irregularly acquired and used.

Also, for example, a specific business operator (e.g., a company that provides a specific content or a discount coupon) may be affiliated to determine the provision information. For example, it is also possible to receive the provision of the determination information from a specific business operator and to output the information (e.g., a discount coupon, a specific content) provided from a specific business operator from the electronic device based on the determination information.

Alternatively, the user may register the provision information and determine the provision information from the registered provision information through the determination processing.

Thus, the electronic device 560 (the control unit 562) can determine at least one content to be provided to the user from a plurality of contents based on a radio wave (1 or more radio waves including a radio wave not directed to the electronic device 550) output from the device existing in the vicinity of the electronic device 550.

Further, the electronic device 560 (control unit 562) selects and executes at least one processing from among a plurality of processing different from the processing relating to radio communication and processing utilizing radio communication based on the radio wave based on a radio wave (a 1 or more radio waves including a radio wave not directed to the electronic device 550) output from a device existing in the periphery of the electronic device 550.

The 5th Embodiment: An Example of Causing Other Devices to Execute a Part of Process which is Executed in the Electronic Device The radio wave information is acquired by the electronic device owned by the user and the radio wave information is determined by using the radio wave information in the 1st to the 4th embodiments. Here, it is also assumed that it is difficult to have enough capacity of the storage unit in the case that the number of provision information are large. In addition, it is also assumed that there is a device having low processing capability among the electronic devices possessed by the user. Therefore, for example, it is also conceivable that, for example, a relatively small amount of information is held in an electronic device possessed by a user, and only a relatively simple process is performed, and other information is held and other processing is performed by another device having a large storage capacity and a high processing capability. Therefore, in the 5th embodiment, a part of the processing performed by the electronic device carried by the user is processed by another device.

[A Configuration Example of Communication System]

Figure 39:
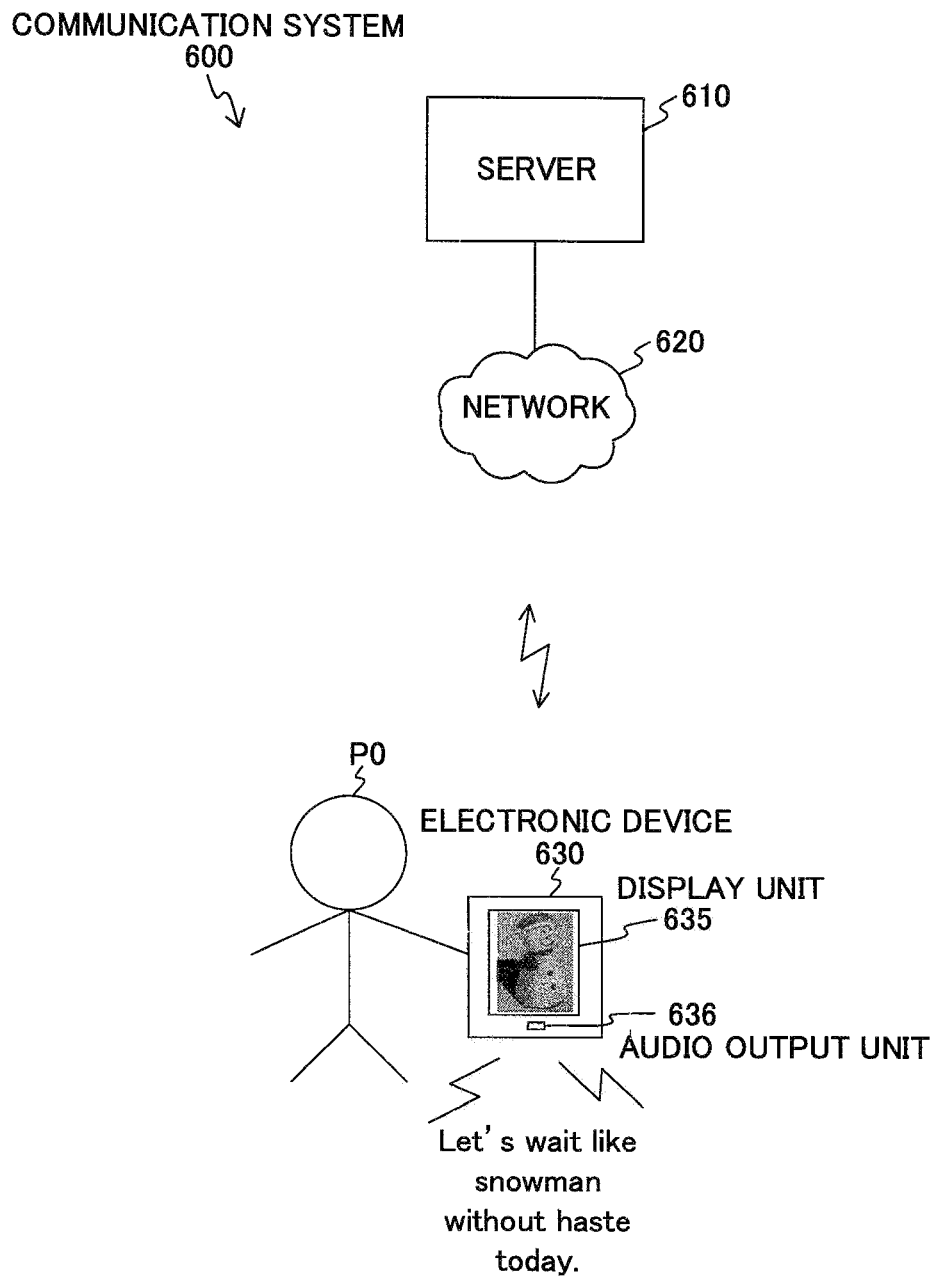
FIG. 39 is a diagram showing an example of a system functional configuration of a communication system according to the 5th embodiment.

FIG. 39 is a diagram showing an example of a system functional configuration of the communication system 600 according to the 5th embodiment.

The communication system 600 includes a server 610, a network 620, and an electronic device 630. Although a base station or an access point for performing wireless communication is assumed as a device constituting the communication system 600, a description and a description thereof will be omitted here.

The server 610 is a server (information processing device) that provides various kinds of information (provision information) to the electronic device 630 based on radio wave information output from the electronic device 630.

The network 620 is a network such as a public network or the Internet.

The electronic device 630 is an electronic device possessed by the user P 0 and performs wireless communication with another device (not shown) existing in the vicinity.

Further, the electronic device 630 has a communication unit 631 (shown in FIG. 40), and can be connected to the network 620 using wireless communication (e.g., connected via a base station or an access point managed by a communication carrier) to exchange information. Note that the electronic device 630 may be connected to the network 620 via another device (for example, a wireless LAN router) using wireless communication, so as to exchange information.

[A Functional Configuration Example of the Server and the Electronic Device]

Figure 40:
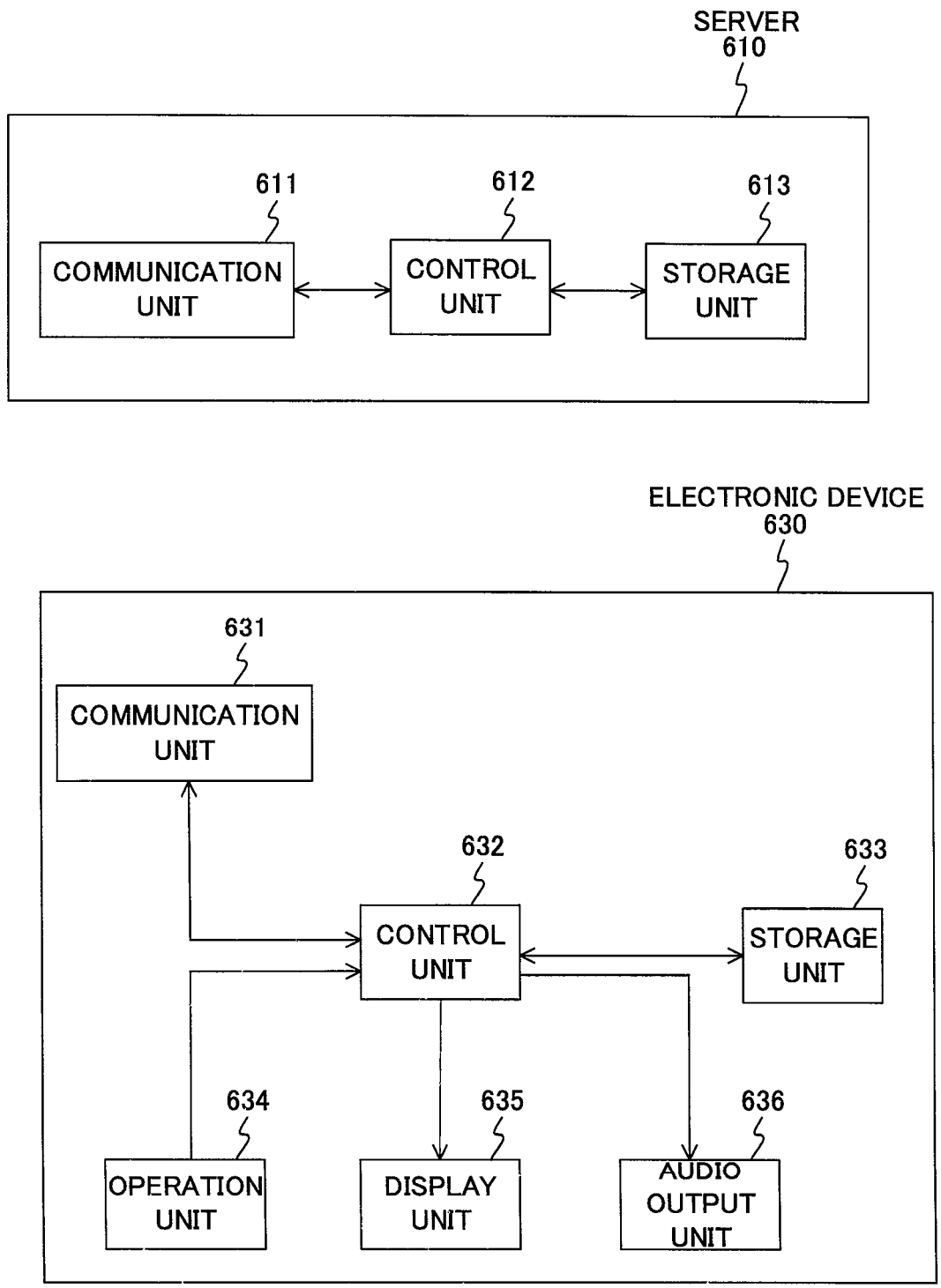
FIG. 40 is a diagram showing an example of a functional configuration of a server and an electronic device.

FIG. 40 is a block diagram showing a functional configuration example of the server 610 and the electronic device 630 in the 5th embodiment. Note that, since the functional configuration of the electronic device 630 is substantially the same as that of the electronic device 100 shown in FIG. 2, a description thereof will be omitted.

The server 610 includes a communication unit 611, a control unit 612, and a storage unit 613.

The communication unit 611 exchanges various kinds of information with other devices via a wired line or a wireless line under the control of the control unit 612. For example, the communication unit 611 exchanges various kinds of information with the electronic device 630 via the network 620.

The control unit 612 controls each unit of the server 610 based on a control program stored in the storage unit 613. For example, the control unit 612 is realized by a CPU.

The storage unit 613 is a memory for storing various kinds of information. For example, the storage unit 613 stores various kinds of information (for example, a control program) necessary for the server 610 to perform various processes. In addition, the storage unit 613 stores determination information (e.g., determination information shown in FIG. 3, FIG. 9, FIG. 14, and FIG. 19) for determining information to be provided on the basis of information (radio wave information output from the electronic device 630) acquired by the communication unit 611 via the network 620. Further, the storage unit 613 stores provision information (e.g., provision information shown in FIG. 4, FIG. 15, FIG. 20, FIG. 24, FIG. 27, FIG. 30, FIG. 32, and FIG. 35) provided to each electronic device (electronic device 630) connected via the network 620.

The electronic device 630 includes a communication unit 631, a control unit 632, a storage unit 633, an operation unit 634, a display unit 635, and an audio output unit 636. Note that the communication unit 631 in the electronic device 630 performs wireless communication with an electronic device existing within a predetermined range, and can communicate with a predetermined network (e.g., the Internet) via a base station installed in a communication carrier such as a cellular phone company.

[A Communication Example that the Server 610 Provides Information]

Figure 41:
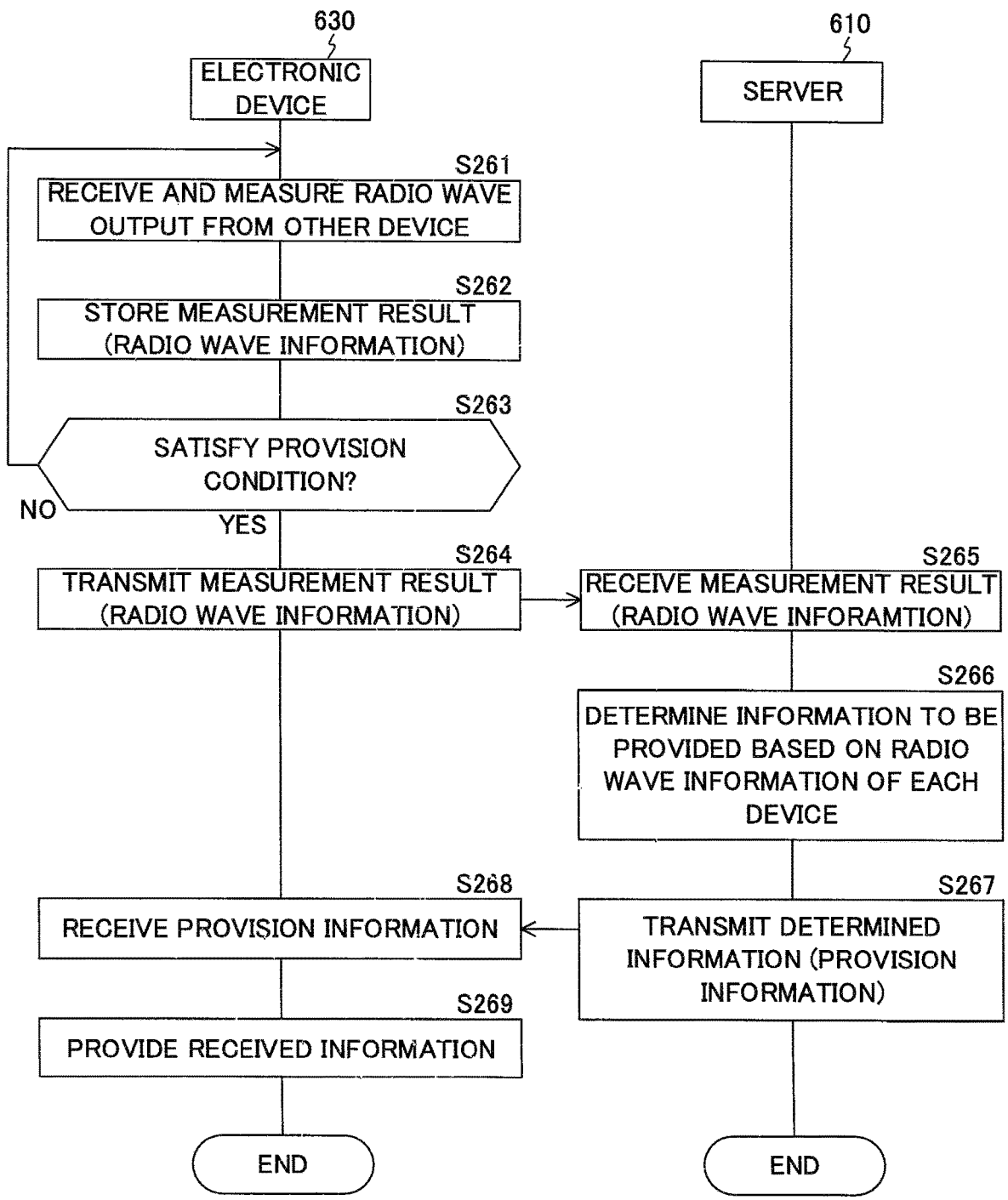
FIG. 41 is a diagram showing an example of communication processing performed by a server and an electronic device.

FIG. 41 is a flow chart which shows the example of communications processing by the server 610 and the electronic device 630 in the 5th embodiment. Note that the Steps S261,S262,S266 shown in FIG. 41 corresponds to the Steps S201,S202,S204 shown in FIG. 8. For this reason, a difference from the example shown in FIG. 8 will be mainly described. In addition, it is assumed that an application (program) for realizing each process shown in FIG. 41 is set in advance in the server 610 and the electronic device 630.

First, the control unit 632 of the electronic device 630 measures the radio wave received by the communication unit 631 and acquires the radio wave information (for example, the radio wave intensity and the type of the device) (Step S261). Then, the control unit 632 of the electronic device 630 stores the acquired radio wave information in the storage unit 633 for each device (Step S262). This radio wave information acquisition process may be performed periodically or irregularly.

Next, the control unit 632 of the electronic device 630 determines whether or not the provision condition is satisfied (Step S263). And when the provision condition is not satisfied, it returns to Step S261, and in satisfying the provision condition, it proceeds to Step S264.

It is to be noted that a criterion for determining whether or not the provision condition is satisfied may be the same as that shown in FIG. 8. Further, it is also possible to use whether or not communication (wireless communication, wired communication) with the server 610 has become possible, and whether or not a predetermined user operation (e.g., transmission instruction operation) has been performed.

In satisfying the provision condition, (Step S263), the control unit 632 of the electronic device 630 transmits the radio wave information currently held at the storage unit 633 to the server 610 (Step S264).

When receiving the radio wave information from the electronic device 630, the control unit 612 of the server 610 causes the storage unit 613 to store the received radio wave information (Step S265). Next, the control unit 612 of the server 610 determines the information used as a providing object based on the received radio wave information (Step S266).

Next, the control unit 612 of the server 610 transmits the information (provision information) determined on the basis of the received radio wave information to the electronic device 630 which has transmitted the received radio wave information (Step S267).

When receiving the information from the server 610, the control unit 632 of the electronic device 630 causes the storage unit 633 to store the received provision information (Step S268). Next, the control unit 632 of the electronic device 630 performs processing using the received information (Step S269). For example, the control unit 632 of the electronic device 630 performs the output process of the content based on the received information (Step S 269).

As described above, the server 610 (the control unit 612) can determine at least one content to be provided to the electronic device 630 from the plurality of contents based on the radio wave (1 or more radio waves including radio waves not directed to the electronic device 630) output from the devices existing around the electronic device 630.

The server 610 (control unit 612) can select at least one process from among a plurality of processes different from the process relating to radio communication based on the radio wave (one or more radio waves including the radio wave which is not addressing to the electronic device 630) output from the devices which exists in the circumference of the electronic device 630 and the process using radio communication based on the radio wave and allow the electronic device 630 to execute the process.

In addition, in the 5th embodiment, an example is shown in which the server 610 is configured by one device, but a plurality of devices (information processing systems) may be configured to perform various processes for realizing the function of the server 610. That is, each processing (each processing for determining the provision information) by the electronic device described in the 1st to 4th embodiments may be performed by a plurality of devices (information processing systems).

The 6th Embodiment: An Example of Providing Information Using the Positional Information or Registered Information of Device In the 1st to 5th embodiments, there is shown an example in which 1 or more devices exist in relatively close proximity (radio wave, e.g., radio wave of wireless LAN) to an electronic device used by a user. In such an environment, a device used by a user can perform each process (for example, exchange of contents) with a device of a communication partner using a radio wave output from the device of the communication partner. In addition, in such an environment, a device used by a user receives radio waves from devices other than the device of the communication partner. Thus, in the 1st to 5th embodiments, in such an environment, example showed that a process other than the processing based on the communication with the device of the communication partner is performed using the radio wave from the device of the communication partner and the other devices, and the enjoyment of the device used by the user is increased.

Here, for example, it is assumed that there is no other device in the vicinity of the electronic device used by the user (a range in which radio waves (e.g. radio waves of wireless LAN) reach). Even in such a case, it is considered that, if it is possible to provide various kinds of information by using the relationship between the own device and another device, it is possible to provide the enjoyment of using the device in various environments of the world. That is, also in such environment (environment where the other devices don't exist comparatively close to the electronic device which a user uses), it is considered that processing other than processing based on communication with the device of the communication partner is performed by using the relationship between the own device and other devices, and enjoyment of the device used by the user can be increased.

Therefore, in the 6th embodiment, the object is to provide enjoyment of a device used by a user using a relationship with another device existing around the device. In other words, in the 6th embodiment, an example is shown in which a predetermined network is used to grasp the relationship between its own device and another device and to provide various information using this relationship. In addition, the 6th embodiment is a modification of the 1st to 5th embodiments, and a part of the description of the 1st to 5th embodiments will be omitted.

[A Configuration Example of Communication System]

Figure 42:
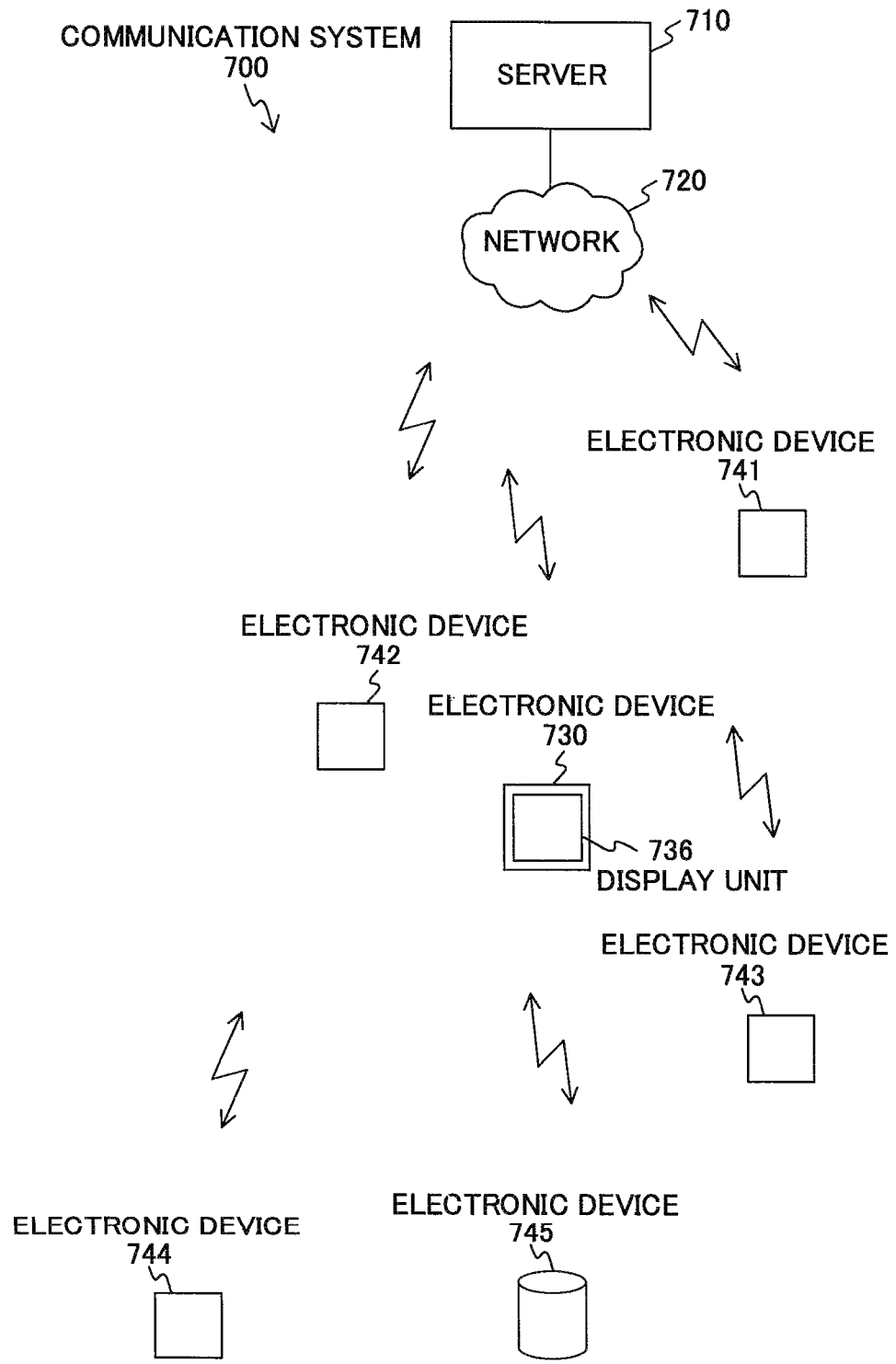
FIG. 42 is a diagram showing an example of a system functional configuration of a communication system according to the 6th embodiment.

FIG. 42 is the figure showing the system functional configuration example of the communications system 700 in the 6th embodiment.

The communication system 700 includes a server 710, a network 720, and an electronic device 730,741-745. Although the base station, access point for performing a wireless communication and other electronic devices, etc. are assumed as devices which constitutes the communications system 700, a graphic display here and description are omitted.

The server 710 is a server (information processing device) that manages information (registration information) relating to a plurality of devices (e.g., an electronic device 730,741-745). Further, the server 710 acquires positional information periodically or irregularly transmitted from a plurality of devices (e.g., an electronic device 730,741-745), and manages the location information. Further, the server 710 provides various kinds of information (provision information) to each device (for example, an electronic device 730,741-745) based on the managed positional information. The registration information managed by the server 710 will be described with reference to FIG. 44.

The network 720 is a network such as a public network or the Internet.

An electronic device 730,741-745 is an electronic device that connects (e.g., connects via a base station or an access point managed by a carrier) to a network 720 using wireless communication or wired communication to exchange information. Note that the electronic device 730,741-745 may be connected to the network 720 via another device (for example, a wireless LAN router) using wireless communication or wired communication, so as to exchange information. Further, the electronic device 730,741-745 may be configured to perform wireless communication with other devices existing in the vicinity.

[A Functional Configuration Example of the Server and the Electronic Device]

Figure 43:
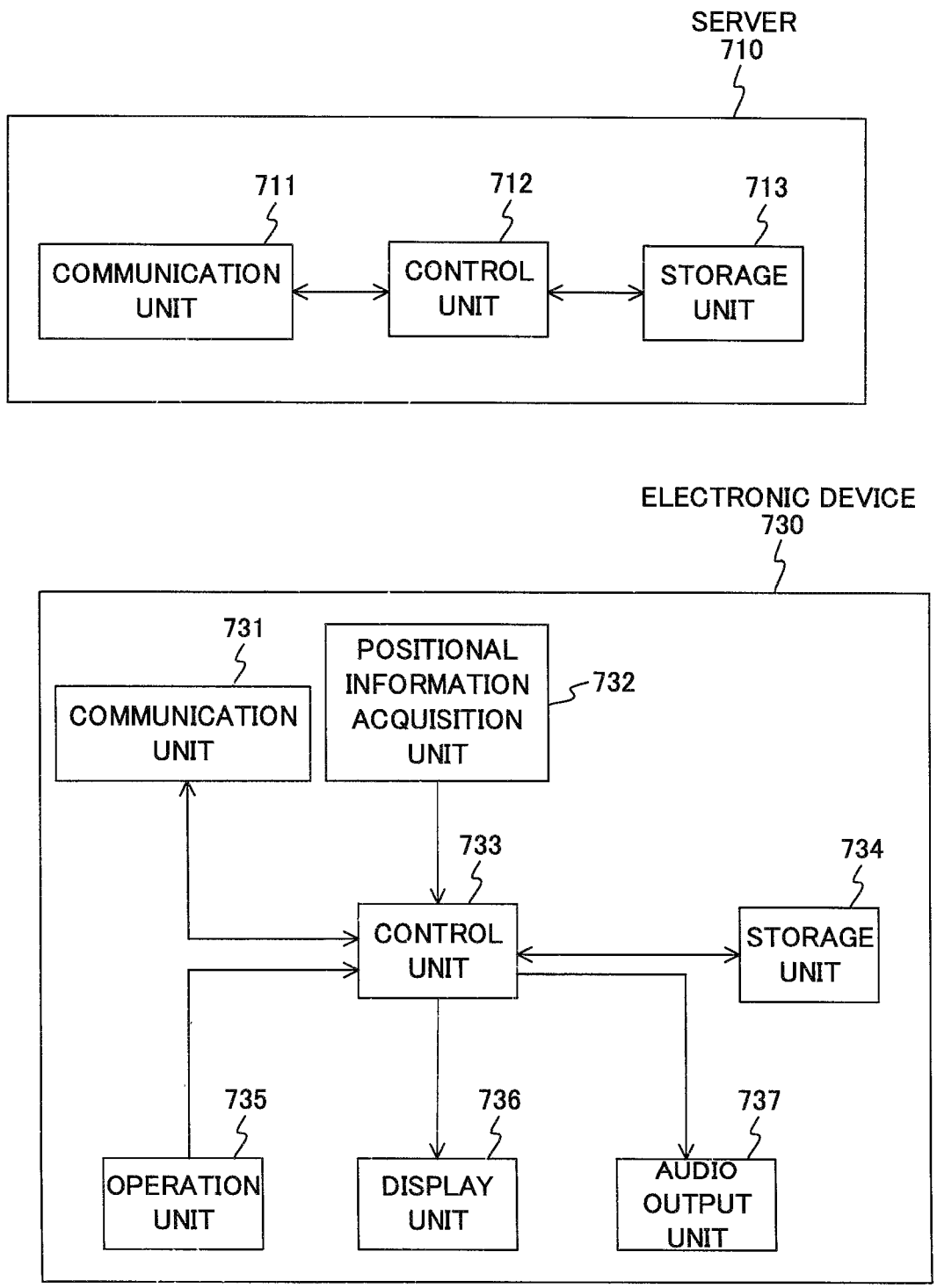
FIG. 43 is a diagram showing an example of a functional configuration of a server and an electronic device.

FIG. 43 is a block diagram showing a functional configuration example of the server 710 and the electronic device 730 in the 6th embodiment. Note that, since the functional configuration of the electronic device 730 is substantially the same as that of the electronic device 500 shown in FIG. 34, a description thereof will be omitted. Since the functional configurations of the electronic devices 741 to 745 are substantially the same as those of the electronic device 500 shown in FIG. 34 the description thereof will be omitted.

The server 710 includes a communication unit 711, a control unit 712, and a storage unit 713.

The communication unit 711 exchanges various kinds of information with other devices via a wired line or a wireless line under the control of the control unit 712. For example, the communication unit 711 exchanges various kinds of information with the electronic device 730 via the network 720.

The control unit 712 controls each unit of the server 710 based on a control program stored in the storage unit 713. For example, the control unit 712 is realized by a CPU.

The storage unit 713 is a memory for storing various kinds of information. For example, the storage unit 713 stores various kinds of information (for example, a control program) necessary for the server 710 to perform various processes. In addition, registration information (e.g., registration information shown in FIG. 44) acquired by the communication unit 711 through the network 720 is stored in the storage unit 713. In addition, the storage unit 713 stores positional information (e.g., positional information output from an electronic device 730,741-745) of each device acquired by the communication unit 711 via the network 720. In addition, the storage unit 713 stores determination information (e.g., determination information shown in FIG. 45) for determining information to be provided on the basis of positional information (e.g., positional information output from an electronic device 730,741-745) of each device acquired by the communication unit 711 via the network 720. Further, in the storage unit 713, provision information (e.g., provision information shown in FIG. 4, FIG. 15, FIG. 20, FIG. 24, FIG. 27, FIG. 30, FIG. 32, and FIG. 35) is stored related to each electronic device (e.g., an electronic device 730,741-745) connected via the network 720.

The electronic device 730 includes a communication unit 731, a positional information acquisition unit 732, a control unit 733, a storage unit 734, an operation unit 735, a display unit 736, and an audio output unit 737. Note that the communication unit 731 in the electronic device 730 can be connected to a predetermined network (e.g., the Internet) via a base station, another device (e.g., a wireless LAN router), an access point, or the like, which is installed by a communication carrier such as a cellular phone company, and can perform communication.

[A Registration Information Example that the Server 710 Manages]

FIG. 44 is a diagram showing an example of registration information managed by the server 710 according to the 6th embodiment. This registration information is stored in the storage unit 713. Further, this registration information is registered in the server 710 by a manual operation of the user of the electronic device.

As registration information managed by the server 710, for example, device identification information 751, positional information 752, device type information 753, and identification information 754 are stored.

The device identification information 751 is information capable of identifying each device. For example, information unique to the device such as terminal identification information, MAC address and MAC address can be registered. In FIG. 44, for ease of explanation, the device identification information 751 of the electronic device 730 is set as "OT0730" and the device identification information 751 of the electronic devices 741 to 745 is set as "OT0741" to "OT0745".

The positional information 752 is positional information periodically or irregularly transmitted from each device. For example, information for specifying a position of each device (e.g., latitude and longitude, a name of a feature on a map, a region name) is stored.

The device type information 753 is information registered by a manual operation of the electronic device. This registration of information is not essential and is arbitrary.

The identification information 754 is used in determining information to be provided to each device. For example, A, B, C, . . . , X, Y, and Z are given to each device in the registration order. Note that A, B, C, . . . , X, Y, and Z are examples, and other information (e.g., numerical values, symbols, and other languages) may be used. As the identification information 754, a registration number (1 to M, where M is a positive integer) indicating the order of registration may be used. In FIG. 44, for ease of explanation, an example is shown in which the identification information 754 of the electronic device 730 is "A" and the identification information 754 of the electronic devices 741 to 745 is "B" to "F".

[An Example of Determination Information for Determining the Provision Information Using Positional Information of Other Devices]

FIG. 45 is a diagram showing an example of the determination information (table) used when the provision information is determined based on the positional relationship between the electronic device 730 and another device in the 6th embodiment. The determination information shown in FIG. 45 is information indicating a correspondence relationship between identification information (identification information 754 shown in FIG. 44) of devices arranged in order from the electronic device 730 and the provision information OI. This determination information is stored in the storage unit 713.

In FIG. 45 the proximity ranks #1, #2, and #3 are values indicating the order of the devices existing at a position close to the electronic device 730 among other devices other than the electronic device 730. Further, the determination information (table) shown in FIG. 45 is information in which a plurality of patterns in the case where identification information (A to Z) of each device is arranged in the proximity order and provision information OI (OI 1 to OIM (where M is a positive integer)) are associated with each other. For example, if the identification information (identification information 754 shown in FIG. 44) of another device located closest to the electronic device 730 is "A", identification information (identification information 754 shown in FIG. 44) of another device located at a position od 2nd closest to the electronic device 730 is "A", and the identification information (identification information 754 shown in FIG. 44) of the other device located at the 3rd closest position to the electronic device 730 is also "A", then OI 1 is determined as the provision information OI. Further, for example, if the identification information (identification information 754 shown in FIG. 44) of another device existing at a position closest to the electronic device 730 is "A", the identification information (identification information 754 shown in FIG. 44) of another device existing at a position 2nd nearest from the electronic device 730 is "A", and the identification information (identification information 754 shown in FIG. 44) of another device located at the 3rd closest position to the electronic device 730 is "D", the OI 4 is determined as the provision information OI. Further, for example, if the identification information (identification information 754 shown in FIG. 44) of another device existing at a position closest to the electronic device 730 is "Z", the identification information (identification information 754 shown in FIG. 44) of another device existing at 2nd nearest position from the electronic device 730 is "Z", and the identification information (identification information 754 shown in FIG. 44) of another device located in the 3rd closest position to the electronic device 730 is "Z", then OIM (where M is a positive integer) is determined as the provision information OI.

Note that, in the 6th embodiment, an example is shown in which the order of up to 3 (#1 to #3) is used as a closest order, but a rank of 2 or more or a rank of 4 or less may be used. Further, the number of closest orders may be set in advance, and a user's preference value may be set by user operation. Further, the order of closeness, such as the 2nd closest rank, the 4th nearest rank, and the 6th nearest rank, which is not a continuous value but a discontinuous value may be used.

Further, the value of M is determined based on the number of closest orders and the identification information (in the 6th embodiment, A to Z). For example, when the number of closest orders is 3 and the identification information is A to Z (26), it is determined to be 17576 (=26×26×26). However, depending on the number of closest orders and the number of identification information, it is assumed that the value of M becomes too large, so that the provision information (e.g., audio information 11 and image information 12 shown in FIG. 4) cannot be prepared. Therefore, when the value of M is larger than the number of the provision information (e.g., audio information 11 and image information 12 shown in FIG. 4), the same information (audio information 11 and image information 12) may be assigned to different information (provision information OI).

[An Example for Determining Provision Information Using the Radio Wave Intensity Output from the Other Devices]

Figure 46:
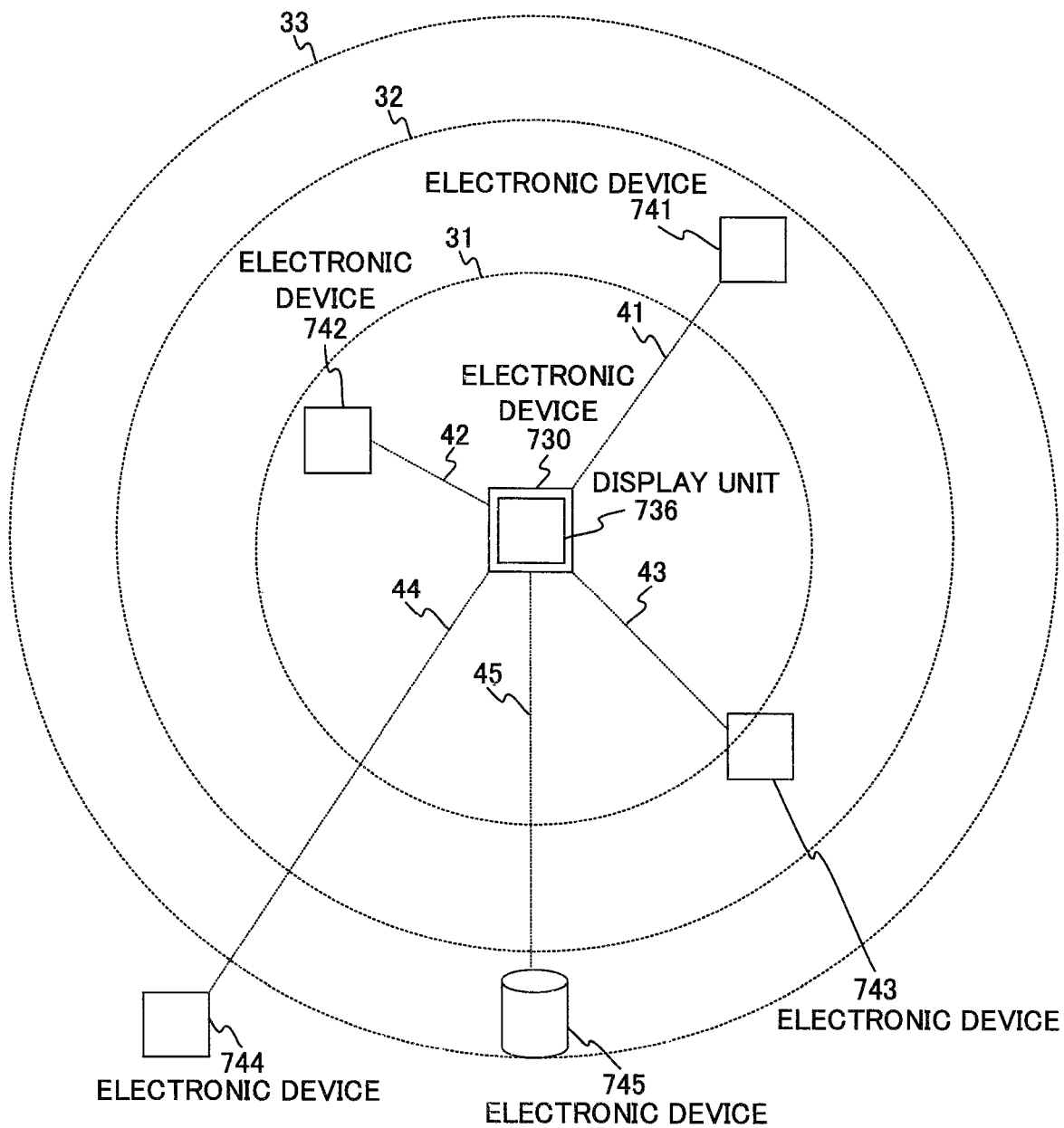
FIG. 46 is a diagram showing an example in which determines the provision information.

FIG. 46 and FIG. 47 illustrate an example in which the server 710 according to the 6th embodiment determines the provision information by using the positional informational of the electronic device 730 and the other devices (the electronic devices 741 to 745).

FIG. 46 shows a simplified distance between the electronic device 730 and other devices (electronic devices 741 to 745) when the position where the electronic device 730 is present is used as a reference. Note that circles 31 to 33 shown in FIG. 46 are circles centered on a position at which the electronic device 730 exists.

As shown in FIG. 46, a distance (a distance of a straight line) between the electronic device 730 and the electronic devices 741 to 745 is indicated by dashed lines 41 to 45. In this example, the distance (straight line 42) between the electronic device 730 and the electronic device 742 is shortest, and the distance (straight line 43) between the electronic device 730 and the electronic device 743 is 2nd shortest. It is assumed that the distance (straight line 44) between the electronic device 730 and the electronic device 741 is the 3rd shortest, the distance (straight line 41) between the electronic device 730 and the electronic device 745 is the 4th shortest, and the distance (straight line 45) between the electronic device 730 and the electronic device 744 is the 5th shortest (that is, the longest).

FIG. 47 (1) shows the order of the distances between the electronic device 730 and the electronic devices 741 to 745 and the identification information of the electronic devices 741 to 745 in the order of the electronic devices 741 to 745. In FIG. 47 (1), the names of the electronic devices 741 to 745 are shown at the upper stage, the identification information of each device is shown at the middle stage, and the proximity rank of each device to the electronic device 730 is shown at the lower stage.

Here, a known calculation method can be used as a method of calculating the distance between the devices. For example, the distance between the 2 devices can be calculated based on the positional information (e.g., latitude and longitude) of the 2 devices to be calculated. Specifically, on the basis of the positional information (e.g., latitude and longitude) of the 2 devices to be calculated, a linear distance between the 2 devices on the ground can be calculated.

Further, the server 710 may calculate all distances between all devices (for example, the electronic devices 741 to 745) registered in the registration information to the device (target device) (for example, the electronic device 730) which is referred to calculate the distance. Further, the server 710 may calculate only a distance between the target device (for example, the electronic device 730) and a part of the devices registered in the registration information. For example, when the target device (e.g., the electronic device 730) is used as a reference, the server 710 can calculate only the certain distance from the target device (e.g., the range of 1 to 10 km in radius, the same area (e.g., the same amusement park, the same shopping park, and the same city and town, and the same country)). In the example shown in FIG. 46, when the target device (for example, the electronic device 730) is used as a reference, the server 710 can calculate only the distance from the devices (for example, an electronic device 741-743,745) in a predetermined range (for example, a range of the circle 33) from the target device. When there is no more than a predetermined number of devices (e.g., 3) in a predetermined range from the target device, the range is sequentially enlarged until a predetermined number of devices exist.

For example, as shown in FIG. 46 the electronic device 742 with identification information "C" is ranked as 1 (#1) in the order of closeness, the electronic device 743 of the identification information "D" is ranked as 2 (#2) in the proximity order, the electronic device 741 of the identification information "B" becomes the 3 place (#3) in the proximity order, the electronic device 745 of the identification information "F" becomes the 4 place (#4) in the proximity order, and the electronic device 744 of the identification information "E" becomes the 5 place (#5) in the proximity order.

FIG. 47 (2) shows identification information of the electronic devices 741 to 745 when they are arranged in the order of closeness shown in the lower stage of FIG. 47 (1). Note that, since information for identifying the electronic devices 741 to 745 is not used hereinafter, codes for identifying the electronic devices 741 to 745 are omitted.

FIG. 47 (3) shows an example of extraction in case of extracting identification information which matches the identification information (C, D, B) of the upper 3 ranked device in the information shown in FIG. 47 (2) among the determination information shown in FIG. 45. Note that the determination information shown in FIG. 47 (3) is the same as that shown in FIG. 45, and in FIG. 47 (3), a part of the determination information shown in FIG. 45 is omitted. Further, in FIG. 47 (3), the identification information that matches the identification information (C, D, B) shown in FIG. 47 (2) is shown in the rectangle 21.

Here, each processing until the server 710 determines the provision information OI (within the rectangle 21 indicated by a broken line) shown in FIG. 47 will be described.

Each device (electronic device 730,741-745) acquires the positional information acquired by the positional information acquisition unit, and transmits the positional information to the server 710. It may be made to perform transmitting processing of this positional information periodically, and may be made to carry out irregularly.

Further, the control unit 712 of the server 710 acquires the positional information from each device received by the communication unit 711 and stores the acquired positional information in the storage unit 713 (the positional information 752 of the registration information shown in FIG. 44). For example, as shown in FIG. 44, each of the positional information is stored in the storage unit 713 for each device.

In addition, when the device (electronic device 730,741-745) satisfies the provision condition, it transmits request information for requesting the provision information from the server 710 to the server 710.

When receiving request information from each device (electronic device 730,741-745), the control unit 712 of the server 710 determines information (provision information OI) to be provided based on the positional information of each device registered in the registration information (shown in FIG. 44). For example, the control unit 712 of the server 710 calculates a distance between each device (e.g., all devices and a device existing in a predetermined range) registered in the registration information based on the device (target device) that has transmitted the request information. Then, the control unit 712 of the server 710 extracts, from the determination information shown in FIG. 45, identification information that matches the identification information of the device that is the distance up to the upper 3 of the calculated distances (distance between the target device and the other devices), and determines the provision information OI.

Next, the control unit 712 of the server 710 transmits the information (provision information) determined based on the positional information of the target device to the device (target device) that has transmitted the received request information.

When the device (target device) that has transmitted the request information receives the information from the server 710, the device stores the received information in the storage unit, and performs processing using the received information. For example, the device (target device) that has transmitted the request information performs the content output process on the basis of the information received from the server 710.

[A Communication Example in the Case that the Server 710 Provides Information]

Figure 48:
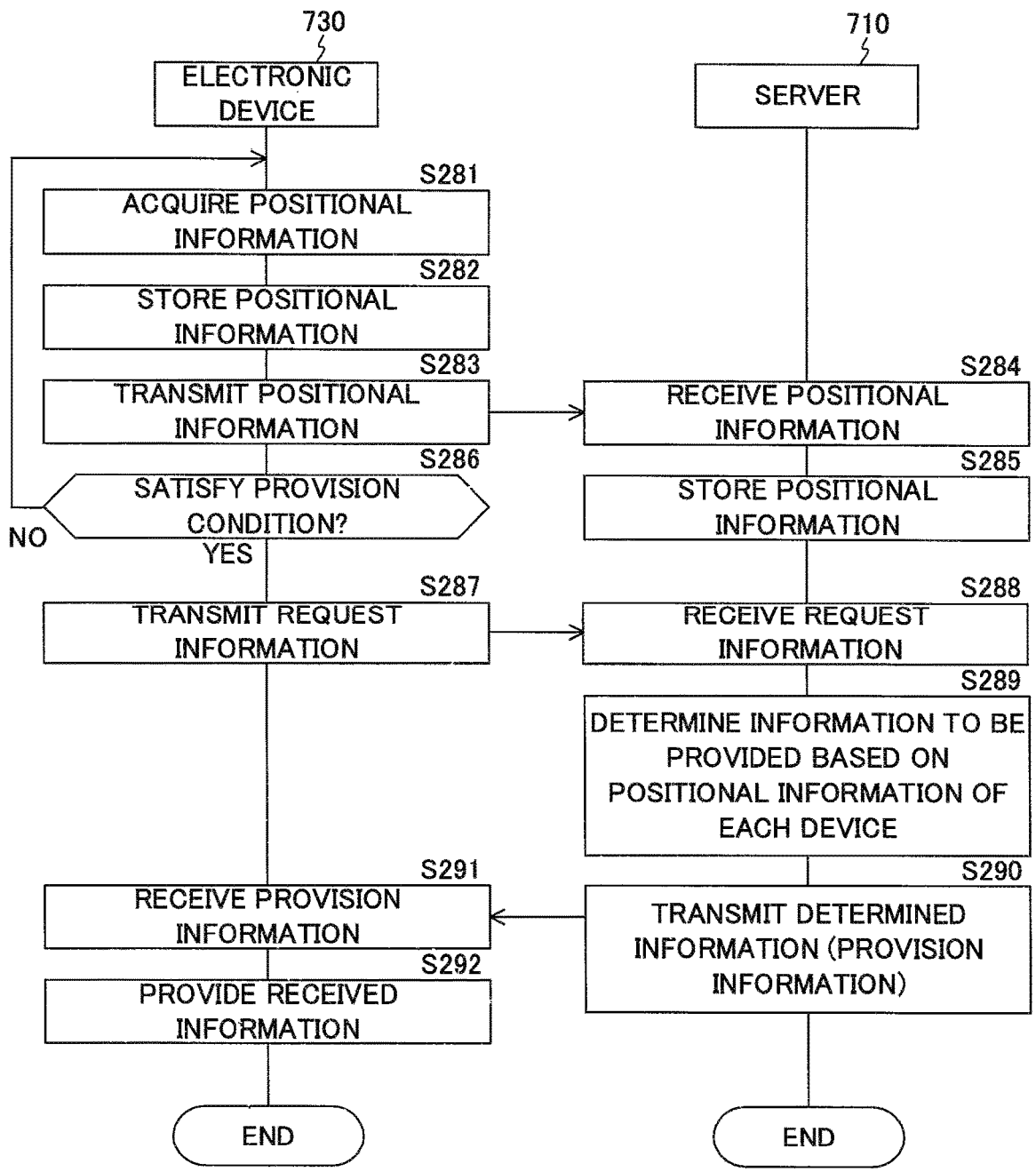
FIG. 48 is a diagram showing an example of communication processing performed by a server and an electronic device.

FIG. 48 is a flow chart which shows the example of communications processing by the server 710 and the electronic device 730 in the 6th embodiment. Note that the step S286,S290-S292 shown in FIG. 48 corresponds to the step S263,S267-S269 shown in FIG. 41. For this reason, a difference from the example shown in FIG. 41 will be mainly described. In addition, it is assumed that an application (program) for realizing each process shown in FIG. 48 is set in advance in the server 710 and the electronic device 730.

First, the control unit 733 of the electronic device 730 acquires the positional information acquired by the positional information acquisition unit 732 (Step S281). Then, the control unit 733 of the electronic device 730 stores the acquired positional information in the storage unit 734 (Step S282). Next, the control unit 733 of the electronic device 730 transmits the positional information to the server 710 (Step S283). It may be made to perform transmitting processing of this positional information periodically, and may be made to carry out irregularly.

When the positional information from the electronic device 730 is received, (Step S284) and the control unit 712 of the server 710 make the storage unit 713 store the received positional information (Step S285). For example, the control unit 712 of the server 710 stores the received positional information in the positional information 752 corresponding to the device type information 751 "OT0730" shown in FIG. 44.

Next, the control unit 733 judges whether the electronic device 730 satisfies the provision conditions or not (Step S286). And when the provision conditions are not satisfied, it returns to Step S281, and in satisfying the provision conditions, it proceeds to Step S287.

It is to be noted that a criterion for determining whether or not the provision condition is satisfied may be the same as that shown in FIG. 41.

In satisfying the provision conditions, (Step S286), the control unit 733 of the electronic device 730 transmits the request information which requires the provision information from the server 710 to the server 710 (Step S287). Note that the latest positional information may be transmitted together with the request information. In this case, the control unit 712 of the server 710 stores the received positional information together with the request information in the storage unit 713, and determines the provision information based on the positional information (Step S289).

When the request information from the electronic device 730 is received, (Step S288) and the control unit 712 of the server 710 determines the information used as a providing object based on the positional information on each devices registered into registration information (Step S289). For example, the control unit 712 of the server 710 calculates the distance between each device (e.g., all devices, devices existing in a predetermined range) registered in the registration information based on the device (electronic device 730) that has transmitted the request information. Then, the control unit 712 of the server 710 extracts, from the calculated distances (distance between the electronic device 730 and each of the devices), identification information that matches the identification information of the device that is the distance to the upper 3 positions from the determination information shown in FIG. 45, and determines the provision information OI (Step S289).

Next, the control unit 712 of the server 710 transmits the information (provision information) determined based on the positional information of the electronic device 730 to the electronic device 730 which has transmitted the received request information (Step S290).

When receiving the information from the server 710, the control unit 733 of the electronic device 730 causes the storage unit 734 to store the received provision information (Step S291). Next, the control unit 733 of the electronic device 730 performs processing using the received information (Step S292). 2. For example, the control unit 733 of the electronic device 730 performs the output process of the content based on the received information (Step S292).

In addition, in the 6th embodiment, an example has been described in which a distance between a target device (reference device) and another device is calculated, and the provision information is determined using a predetermined number of devices (e.g., up to 3) from the top of the distance. However, provision information may be determined by a different method from the distance between the target device and another device. For example, a distance between the target device and another device may be calculated, and the provision information may be determined using an order of distances of other devices existing in a predetermined range from the target device (a device up to a predetermined rank when the number of other devices is large) and identification information of another device (identification information 754 shown in FIG. 44).

Further, the provision information may be determined using information other than a distance between the target device and another device. For example, it is possible to determine the provision information using the number of other devices existing in a predetermined range from the target device. For example, determination information (e.g., "the number of other devices" is set in place of "closeness rank" of the determination information shown in FIG. 45) that associates the provision information OI with the number of other devices is stored in the storage unit 713. Then, it is possible to determine the number of other devices existing within a range of a circle having a predetermined radius (for example, 1 to 10 km) in the case of centering the target device, and extract the provision information OI the provision information OI corresponding to the number of devices.

Further, for example, the provision information can be determined using a shape (e.g., a triangle, a rectangle, an ellipse, or a circle) formed by another device (or a predetermined number of devices (e.g., up to 10 of the devices having a close distance from the target device) existing in a predetermined range from the target device). For example, determination information (e.g., "shape" is set instead of "proximity rank" of the determination information shown in FIG. 45) that associates the provision information OI with a shape (e.g., a straight line, a plurality of triangles, a plurality of quadrangles, a plurality of other polygons, a plurality of ellipses, and a circle) is stored in the storage unit 713. Then, based on the positional information of other devices, the position of another device on the map is identified, and a shape formed by a straight line connecting the positions (for example, a shape defined by a closed space defined by each straight line when each position of the other device is connected by a straight line) is specified (a shape specified by a closed 2-dimensional space (e.g., a closed space including a target device)). Then, provision information OI corresponding to the shape is extracted, thereby determining the provision information. For example, when another device existing in a predetermined range from a target device is 3 and another device is radially positioned centering on the target device, it is assumed that a shape formed by another device is a triangle (e.g., a shape close to an equilateral triangle, a shape close to an isosceles triangle). In this case, the provision information can be determined by extracting the provision information OI of the shape (triangle) closest to the shape (triangle).

In the example shown in FIG. 46, the other devices existing in a predetermined range (a circle 32 indicated by a broken line) from the target device (the electronic device 730) are the electronic devices 741 to 743, 3. Further, a shape formed by a straight line connecting the positions of the electronic devices 741 to 743 is triangular. In this case, the provision information can be determined by extracting the provision information OI corresponding to the triangle. Further, in the example shown in FIG. 46, another device existing in a predetermined range (a circle 33 indicated by a broken line) from the target device (the electronic device 730) is the electronic device 741-743,745, 4. Further, a shape formed by a straight line connecting the respective positions of the electronic device 741-743,745 is a quadrangle (a shape such as a 4-sided parallelogram). In this case, the provision information can be determined by extracting the provision information OI corresponding to the quadrangle.

Further, the provision information may be determined using these combinations (the distance between the target device and the other device, the number of other devices existing in a predetermined range from the target device, the shape formed by the other devices, and the identification information (the identification information 754 shown in FIG. 44) of each of these devices).

While the 6th embodiment has been described with reference to an example of outputting content, the 6th embodiment can also be applied when each process shown in the 1st to 5th embodiments is performed (e.g., the process are different from a process relating to radio communication based on the radio wave or a process utilizing radio communication based on the radio wave (e.g., the process are a process of performing a game process, a process of imparting some information to a character of a game, or the like)).

In this manner, the electronic device 730 (the control unit 733) can select and execute at least one process (e.g., a process of displaying 1 contents, a process related to 1 game (e.g., a versus fighting game, a growing game, and a roaming game)) from among plurality of processes (for example, each process for outputting content, each process for game) based on the relative relationship (e.g., the distance between the electronic device 730 and the other devices) with the plurality of other devices (e.g., the electronic devices 741-745) which is different from the processes relating to wireless communication with other devices or processing utilizing wireless communication with other devices.

Further, the server 710 (the control unit 712) can select at least one of the plurality of processing (the processing relating to the wireless communication between the target device and the other device and the processing which is different from the processing using the wireless communication between the target device and the other device) based on the relative relationship between the target device (for example, the electronic device 730) and a plurality of other devices (for example, the electronic devices 741 to 745), and to cause the target device to execute the selected one of the processing. In addition, in the 6th embodiment, an example is shown in which the server 710 is configured by one device, but a plurality of devices (information processing systems) may be configured to perform various processes for realizing the function of the server 710.

Note that each of the provision information described in the 1st to 6th embodiments represents a representative example, and other information may be used. For example, the provision information may be content composed of only voice, content composed of voice and image, content composed of voice and moving image, content related to odor, taste, contact, and the like. Also, the provision information includes animation characters having a plurality of types of characters (e.g., characters A, B, C, . . . , X, Y, Z). In this case, the different electronic devices may not be provided with the same character so that the same character is not provided, or some of the electronic devices may be provided with the same character so that the same character is provided.

Further, information relating to at least one of a plurality of types of movie information (e.g., movie of movie advertisement and pamphlet of movie) may be provided as the provision information. Further, information relating to at least one of a plurality of music (e.g., a moving picture of a singer and a moving picture of a concert) may be provided as the providing information. In addition, information on at least one of the plurality of travel destination information (location, famous place, transportation, discount coupon, and the like) may be provided as the provision information (e.g., Kusatsu Onsen, Ikaho Onsen). Further, at least one of a plurality of discount coupons, a treatment, and a discount coupon which can be used on the Internet may be used as the provision information. In addition, at least one of discount coupon, treatment and discount coupon of some stores may be provided as the provision information. In addition, information regarding points that can be used in 1 or more stores may be provided as the provision information. Further, information relating to fortunetelling (for example, today's radio wave fortunetelling) may be used as the provision information. In this way, the provision information may be 1 or more information related to an animation character, an animal (e.g., an animal of a movie, animal at an amusement park at travel destination), a person (e.g., a character of a movie, a celebrity at a travel destination), a plant (e.g., a name product of an itinerary, a flower of a highlight), a feature (e.g., a map of a travel destination, a building of a travel destination, a tourist resort of a travel destination), and music. Further, for example, an AR (Augmented Reality) (augmented reality) may be applied to provide as the provision information. For example, each content can be overlaid on an image (photo) generated by a camera of an electronic device (e.g., a camera of a smartphone).

Further, by using artificial intelligence (AI (Artificial Intelligence)), determination of content to be provided and determination of processing to be executed may be performed. For example, the determination information and the provision information (or the information of the processing to be executed) are generated using the machine learning for the pattern of the radio wave received by the electronic device (for example, the radio wave reception intensity, the pattern of the model of the device) and the environment of the radio wave condition (for example, determined by searching and moving history of the smartphone). Using these generated information, it is possible to determine the content to be provided and to determine the process to be executed.

Note that each of the control operations described in the 1st to 6th embodiments is executed based on a program for causing a computer to execute each processing procedure, and thus, each control operation can be grasped as an invention of a program. In other words, each of the control operations described in the 1st to 6th embodiments can be realized by storing the program in a storage medium of an information processing devices such as a server, reading the program from the storage medium, and causing the information processing devices to execute the read program. Further, there programs may be stored in a storage medium (e.g., a CD (Compact Disc), a DVD (Digital Versatile Disc), or a memory card) external to the information processing devices, and used.

The 1st to 6th embodiments show an example for realizing invention of the description to a scope of the claim, are not limited to these, and can perform various deformation in the range which does not deviate from the summary.

DESCRIPTION OF SYMBOLS 100-106,301-305,309,311-315,321,322,401-407,500, 550,560,730,741-745 Electronic device
110,501,551,561,611,631,711,731 Communication unit
120,503,552,562,612,632,712,733 Control unit
130,504,553,563,613,633,713,734 Storage unit
140,505,564,634,735 Operation unit
150,411,506,565,635,736 Display unit
160,507,566,636,737 Audio output unit
400 Display device
502,732 Positional information acquisition unit
400,700 Communication system
610,710 Server
620,720 Network

The invention claimed is:

1. An electronic device, comprising:
  circuitry configured to:
  store reception intensity of radio waves output from multiple devices including portable device that exist around the electronic device in a storage unit for each device; and
  perform processing related to a game based on a pattern of a plurality of reception intensities, the pattern being generated by combining the plurality of reception intensities stored in the storage unit for each device at a predetermined timing.

2. The electronic device according to claim 1, wherein the pattern consists of a combination of each reception intensity and the number of each radio wave intensity when each reception intensity of each device is arranged in order of reception intensity.

3. The electronic device according to claim 1, wherein the circuitry is further configured to:
  store the received radio wave intensity in the storage unit in each device as well as an information about the device that can be specified based on the radio wave output from the device; and
  perform processing related to the game based on the pattern of the information about the device when the information about the device stored in the storage unit is arranged in the order of reception intensity associated with the information about the device at the predetermined timing.

4. The electronic device according to claim 3, wherein the information about the device is at least one of a type of the device, a maker of the device, a model number of the device, a unique information of the device, and a name given to the device.

5. The electronic device according to claim 1, wherein the predetermined timing is either the timing when a predetermined time has elapsed, the timing when a desired content related to the game can be determined as a target, the timing when a predetermined user operation is performed, or the timing when a change in the posture of the electronic device is detected.

6. The electronic device according to claim 5, wherein the timing when the predetermined time has elapsed is either the timing when the elapsed time after the power of the electronic device is turned on becomes the predetermined time, and the timing when the elapsed time after the electronic device receives radio waves from a specific device becomes the predetermined time.

7. The electronic device according to claim 1, further comprising a positional information acquisition unit, wherein
  the positional information acquisition unit acquires a positional information related to a position where the electronic device is present; and
  the circuitry is further configured to:
  determine whether or not the position of the electronic device identified by the positional information is included in a specific area, and when the position of the electronic device is included in the specific area, a content is determined from the content associated with the specific area based on the pattern of reception intensity and perform processing related to the game using the determined contents.

8. The electronic device according to claim 1, wherein the circuitry is further configured to:
  determine a content based on the pattern;
  store the determined content in the storage unit; and
  execute a processing of the game using the content stored in the storage unit within a predetermined period.

9. The electronic device according to claim 1, wherein the circuitry is further configured to:
  perform processing related to the game which includes an output process in which the audio related to the game is output from the audio output unit, and a display process in which an image related to the game is displayed in the display unit.

10. The electronic device according to claim 1, wherein the circuitry is configured to perform progressing a story of the game based on the pattern of the plurality of reception intensities.

11. The electronic device according to claim 1, wherein the electronic device is a mobile device.

\* \* \* \* \*